(12) United States Patent
Kushwaha et al.

(10) Patent No.: US 12,034,879 B1
(45) Date of Patent: *Jul. 9, 2024

(54) METHODS AND SYSTEMS FOR CONTROLLING A TRANSLATING FLEXIBLE DISPLAY OF AN ELECTRONIC DEVICE IN RESPONSE TO PINCH GESTURE USER INPUT

(71) Applicant: Motorola Mobility LLC, Chicago, IL (US)

(72) Inventors: Pankaj Kushwaha, Bengaluru (IN); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/126,830

(22) Filed: Mar. 27, 2023

(51) Int. Cl.
*H04M 1/02* (2006.01)
*G06F 3/0488* (2022.01)
*G09G 3/00* (2006.01)

(52) U.S. Cl.
CPC ........ *H04M 1/0268* (2013.01); *G06F 3/0488* (2013.01); *G09G 3/035* (2020.08); *G09G 2354/00* (2013.01)

(58) Field of Classification Search
None
See application file for complete search history.

(56) References Cited

U.S. PATENT DOCUMENTS

| 9,473,190 | B1 | 10/2016 | Sandlofer |
| 11,513,604 | B2 | 11/2022 | Jain et al. |
| 2003/0144034 | A1 | 7/2003 | Hack |
| 2005/0219372 | A1 | 10/2005 | Watanabe |
| 2006/0082518 | A1 | 4/2006 | Ram |
| 2007/0273752 | A1 | 11/2007 | Chamber |
| 2017/0003794 | A1 * | 1/2017 | Gao ...................... G06F 1/1641 |
| 2017/0034319 | A1 | 2/2017 | Chenn |
| 2017/0090681 | A1 * | 3/2017 | Gao .................... H04M 1/0268 |
| 2020/0081227 | A1 | 3/2020 | Huang |
| 2020/0128124 | A1 | 4/2020 | Lin |
| 2020/0301567 | A1 | 9/2020 | Park |
| 2020/0326754 | A1 | 10/2020 | Kim |

(Continued)

FOREIGN PATENT DOCUMENTS

WO WO-2021082564 A1 * 5/2021 ............. G06F 3/041
WO WO-2021246783 A1 * 12/2021

OTHER PUBLICATIONS

Taylor Jr, Duane N. , "Non-Final Office Actions", U.S. Appl. No. 18/126,842, filed Mar. 27, 2023; dated Nov. 29, 2023.

(Continued)

*Primary Examiner* — Duane N Taylor, Jr.
(74) *Attorney, Agent, or Firm* — Philip H. Burrus, IV

(57) ABSTRACT

A method in an electronic device includes detecting, with a flexible display carried by a blade assembly that is slidably coupled to a device housing and movable between at least an extended position and a retracted position, user input defining a pinch gesture or expanding pinch gesture. The method then includes translating, by a translation mechanism operable with the blade assembly, the blade assembly toward the extended position in response to an expanding pinch gesture and translating the blade assembly toward the retracted position in response to a contracting pinch gesture.

20 Claims, 26 Drawing Sheets

(56) References Cited

U.S. PATENT DOCUMENTS

| | | |
|---|---|---|
| 2020/0336577 A1 | 10/2020 | Han |
| 2021/0185237 A1 | 6/2021 | Wang |
| 2021/0397264 A1 | 12/2021 | Jain et al. |
| 2021/0397815 A1 | 12/2021 | Alemah et al. |
| 2022/0035412 A1 | 2/2022 | Agrawal et al. |
| 2022/0038572 A1 | 2/2022 | Agrawal et al. |
| 2022/0174198 A1 | 6/2022 | Wang |
| 2023/0007149 A1 | 1/2023 | Ji |
| 2023/0177982 A1* | 6/2023 | Lee .................. G09F 9/301 |
| | | 361/679.27 |

OTHER PUBLICATIONS

"Lenovo Tech World 2022: Rollable Tech with Luca Rossi"; YouTube Video; Published Oct. 17, 2022; Available online at https://www.youtube.com/watch?v=kDB08h73rjs.

* cited by examiner

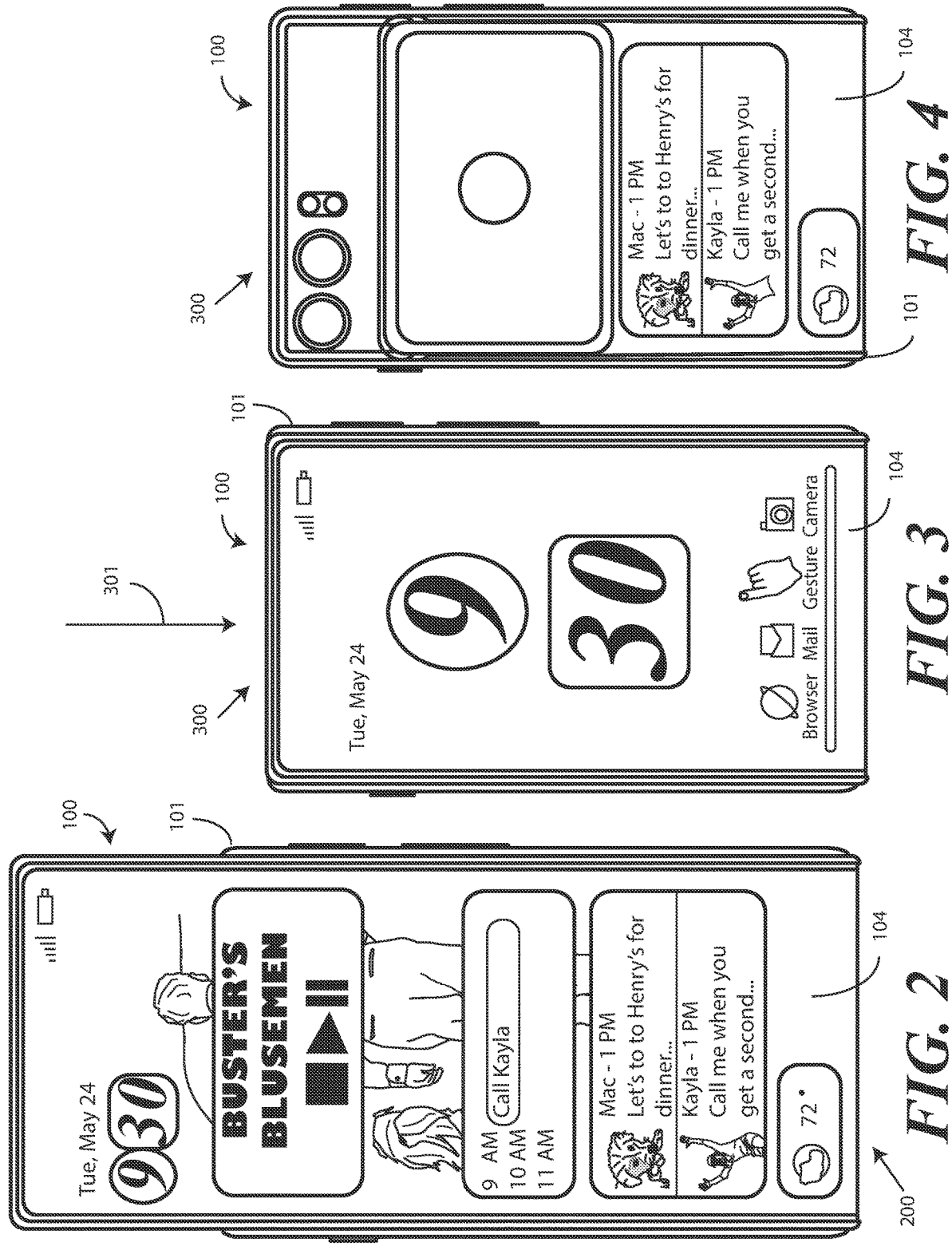

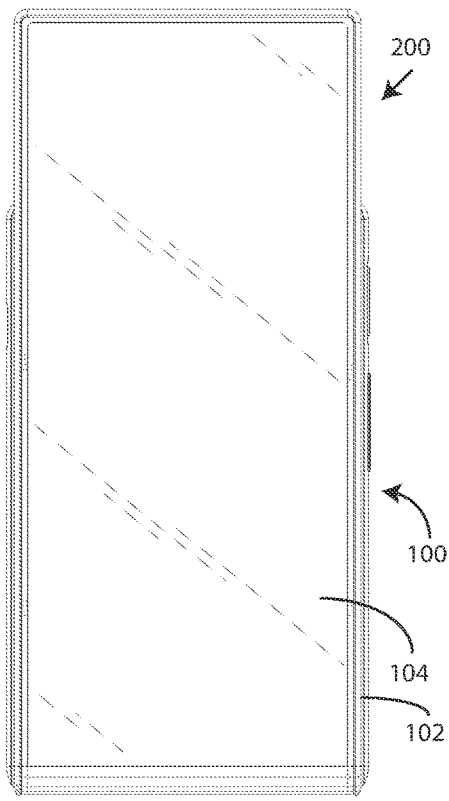 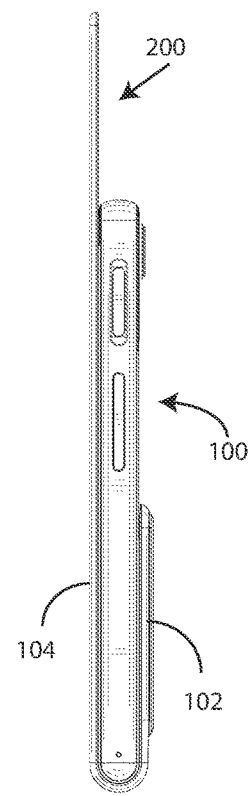 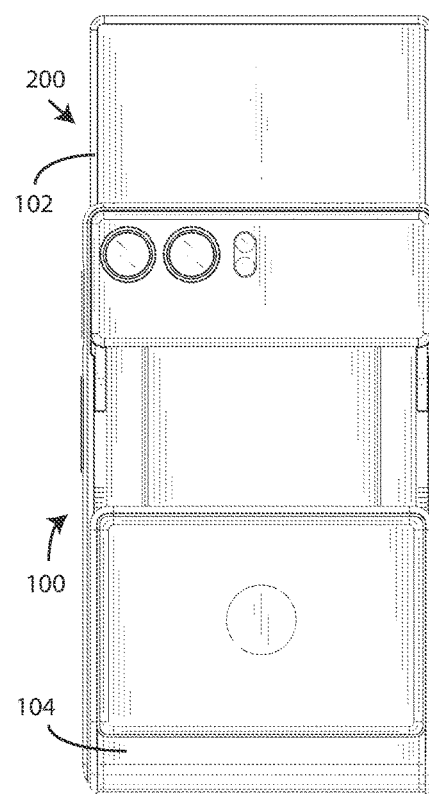
*FIG. 15*  *FIG. 16*  *FIG. 17*
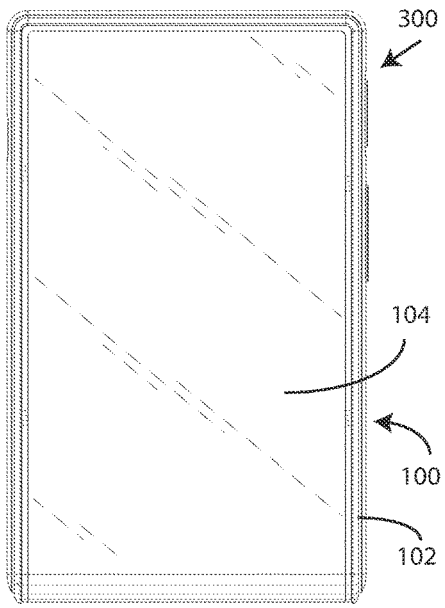 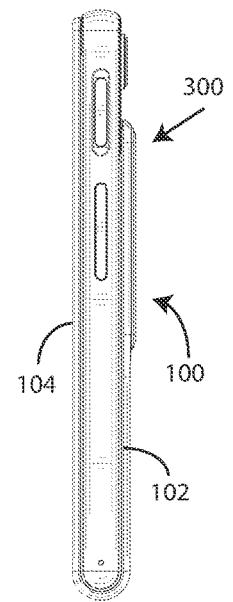 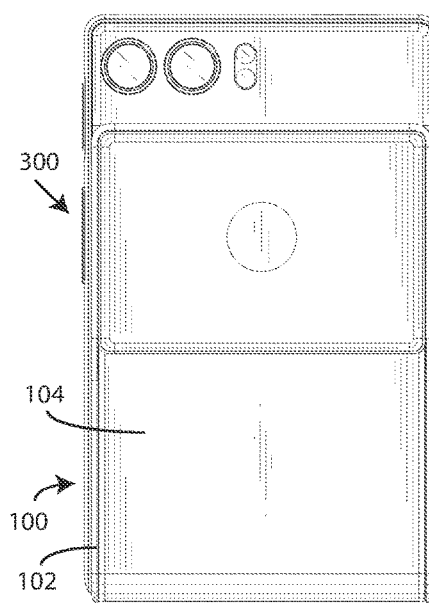
*FIG. 18*  *FIG. 19*  *FIG. 20*

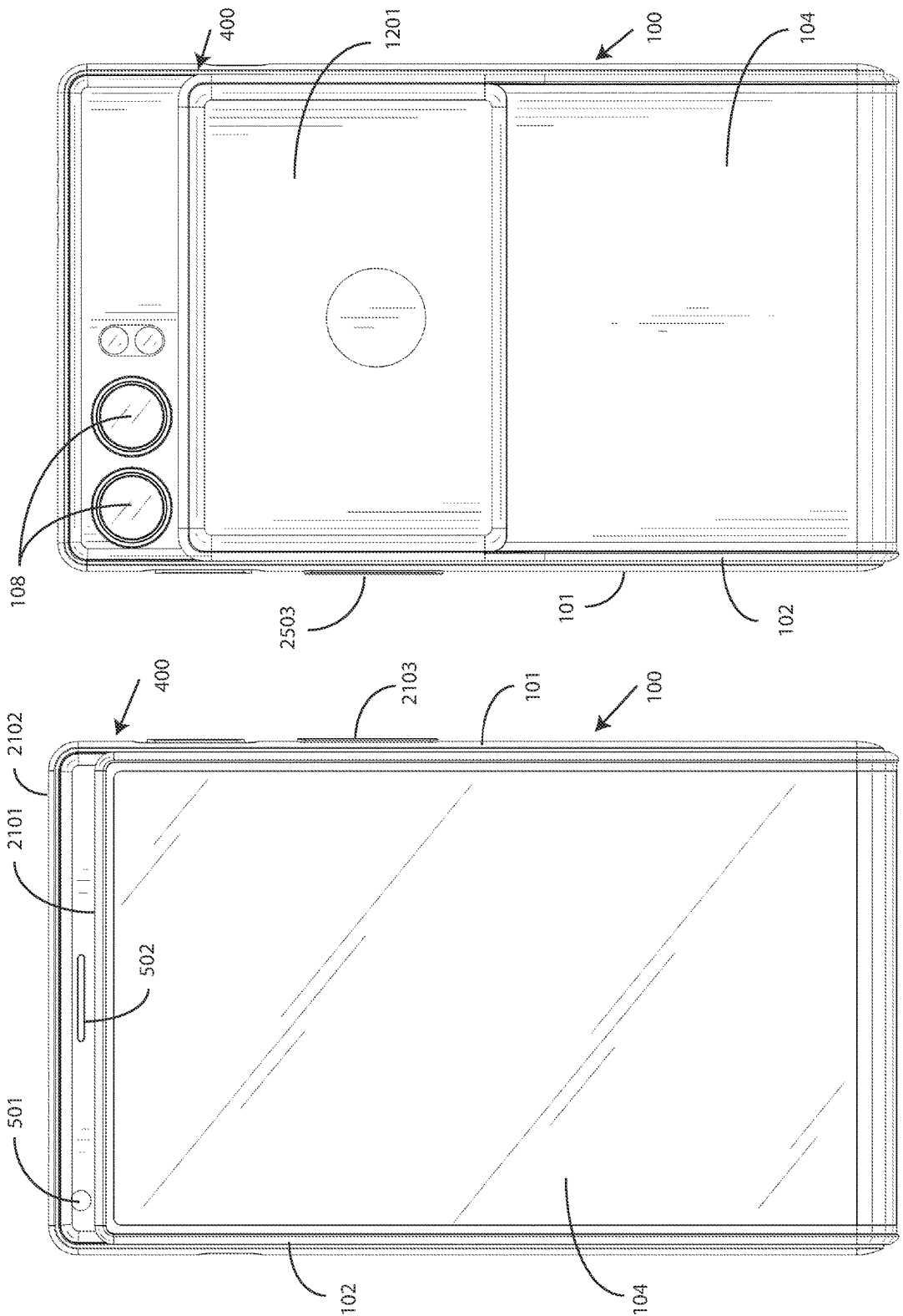

METHODS AND SYSTEMS FOR CONTROLLING A TRANSLATING FLEXIBLE DISPLAY OF AN ELECTRONIC DEVICE IN RESPONSE TO PINCH GESTURE USER INPUT

BACKGROUND

Technical Field

This disclosure relates generally to electronic devices, and more particularly to electronic devices having flexible displays.

Background Art

Portable electronic communication devices, especially smartphones, have become ubiquitous. People all over the world use such devices to stay connected. These devices have been designed in various mechanical configurations. A first configuration, known as a "candy bar," is generally rectangular in shape, has a rigid form factor, and has a display disposed along a major face of the electronic device. By contrast, a "clamshell" device has a mechanical hinge that allows one housing to pivot relative to the other. A third type of electronic device is a "slider" where two different device housings slide, with one device housing sliding relative to the other.

Some consumers prefer candy bar devices, while others prefer clamshell devices. Still others prefer sliders. The latter two types of devices are convenient in that they are smaller in a closed position than in an open position, thereby fitting more easily in a pocket. While clamshell and slider devices are relatively straight forward mechanically, they can tend to still be bulky when in the closed position due to the fact that two device housings are required. It would thus be desirable to have an improved electronic device that not only provides a compact geometric form factor but that allows for the use of a larger display surface area as well.

BRIEF DESCRIPTION OF THE DRAWINGS

FIG. 2 illustrates one explanatory electronic device having a translating display moved to a first sliding position where portions of the translating display extend distally away from the device housing of the electronic device.

FIG. 3 illustrates the explanatory electronic device of FIG. 2 with the translating display moved to a second sliding position where the translating display wraps around, and abuts, the device housing of the electronic device.

FIG. 4 illustrates the electronic device of FIG. 3 from the rear.

FIG. 15 illustrates a front elevation view of one explanatory electronic device in accordance with one or more embodiments of the disclosure with the blade assembly in an extended position.

FIG. 16 illustrates a left side elevation view of one explanatory electronic device in accordance with one or more embodiments of the disclosure with the blade assembly in an extended position.

FIG. 17 illustrates a rear elevation view of one explanatory electronic device in accordance with one or more embodiments of the disclosure with the blade assembly in an extended position.

FIG. 18 illustrates a front elevation view of one explanatory electronic device in accordance with one or more embodiments of the disclosure with the blade assembly in a retracted position.

FIG. 19 illustrates a left elevation view of one explanatory electronic device in accordance with one or more embodiments of the disclosure with the blade assembly in a retracted position.

FIG. 20 illustrates a rear elevation view of one explanatory electronic device in accordance with one or more embodiments of the disclosure with the blade assembly in a retracted position.

FIG. 21 illustrates a front elevation view of one explanatory electronic device in accordance with one or more embodiments of the disclosure with the blade assembly in a peek position revealing a front facing image capture device.

FIG. 22 illustrates a rear elevation view of one explanatory electronic device in accordance with one or more embodiments of the disclosure with the blade assembly in a peek position revealing a front facing image capture device.

Figure 1:
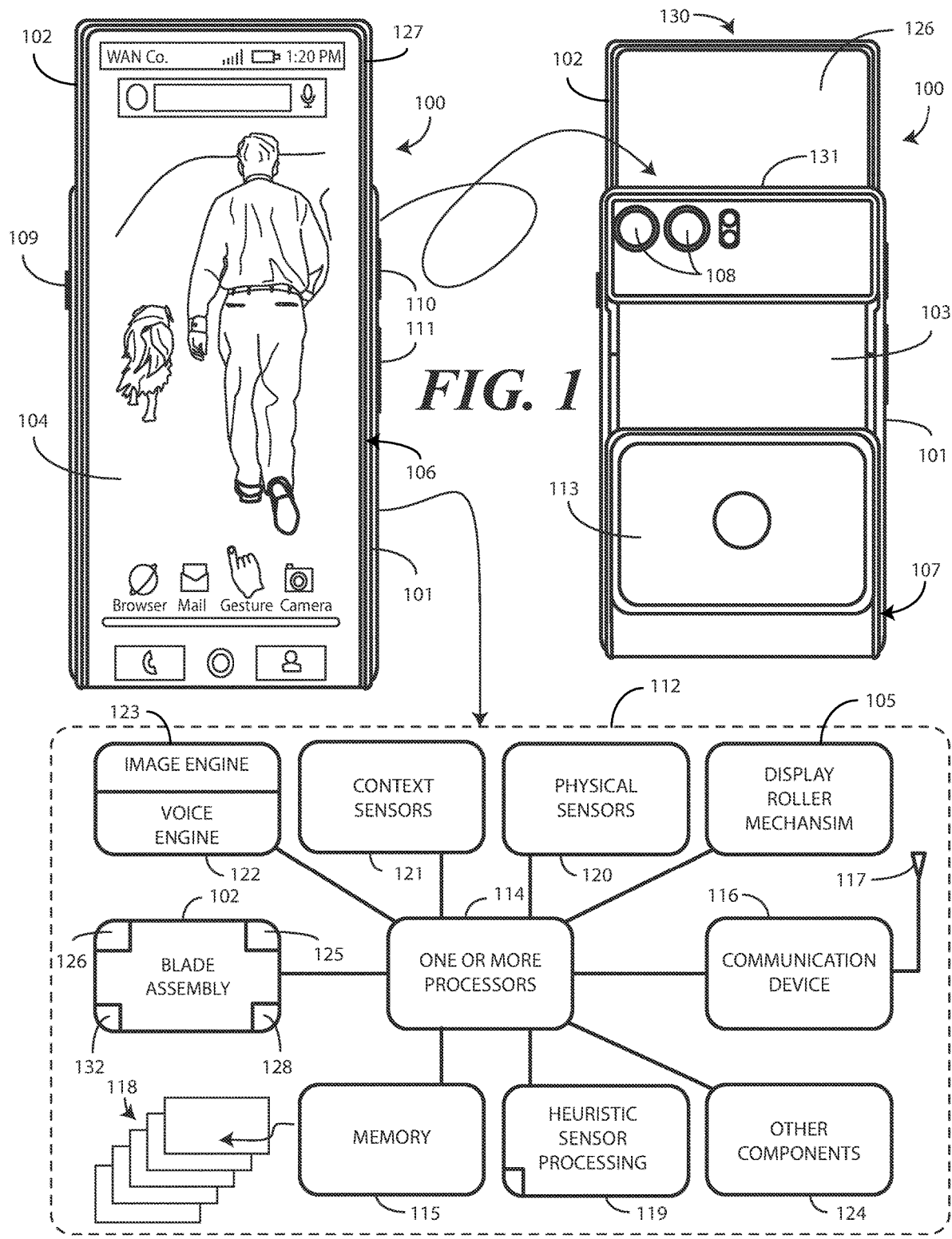
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to translating a flexible display between an extended position and a retracted position in response to user input, which in one or more embodiments is a pinch gesture, be it a contracting pinch gesture or an expanding pinch gesture. In one or more embodiments, expanding pinch gestures cause the blade assembly to transition toward the extended position, while contracting pinch gestures cause the blade assembly to transition toward the retracted position. Operation can occur in a similar manner in response to zoom gestures or commands as well. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, it is expected that one of ordinary skill, notwithstanding possibly significant effort and many design choices motivated by, for example, available time, current technology, and economic considerations, when guided by the concepts and principles disclosed herein will be readily capable of generating methods and devices with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path.

The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device that includes a single device housing. In one or more embodiments, a flexible display is then incorporated into a "blade" assembly that wraps around this single device housing. In one or more embodiments, the blade assembly does this by coupling to a translation mechanism attached to the single device housing.

The translation mechanism is operable to transition the blade assembly around the surfaces of the device housing between an extended position where a blade of the blade assembly extends distally from the device housing, a retracted position where the blade assembly abuts the device housing with the flexible display wrapping around the surfaces of the device housing, a "peek" position where movement of the translation mechanism causes the blade assembly to reveal an image capture device situated beneath the blade assembly on the front of the single device housing, and positions in between.

Illustrating by example, in one explanatory embodiment, the blade assembly slides around the single device housing such that the blade slides away from the single device housing to change an overall length of the flexible display appearing on the front of the electronic device. In other embodiments, the blade assembly can slide in an opposite direction around the single device housing to a retracted position with similar amounts of the flexible display visible on the front side of the electronic device and the rear side of the electronic device. Accordingly, in one or more embodiments an electronic device includes a single device housing with a blade assembly coupled to two major surfaces of the single device housing and wrapping around at least one minor surface of the electronic device where the translation mechanism is positioned such that the blade assembly can slide around, and relative to, the single device housing between a retracted position, an extended position, and a peek position revealing a front-facing image capture device.

In one or more embodiments, the flexible display is coupled to the blade assembly. In one or more embodiments, the flexible display is also surrounded by a silicone border that is co-molded onto a blade substrate and that protects the side edges of the flexible display. In one or more embodiments, the blade assembly engages at least one rotor of the translation mechanism that is situated at an end of the single device housing. When a translation mechanism situated in the single device housing drives elements coupled to the blade assembly, the flexible display wraps around the rotor and moves to extend the blade of the blade assembly further from, or back toward, the single device housing.

In one or more embodiments, one end of the flexible display is fixedly coupled to the blade assembly. Meanwhile, the other end of the flexible display is coupled to the tensioner via a flexible substrate that extends beyond the terminal edges of the flexible display. In one or more embodiments, this flexible substrate is a stainless-steel substrate, although other materials can be used.

Illustrating by example, in one or more embodiments the flexible substrate of the flexible display is longer along its major axis than is the flexible display in at least one dimension. Accordingly, at least a first end of the flexible substrate extends distally beyond at least one terminal end of the flexible display. This allows the first end of the flexible substrate to be rigidly coupled to a tensioner. In one or more embodiments, adhesive is used to couple one end of the flexible display to the blade assembly, while one or more fasteners are used to couple the second end of the flexible display to the tensioner, which is carried by the blade assembly.

In one or more embodiments, the translation mechanism comprises an actuator that causes a portion of the blade assembly abutting a first major surface of the single device housing and another portion of the blade assembly abutting a second major surface of the single device housing to slide symmetrically in opposite directions along the single device housing when the blade assembly transitions between the extended position, the retracted position, and the peek position.

In one or more embodiments, translation of the blade assembly occurs in response to user input received at the flexible display. Illustrating by example, in one or more embodiments the flexible display detects user input defining a pinch gesture. The pinch gesture can be an expanding pinch gesture or a contracting pinch gesture. In one or more embodiments, when the pinch gesture is an expanding pinch gesture, the translation mechanism translates the blade assembly toward the extended position. When the pinch gesture is a contracting pinch gesture, the translation mechanism can translate the blade assembly toward the retracted position.

In one or more embodiments, a zoom gesture can cause movement of the blade assembly as well. Illustrating by example, if a user performs a zoom gesture, which can be a pinch gesture or can be another type of user input such as actuation of a zoom user actuation target presented when an image capture application is operating in viewfinder mode, the blade assembly can translate toward the extended position when the zoom gesture is an expanding zoom gesture. Similarly, when the zoom gesture is a contracting zoom gesture, the blade assembly can transition toward the retracted position.

In one or more embodiments, after the blade assembly translates one or more processors of the electronic device can present new content on newly revealed front-facing portions of the flexible display. Illustrating by example, in one or more embodiments a user can deliver an expanding pinch gesture to the flexible display to cause the translation mechanism to translate the blade assembly toward the extended position. If an image capture application is operating when this occurs, the one or more processors can expand the field of view so that additional viewfinder mode content can be presented.

By contrast, if a user delivers a contracting pinch gesture when, for example, a map application is open, the one or more processors can cause the map application to present different amounts of a map in addition to causing the blade assembly to transition toward the retracted position. In one or more embodiments, when a contracting pinch gesture is delivered to the flexible display, the translation mechanism can cause the blade assembly to translate toward the retracted position, with the one or more processors removing content from front-facing portion of the flexible display that become concealed or rearwardly facing as a result of the translation.

Effectively, embodiments of the disclosure make translation of a flexible display carried by a blade assembly that is slidably coupled to a device housing and moveable between at least an extended position and a retracted position move toward the extended position, or alternatively toward the retracted position, in response to a pinch gesture or a zoom gesture.

In one or more embodiments, an electronic device comprises a device housing, a blade assembly carrying a blade and a flexible display that is slidably coupled to the device housing, a translation mechanism operable to slide the blade assembly relative to the device housing between the extended position, the retracted position, and optionally a peek position, and one or more processors operable with the translation mechanism. In one or more embodiments, in response to the flexible display detecting an expanding pinch gesture, the one or more processors cause the translation mechanism to translate the blade assembly toward the extended position and present additional content on front-facing portions of the flexible display revealed by translation of the flexible display.

In one or more embodiments, the one or more processors can determine a foreground activity occurring on the electronic device. The one or more processors may also determine whether the electronic device is in a locked mode of operation or an unlocked mode of operation.

To present an application tray on a home screen in response to a pinch gesture, the one or more processors may determine that the electronic device is in an unlocked state of operation. In one or more embodiments, the flexible display then receives user input defining an expanding pinch gesture while the one or more processors are presenting a home screen presentation on the flexible display.

In one or more embodiments, in response to detection of the pinch gesture expanding, the one or more processors cause the translation mechanism to translate the blade assembly toward the extended position. In one or more embodiments, this translation stops when the blade assembly is in a position closest to the retracted position such that all applications of the application tray can be presented.

In one or more embodiments, when additional pinch gestures are received, the one or more processors can check to see if there are additional applications. If there are, the one or more processors can cause the translation mechanism to translate the blade assembly toward the extended position again in response to expanding pinch gestures and render the remaining applications on newly revealed front-facing portions of the flexible display. Otherwise, in one or more embodiments the one or more processors cause the translation mechanism to translate the blade assembly back toward the retracted position when additional gesture input is received in the form of a contracting pinch gesture or contracting zoom gesture.

In one or more embodiments, when an application is active on the front-facing portion of the flexible display, the one or more processors first detect this fact as well as the fact that the electronic device is in the unlocked state of operation. In one or more embodiments, in response to detection of the pinch gesture expanding outward, the one or more processors cause the translation mechanism to translate the blade assembly toward the extended position.

In one or more embodiments, this translation stops when the blade assembly is in a position closest to the retracted position such that the present activity associated with the application can be presented on the flexible display. Since the space required by the application for a particular activity can change, in one or more embodiments the area amount of the front-facing portion can be changed by continuing to move the blade assembly so as to provide sufficient room for application content on the front-facing portion of the flexible display.

In one or more embodiments, a method in an electronic device comprises detecting a pinch gesture with a flexible display carried by a blade assembly slidably coupled to a device housing and moveable between an extended position, a retracted position, and a peek position. In one or more embodiments, the method comprises translating the blade assembly toward the extended position with a translation mechanism in response to the pinch gesture when the pinch gesture is an expanding pinch gesture.

In one or more embodiments, this translation occurs only when the electronic device is in an unlocked state when the pinch or zoom gesture is detected. In one or more embodiments, one or more processors of the electronic device can then present additional content on front-facing portions of the flexible display that are revealed when the blade assembly translates toward the extended position.

Advantageously, embodiments of the disclosure provide an improved sliding mechanism for a flexible display integrated into a blade assembly in a sliding electronic device having a single device housing that slides in response to touch input, and in particular pinch gestures or zoom gestures. In one or more embodiments, pinch gestures and zoom gesture expanding or zooming in cause the blade assembly to translate toward the extended position, while pinch gestures or zoom gestures contracting or zooming out cause the blade assembly to translate toward the retracted position.

The actuator of the translation mechanism can take a variety of forms. In some embodiments, the actuator can comprise a dual-shaft motor. The dual shaft motor can be threaded to move translators of the translation mechanism in equal and opposite directions in one or more embodiments. In other embodiments, the dual-shaft motor can be coupled to at least one timing belt.

In another embodiment, the actuator comprises a first drive screw and a second drive screw. These drive screws can be coupled together by a gear assembly. When a first portion of the blade assembly is coupled to a translator positioned around the first drive screw, and a second portion of the blade assembly is coupled to another translator positioned around the second drive screw, actuation of either causes the first portion of the blade assembly abutting a first major surface of the single device housing and the second portion of the blade assembly abutting a second major surface of the single device housing to move symmetrically in opposite directions as the first drive screw and the second drive screw rotate.

In still other embodiments, the actuator comprises a first rack, a second rack, and a pinion. The first rack can be coupled to the first portion of the blade assembly while the second rack can be coupled to the second portion of the blade assembly. When the pinion engages both the first rack or the second rack, actuation of either causes the first portion of the blade assembly abutting a first major surface of the single device housing and the second portion of the blade assembly abutting a second major surface of the single device housing to move symmetrically in opposite directions as the first rack and second rack do the same. Other configurations of the actuator will be described below. Still others will be obvious to those of ordinary skill in the art having the benefit of this disclosure.

In one or more embodiments, the blade assembly is coupled to the translator of the translation mechanism. When the translator is actuated, a first portion of the blade assembly abutting a first major surface of the single device housing and a second portion of the blade assembly abutting a second major surface of the single device housing move symmetrically in opposite directions.

Advantageously, embodiments of the disclosure provide an improved sliding mechanism for a flexible display in an electronic device. Flexible display and rotor sliding assemblies configured in accordance with embodiments of the disclosure maintain a flat upper portion of a J-shape defined by a flexible display and/or blade assembly while preserving the operability and functionality of the flexible display during sliding operations.

Embodiments of the disclosure contemplate that in such an electronic device having a translating display, the user generally has to manually select whether the display is transitioned to the extended position, the retracted position, or the peek position. Illustrating by example, the user might have to press a button once to cause the translating display to transition to the extended position and twice to cause the translating display to transition to the retracted position. A "long press" of the button may be required to cause the translating display to transition to the peek position, and so forth.

This manual actuation requires the user to take a manual action to change the state of the electronic device. Additionally, this requirement potentially delays the usability of the electronic device in the new state due to the time taken to manually "inject" the trigger causing transition of the translating display by pressing the button.

Advantageously, embodiments of the disclosure provide systems and methods that automatically and pre-emptively move the translating display to the optimal state based upon sensed pinch and zoom gestures. Illustrating by example, in one or more embodiments one or more processors of the electronic device can transition the translating display to the extended position when one or more sensors of the electronic device detect an expanding pinch gesture while a forefront application operating on the one or more processors enters a full-screen, immersive mode. Examples of applications utilizing such full-screen, immersive modes of operation include gaming applications and video playback applications. Other such applications will be obvious to those of ordinary skill in the art having the benefit of this disclosure.

In one or more embodiments, the artificial intelligence classifier can be used to determine the optimal display state and to generate triggers for the state based on a particular user preference that are identified from operating contexts when the pinch gesture or zoom gesture is received. In one or more embodiments, an artificial intelligence model is trained using the following inputs entered as weighted variables: the current foreground application, the device orientation in three-dimensional space, the application type operating on the one or more processors, e.g., whether the application is a gaming application, a video productivity application, a media application, and so forth), the application display mode, e.g., whether the display is being used in an immersive mode or a non-immersive mode, and when the user delivers a pinch or zoom gesture (and in which direction) to cause the translating display to transition to the extended position or the retracted position.

In one or more embodiments, the artificial intelligence classifier can continually learn the user's preferences for the extended position based upon user actions. In one or more embodiments, the artificial intelligence classifier can automatically trigger the movement of the translating display to the extended position in response to pinch or zoom gesture activity.

Translation of the translating display to the retracted position can occur in a similar fashion. In one or more embodiments, the one or more processors of the electronic device can automatically translate the translating display back to the retracted position when a contracting pinch gesture is received. Advantageously, embodiments of the disclosure provide intuitive operation of a translating display in an electronic device. In cases where automatic translation of the translating display is triggered, the only user action required for the translating display to change positions is a simple pinch or zoom gesture. Thereafter, the device automatically changes to the position potentially desired by the user. Other advantages will be described below. Still others will be obvious to those of ordinary skill in the art having the benefit of this disclosure.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, gaming devices, multimedia players, and so forth. Still other types of electronic devices can be configured in accordance with one or more embodiments of the disclosure as will be readily appreciated by those of ordinary skill in the art having the benefit of this disclosure.

The electronic device 100 includes a single device housing 101. In one or more embodiments, a blade assembly 102 carrying a flexible display 104 wraps around the single device housing 101. As will be described in more detail below, in one or more embodiments the blade assembly 102 is configured to "slide" along the first major surface (covered by the flexible display in the front view of the electronic device 100 on the left side of FIG. 1) of the single device housing 101 and second major surface 103 situated on the rear side of the single device housing 101.

In one or more embodiments the single device housing 101 is manufactured from a rigid material such as a rigid thermoplastic, metal, or composite material, although other materials can be used. Illustrating by example, in one illustrative embodiment the single device housing 101 is manufactured from aluminum. Still other constructs will be obvious to those of ordinary skill in the art having the benefit of this disclosure.

In the illustrative embodiment of FIG. 1, the blade assembly 102 carries the flexible display 104. The flexible display 104 can optionally be touch-sensitive. Users can deliver user input to the flexible display 104 of such an embodiment by delivering touch input from a finger, stylus, or other objects disposed proximately with the flexible display 104.

In one embodiment, the flexible display 104 is configured as an organic light emitting diode (OLED) display fabricated on a flexible plastic substrate. The blade assembly 102 is fabricated on a flexible substrate as well. This allows the blade assembly 102 and flexible display 104 to deform around a display roller mechanism 105 when a first portion 106 of the blade assembly 102 abutting a first major surface of the single device housing 101 and a second portion 107 of the blade assembly 102 abutting a second major surface 103 of the single device housing 101 move symmetrically in opposite directions around the single device housing 101. In one or more embodiments, the blade assembly 102 and flexible display 104 are both constructed on flexible metal substrates can allow each to bend with various bending radii around the display roller mechanism 105.

In one or more embodiments the flexible display 104 may be formed from multiple layers of flexible material such as flexible sheets of polymer or other materials. In this illustrative embodiment, the flexible display 104 is fixedly coupled to the blade assembly 102, which wraps around the display roller mechanism 105.

Features can be incorporated into the single device housing 101. Examples of such features include one or more cameras or image capture devices 108 or an optional speaker port. In this illustrative embodiment, user interface components 109,110,111, which may be buttons, fingerprint sensors, or touch sensitive surfaces, can also be disposed along the surfaces of the single device housing 101. Any of these features are shown being disposed on the side surfaces of the electronic device 100 could be located elsewhere. In other embodiments, these features may be omitted.

A block diagram schematic 112 of the electronic device 100 is also shown in FIG. 1. The block diagram schematic 112 includes one or more electronic components that can be coupled to a printed circuit board assembly disposed within the single device housing 101. Alternatively, the electronic components may be carried by the blade assembly 102. Illustrating by example, in one or more embodiments electronic components can be positioned beneath a "backpack" 113 carried by the blade assembly 102.

The components of the block diagram schematic 112 can be electrically coupled together by conductors or a bus disposed along one or more printed circuit boards. For example, some components of the block diagram schematic 112 can be configured as a first electronic circuit fixedly situated within the single device housing 101, while other components of the block diagram schematic 112 can be configured as a second electronic circuit carried by the blade assembly 102 in the backpack 113. A flexible substrate can then extend from the first electronic circuit in the single device housing 101 to the second electronic circuit carried by the blade assembly 102 in the backpack 113 to electrically couple the first electronic circuit to the second electronic circuit.

The illustrative block diagram schematic 112 of FIG. 1 includes many different components. Embodiments of the disclosure contemplate that the number and arrangement of such components can change depending on the particular application. Accordingly, electronic devices configured in accordance with embodiments of the disclosure can include some components that are not shown in FIG. 1, and other components that are shown may not be needed and can therefore be omitted.

In one or more embodiments, the electronic device 100 includes one or more processors 114. In one embodiment, the one or more processors 114 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 115, can optionally store the executable software code used by the one or more processors 114 during operation.

In one embodiment, the one or more processors 114 are responsible for miming the operating system environment of the electronic device 100. The operating system environment can include a kernel and one or more drivers, and an application service layer, and an application layer. The operating system environment can be configured as executable code operating on one or more processors or control circuits of the electronic device 100. The application layer can be responsible for executing application service modules. The application service modules may support one or more applications or "apps." The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In this illustrative embodiment, the electronic device 100 also includes a communication device 116 that can be configured for wired or wireless communication with one or more other devices or networks. The networks can include a wide area network, a local area network, and/or personal area network. The communication device 116 may also utilize wireless technology for communication, such as, but are not limited to, peer-to-peer or ad hoc communications such as HomeRF, Bluetooth and IEEE 802.11, and other forms of wireless communication such as infrared technology. The communication device 116 can include wireless communication circuitry, one of a receiver, a transmitter, or transceiver, and one or more antennas 117.

In one embodiment, the one or more processors 114 can be responsible for performing the primary functions of the electronic device 100. For example, in one embodiment the one or more processors 114 comprise one or more circuits operable with one or more user interface devices, which can include the flexible display 104, to present, images, video, or other presentation information to a user. The executable software code used by the one or more processors 114 can be configured as one or more modules 118 that are operable with the one or more processors 114. Such modules 118 can store instructions, control algorithms, logic steps, and so forth.

In one embodiment, the one or more processors 114 are responsible for running the operating system environment of the electronic device 100. The operating system environment can include a kernel and one or more drivers, and an application service layer, and an application layer. The operating system environment can be configured as executable code operating on one or more processors or control circuits of the electronic device 100. The application layer can be responsible for executing application service modules. The application service modules may support one or more applications or "apps." The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In one embodiment, the one or more processors 114 may generate commands or execute control operations based on information received from the various sensors of the electronic device 100. As shown in FIG. 1, these sensors can be categorized into physical sensors 120 and context sensors 121.

Generally speaking, physical sensors 120 include sensors configured to sense or determine physical parameters indicative of conditions in an environment about the electronic device 100. Illustrating by example, the physical sensors 120 can include devices for determining information such as motion, acceleration, orientation, proximity to people and other objects, lighting, capturing images, and so forth. The physical sensors 120 can include various combinations of microphones, location detectors, temperature sensors, barometers, proximity sensor components, proximity detector components, wellness sensors, touch sensors, cameras, audio capture devices, and so forth. Many examples of physical sensors 120 will be described below with reference to FIG. 6. Others will be obvious to those of ordinary skill in the art having the benefit of this disclosure.

By contrast, the context sensors 121 do not measure physical conditions or parameters. Instead, they infer context from data of the electronic device. Illustrating by example, when a physical sensor 120 includes a camera or intelligent imager, the context sensors 121 can use data captured in images to infer contextual cues. An emotional detector may be operable to analyze data from a captured image to determine an emotional state. The emotional detector may identify facial gestures such as a smile or raised eyebrow to infer a person's silently communicated emotional state, e.g., joy, anger, frustration, and so forth. Other context sensors 121 may analyze other data to infer context, including calendar events, user profiles, device operating states, energy storage within a battery, application data, data from third parties such as web services and social media servers, alarms, time of day, behaviors a user repeats, and other factors.

The context sensors 121 can be configured as either hardware components, or alternatively as combinations of hardware components and software components. The context sensors 121 can be configured to collect and analyze non-physical parametric data.

Figure 6:
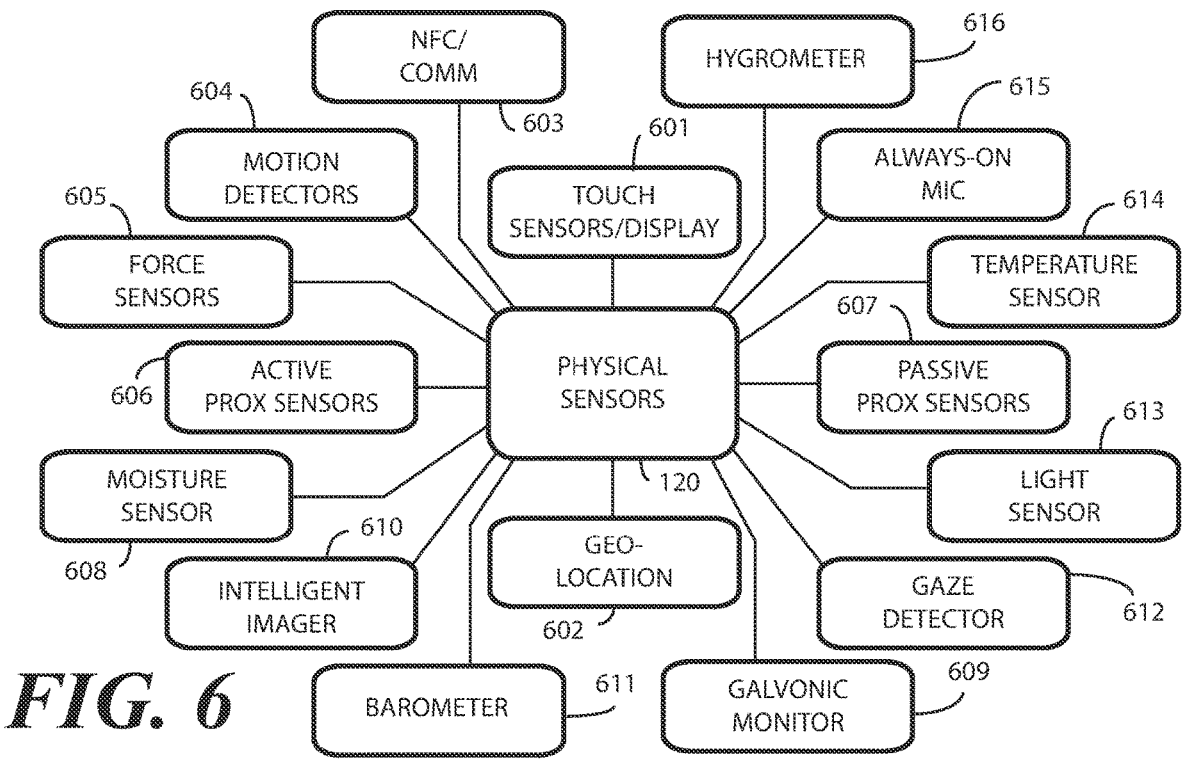
FIG. 6 illustrates one or more explanatory physical sensors suitable for use, alone or in combination, in an electronic device in accordance with one or more embodiments of the disclosure.
Figure 7:
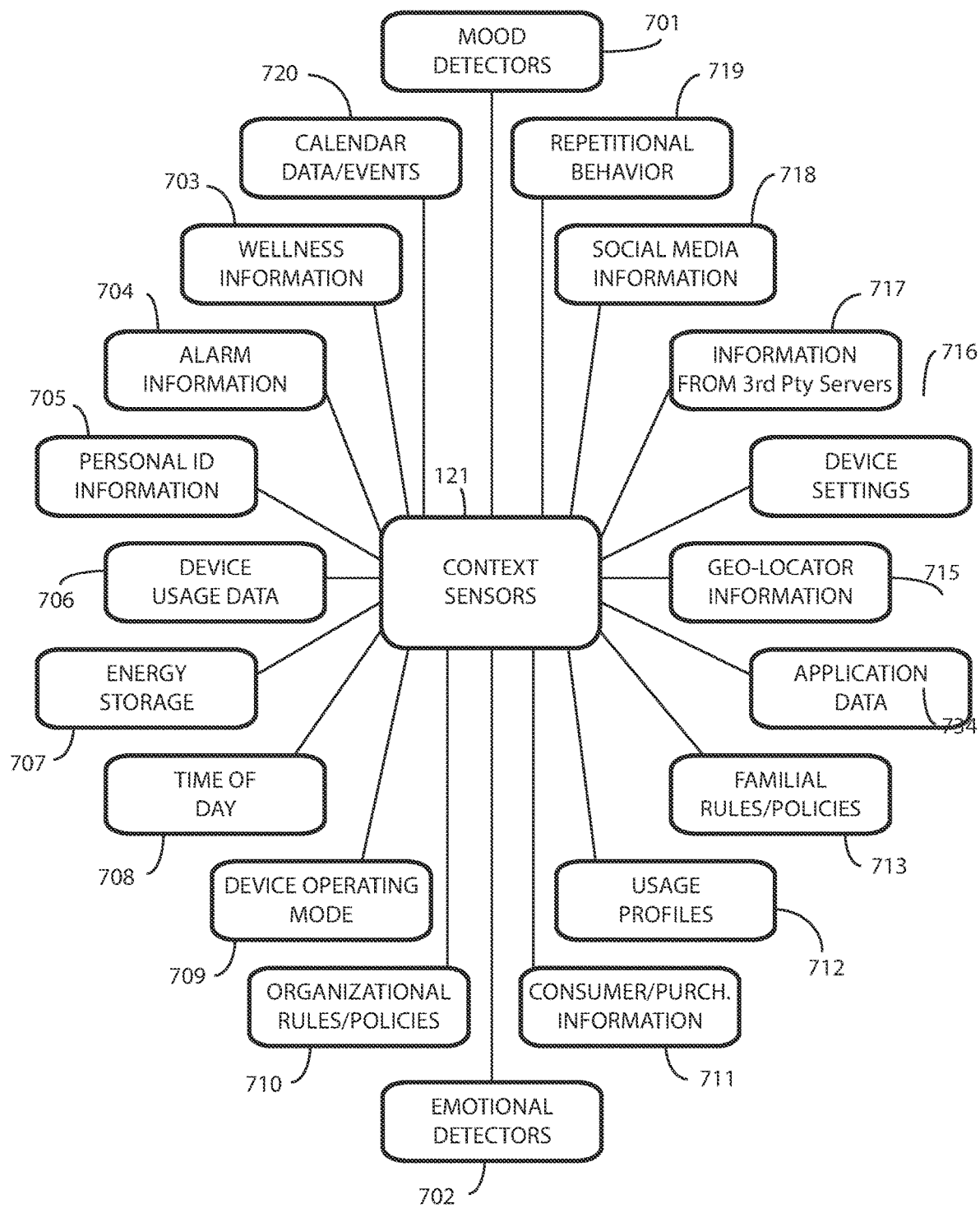
FIG. 7 illustrates one or more explanatory context sensors suitable for use, alone or in combination, in an electronic device in accordance with one or more embodiments of the disclosure.

Examples of the physical sensors 120 and the context sensors 121 are shown in FIGS. 6 and 7. These examples are illustrative only, as other physical sensors 120 and context sensors 121 will be obvious to those of ordinary skill in the art having the benefit of this disclosure.

Turning briefly to FIG. 6, illustrated therein are various examples of the physical sensors 120. In one or more embodiments, the physical sensors 120 sense or determine physical parameters indicative of conditions in an environment about an electronic device. FIG. 6 illustrates several examples physical sensors 120. It should be noted that those shown in FIG. 6 are not comprehensive, as others will be obvious to those of ordinary skill in the art having the benefit of this disclosure. Additionally, it should be noted that the various physical sensors 120 shown in FIG. 6 could be used alone or in combination. Accordingly, many electronic devices will employ only subsets of the physical sensors 120 shown in FIG. 6, with the particular subset chosen being defined by device application.

A first example of a physical sensor is a touch sensor 601. The touch sensor 601 can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors (114), to detect an object in close proximity with—or touching—the surface of the display or the housing of an electronic device by establishing electric field lines between pairs of capacitive sensors and then detecting perturbations of those field lines.

The electric field lines can be established in accordance with a periodic waveform, such as a square wave, sine wave, triangle wave, or other periodic waveform that is emitted by one sensor and detected by another. The capacitive sensors can be formed, for example, by disposing indium tin oxide patterned as electrodes on the substrate. Indium tin oxide is useful for such systems because it is transparent and conductive. Further, it is capable of being deposited in thin layers by way of a printing process. The capacitive sensors may also be deposited on the substrate by electron beam evaporation, physical vapor deposition, or other various sputter deposition techniques.

Another example of a physical sensor 120 is a geo-locator that serves as a location detector 602. In one embodiment, location detector 602 is operable to determine location data when an image is captured from a constellation of one or more earth orbiting satellites, or from a network of terrestrial base stations to determine an approximate location. Examples of satellite positioning systems suitable for use with embodiments of the present invention include, among others, the Navigation System with Time and Range (NAVSTAR) Global Positioning Systems (GPS) in the United States of America, and other similar satellite positioning systems. The location detector 602 can make location determinations autonomously or with assistance from terrestrial base stations, for example those associated with a cellular communication network or other ground-based network, or as part of a Differential Global Positioning System (DGPS), as is well known by those having ordinary skill in the art. The location detector 602 may also be able to determine location by locating or triangulating terrestrial base stations of a traditional cellular network, or from other local area networks, such as Wi-Fi networks.

Another physical sensor 120 is a near field communication circuit 603. The near field communication circuit 603 can be included for communication with local area networks to receive information regarding the context of the environment in which an electronic device is located. Illustrating by example, the near field communication circuit 603 may obtain information such as weather information and location information. If, for example, a user is at a museum, they may be standing near an exhibit that can be identified with near field communication. This identification can indicate that the electronic device is both indoors and at a museum. Accordingly, if the user requests additional information about an artist or a painting, there is a higher probability that the question is a device command asking the one or more processors (114) to search for than information with a web browser. Alternatively, the near field communication circuit 603 can be used to receive contextual information from kiosks and other electronic devices. The near field communication circuit 603 can also be used to obtain image or other data from social media networks. Examples of suitable near field communication circuits include Bluetooth communication circuits, IEEE 801.11 communication circuits, infrared communication circuits, magnetic field modulation circuits, and Wi-Fi circuits.

Another example of a physical sensor 120 is the motion detector 604. Illustrating by example, an accelerometer, gyroscopes, or other device can be used as a motion detector 604 in an electronic device. Using an accelerometer as an example, an accelerometer can be included to detect motion of the electronic device. Additionally, the accelerometer can be used to sense some of the gestures of the user, such as one talking with their hands, running, or walking.

The motion detector 604 can also be used to determine the spatial orientation of an electronic device as well in three-dimensional space by detecting a gravitational direction. In addition to, or instead of, an accelerometer, an electronic compass can be included to detect the spatial orientation of the electronic device relative to the earth's magnetic field. Similarly, one or more gyroscopes can be included to detect rotational motion of the electronic device.

Another example of a physical sensor 120 is a force sensor 605. The force sensor can take various forms. For example, in one embodiment, the force sensor comprises resistive switches or a force switch array configured to detect contact with either the display or the housing of an electronic device. The array of resistive switches can function as a force-sensing layer, in that when contact is made with either the surface of the display or the housing of the electronic device, changes in impedance of any of the switches may be detected. The array of switches may be any of resistance sensing switches, membrane switches, force-sensing switches such as piezoelectric switches, or other equivalent types of technology. In another embodiment, the force sensor can be capacitive. In yet another embodiment, piezoelectric sensors can be configured to sense force as well. For example, where coupled with the lens of the display, the piezoelectric sensors can be configured to detect an amount of displacement of the lens to determine force. The piezoelectric sensors can also be configured to determine force of contact against the housing of the electronic device rather than the display.

Another example of physical sensors 120 includes proximity sensors. The proximity sensors fall in to one of two camps: active proximity sensors and "passive" proximity sensors. These are shown as proximity detector components 606 and proximity sensor components 607 in FIG. 6. Either the proximity detector components 606 or the proximity sensor components 607 can be generally used for gesture control and other user interface protocols, some examples of which will be described in more detail below.

As used herein, a "proximity sensor component" comprises a signal receiver only that does not include a corresponding transmitter to emit signals for reflection off an object to the signal receiver. A signal receiver only can be used due to the fact that a user's body or other heat generating object external to device, such as a wearable electronic device worn by user, serves as the transmitter. Illustrating by example, in one the proximity sensor components 607 comprise a signal receiver to receive signals from objects external to the housing of an electronic device. In one embodiment, the signal receiver is an infrared signal receiver to receive an infrared emission from an object such as a human being when the human is proximately located with the electronic device. In one or more embodiments, the proximity sensor component is configured to receive infrared wavelengths of about four to about ten micrometers. This wavelength range is advantageous in one or more embodiments in that it corresponds to the wavelength of heat emitted by the body of a human being.

Additionally, detection of wavelengths in this range is possible from farther distances than, for example, would be the detection of reflected signals from the transmitter of a proximity detector component. In one embodiment, the proximity sensor components 607 have a relatively long detection range so as to detect heat emanating from a person's body when that person is within a predefined thermal reception radius. For example, the proximity sensor component may be able to detect a person's body heat from a distance of about ten feet in one or more embodiments. The ten-foot dimension can be extended as a function of designed optics, sensor active area, gain, lensing gain, and so forth.

Proximity sensor components 607 are sometimes referred to as a "passive IR system" due to the fact that the person is the active transmitter. Accordingly, the proximity sensor component 607 requires no transmitter since objects disposed external to the housing deliver emissions that are received by the infrared receiver. As no transmitter is required, each proximity sensor component 607 can operate at a very low power level.

In one embodiment, the signal receiver of each proximity sensor component 607 can operate at various sensitivity levels so as to cause the at least one proximity sensor component 607 to be operable to receive the infrared emissions from different distances. For example, the one or more processors (114) can cause each proximity sensor component 607 to operate at a first "effective" sensitivity so as to receive infrared emissions from a first distance. Similarly, the one or more processors (114) can cause each proximity sensor component 607 to operate at a second sensitivity, which is less than the first sensitivity, so as to receive infrared emissions from a second distance, which is less than the first distance. The sensitivity change can be made by causing the one or more processors (114) to interpret readings from the proximity sensor component 607 differently.

By contrast, proximity detector components 606 include a signal emitter and a corresponding signal receiver. While each proximity detector component 606 can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components 606 comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

In one or more embodiments, each proximity detector component 606 can be an infrared proximity sensor set that uses a signal emitter that transmits a beam of infrared light that reflects from a nearby object and is received by a corresponding signal receiver. Proximity detector components 606 can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

Another example of a physical sensor is a moisture detector 608. A moisture detector 608 can be configured to detect the amount of moisture on or about the display or the housing of the electronic device. This can indicate various forms of context. Sometimes, it can indicate rain or drizzle in the environment about the electronic device. Accordingly, if a user is frantically asking "Call a cab!" the fact that moisture is present may increase the likelihood that this ask is a device command. The moisture detector 608 can be realized in the form of an impedance sensor that measures impedance between electrodes. As moisture can be due to external conditions, e.g., rain, or user conditions, perspiration, the moisture detector 608 can function in tandem with ISFETS configured to measure pH or amounts of NaOH in the moisture or a galvanic sensor 609 to determine not only the amount of moisture, but whether the moisture is due to external factors, perspiration, or combinations thereof.

An intelligent imager 610 can be configured to capture an image of an object and determine whether the object matches predetermined criteria. For example, the intelligent imager 610 operate as an identification module configured with optical recognition such as include image recognition, character recognition, visual recognition, facial recognition, color recognition, shape recognition and the like. Advantageously, the intelligent imager 610 can be used as a facial recognition device to determine the identity of one or more persons detected about an electronic device.

For example, in one embodiment when the one or more proximity sensor components 607 detect a person, the intelligent imager 610 can capture a photograph of that person. The intelligent imager 610 can then compare the image to a reference file stored in memory (115), to confirm beyond a threshold authenticity probability that the person's face sufficiently matches the reference file. Beneficially, optical recognition allows the one or more processors (114) to execute control operations only when one of the persons detected about the electronic device are sufficiently identified as the owner of the electronic device.

In addition to capturing photographs, the intelligent imager 610 can function in other ways as well. For example, in some embodiments the intelligent imager 610 can capture multiple successive pictures to capture more information that can be used to determine social cues. Alternatively, the intelligent imager 610 can capture or video frames, with or without accompanying metadata such as motion vectors. This additional information captured by the intelligent imager 610 can be used to detect richer social cues that may be inferred from the captured data.

A barometer 611 can sense changes in air pressure due to environmental and/or weather changes. In one embodiment, the barometer 611 includes a cantilevered mechanism made from a piezoelectric material and disposed within a chamber. The cantilevered mechanism functions as a pressure sensitive valve, bending as the pressure differential between the chamber and the environment changes. Deflection of the cantilever ceases when the pressure differential between the chamber and the environment is zero. As the cantilevered material is piezoelectric, deflection of the material can be measured with an electrical current.

A gaze detector 612 can comprise sensors for detecting the user's gaze point. The gaze detector 612 can optionally include sensors for detecting the alignment of a user's head in three-dimensional space. Electronic signals can then be delivered from the sensors to the gaze detection processing for computing the direction of user's gaze in three-dimensional space. The gaze detector 612 can further be configured to detect a gaze cone corresponding to the detected gaze direction, which is a field of view within which the user may easily see without diverting their eyes or head from the detected gaze direction. The gaze detector 612 can be configured to alternately estimate gaze direction by inputting to the gaze detection processing images representing a photograph of a selected area near or around the eyes. It will be clear to those of ordinary skill in the art having the benefit of this disclosure that these techniques are explanatory only, as other modes of detecting gaze direction can be substituted in the gaze detector 612 of FIG. 6.

A light sensor 613 can detect changes in optical intensity, color, light, or shadow in the environment of an electronic device. This can be used to make inferences about context such as weather or other cues. For example, if the light sensor 613 detects low-light conditions in the middle of the day when the location detector 602 indicates that the electronic device is outside, this can be due to cloudy conditions, fog, or haze. An infrared sensor can be used in conjunction with, or in place of, the light sensor 613. The infrared sensor can be configured to detect thermal emissions from an environment about an electronic device. Where, for example, the infrared sensor detects heat on a warm day, but the light sensor detects low-light conditions, this can indicate that the electronic device is in a room where the air conditioning is not properly set. Similarly, a temperature sensor 614 can be configured to monitor temperature about an electronic device.

The physical sensors 120 can also include an audio capture device 615. In one embodiment, the audio capture device 615 includes one or more microphones to receive acoustic input. While the one or more microphones can be used to sense voice input, voice commands, and other audio input, in some embodiments they can be used as environmental sensors to sense environmental sounds such as rain, wind, and so forth.

In one embodiment, the one or more microphones include a single microphone. However, in other embodiments, the one or more microphones can include two or more microphones. Where multiple microphones are included, they can be used for selective beam steering to, for instance, determine from which direction a sound emanated. Illustrating by example, a first microphone can be located on a first side of the electronic device for receiving audio input from a first direction, while a second microphone can be placed on a second side of the electronic device for receiving audio input from a second direction. The one or more processors (114) can then select between the first microphone and the second microphone to beam steer audio reception toward the user. Alternatively, the one or more processors (114) can process and combine the signals from two or more microphones to perform beam steering.

In one embodiment, the audio capture device 615 comprises an "always ON" audio capture device. As such, the audio capture device 615 is able to capture audio input at any time that an electronic device is operational. As noted above, in one or more embodiments, the one or more processors, which can include a digital signal processor, can identify whether one or more device commands are present in the audio input captured by the audio capture device 615.

One further example of the physical sensors 120 is a hygrometer 616. The hygrometer 616 can be used to detect humidity, which can indicate that a user is outdoors or is perspiring. As noted above, the illustrative physical sensors of FIG. 6 are not comprehensive. Numerous others could be added. For example, a wind-speed monitor could be included to detect wind. Accordingly, the physical sensors 120 of FIG. 6 are illustrative only, as numerous others will be obvious to those of ordinary skill in the art having the benefit of this disclosure.

Turning briefly now to FIG. 7, illustrated therein are various examples of context sensors 121. As with FIG. 6, the examples shown in FIG. 7 do not constitute a comprehensive list. Numerous other context sensors 121 will be obvious to those of ordinary skill in the art having the benefit of this disclosure.

In one embodiment, a mood detector 701 can infer a person's mood based upon contextual information received from the physical sensors (120). For example, if the intelligent imager (501) captures a picture, multiple successive pictures, video, or other information from which a person can be identified as the owner of the electronic device, and she is crying in the picture, multiple successive pictures, video, or other information, the mood detector 701 can infer that she is either happy or sad. Similarly, if the audio capture device captures a user's voice and the user is yelling or cursing, the mood detector 701 can infer that the user is likely angry or upset.

The emotional detector 702 can function in a similar manner to infer a person's emotional state from contextual information received from the physical sensors (120). Illustrating by example, if the intelligent imager (501) captures a picture, multiple successive pictures, video, or other information relating to of the owner of an electronic device, the emotional detector 702 can infer their silently communicated emotional state, e.g., joy, anger, frustration, and so forth. This can be inferred from, for example, facial gestures such as a raised eyebrow, grin, or other feature. In one or more embodiments, such emotional cues can indicate the user is intending to issue a command to the electronic device. Alternatively, emotion can be detected from voice inflections, or words used. If someone screams, "I am mad at you," there are likely negative emotional issues involved, for example.

Calendar information and events 720 can be used to detect social cues. If, for example, a calendar event indicates that a birthday party is occurring, this can imply festive and jovial social cues. However, if a funeral is occurring, it is unlikely that a user will be issuing device commands to an electronic device as funerals tend to be quiet affairs.

Wellness information 703 can be used to detect social cues. If, for example, wellness information 703 indicates that a person's heart rate is high, and they are perspiring, and the location information 715 indicates that a person is in an alley of a city, and the time-of-day information 708 indicates that its 3 AM, the person may be under duress. Accordingly, the command "Call 911" is highly likely to be a device command.

Alarm information 704 can be used to detect social cues. If an alarm has just sounded at 6:00 AM, the command "snooze" is likely to be a device command. Personal identification information 705 can be used to detect social cues as well. If a person is a diabetic, and wellness sensors show them to be clammy and sweaty, this could be due to low insulin. Accordingly, the command "Call 911" is highly likely to be a device command.

Device usage data 706 can indicate social cues. If a person is searching the web, and an incoming call is received, the command "decline" is likely to be a device command. Energy storage 707 within an electronic device can be used to indicate a social cue. Device operating mode information 709 can be used in a similar fashion. When energy storage drops to, for example, ten percent, the command "shut down all non-critical apps" is likely to be a device command.

Consumer purchase information 711 can certainly indicate social cues. If, for example, a person is a sommelier and frequently purchases wine, when viewing a web browser and finding a bottle of '82 Lafite for under $1000, the command "buy that wine now" is likely to be a device command.

Device usage profiles 712 can be used to infer social cues as well. If, for example, a person never uses an electronic device between 10:00 PM and 6:00 AM due to the fact that they are sleeping, if they happen to talk in their sleep and say, "order a pizza—I'm starving," this is not likely to be a device command.

Organizations can have formal rules and policies 710, such as meetings cannot last more than an hour without a break, one must take a lunch break between noon and 2:00 PM, and brainstorming sessions occur every morning between 9:00 and 10:00 AM. Similarly, families can have similar rules and policies 713, such as dinner occurs between 6:00 and 7:00 PM. This information can be used to infer social cues such as whether a person is likely to be in conversation with other people. When this is the case, spoken questions are less likely to be device commands. By contrast, when a user is likely to be alone, spoken commands are more likely to be device commands.

Application data 734 can indicate social cues. If a person frequently interacts with word processing applications during the day, the commands "cut", and "paste" are more likely to be device commands that they would for someone who instead plays video games with flying birds. Device settings 716 can indicate social cues as well. If a user sets their electronic device to alarm clock mode, it may be likely that they are sleeping and are not issuing device commands.

Social media 718 in formation can indicate social cues. For example, in one embodiment information relating to multi-modal social cues from an environment about the electronic device can be inferred from retrieving information from a social media server. For example, real time searches, which may be a keyword search, image search, or other search, of social media services can find images, posts, and comments relating to a location determined by the location information 715. Images posted on a social media service server that were taken at the same location may reveal multi-modal social cues. Alternatively, commentary regarding the location may imply social cues. Information from third party servers 717 can be used in this manner as well.

One further example of the context sensors 121 is repetitive behavior information 719. If, for example, a person always stops at a coffee shop between 8:00 and 8:15 AM on their way to work, the command, "Pay for the coffee," is likely to be a device command. As with FIG. 6 above, the physical sensors of FIG. 6 do not constitute a comprehensive list. Context sensors 121 can be any type of device that infers context from data of the electronic device. The context sensors 121 can be configured as either hardware components, or alternatively as combinations of hardware components and software components. The context sensors 121 can analyze information to, for example, not only detect the user, but also to determine the social cues and emotional effect of other people in the vicinity of the electronic device, thereby further informing inferences about the user's intent and what executable control commands are appropriate given this composite social context.

The context sensors 121 can be configured to collect and analyze non-physical parametric data. While some are shown in FIG. 7, numerous others could be added. Accordingly, the context sensors 121 of FIG. 7 are illustrative only, as numerous others will be obvious to those of ordinary skill in the art having the benefit of this disclosure. It should be noted that one or both of the physical sensors (120) or the context sensors 121, when used in combination, can be cascaded in a predefined order to detect a plurality of multi-modal social cues to determine whether the device command is intended for the electronic device.

Turning now back to FIG. 1, in one or more embodiments a heuristic sensor processor 119 can be operable with both the physical sensors 120 and the context sensors 121 to detect, infer, capture, and otherwise determine when multi-modal social cues are occurring in an environment about an electronic device. In one embodiment, the heuristic sensor processor 119 determines, from one or both of the physical sensors 120 or the context sensors 121, assessed contexts and frameworks using adjustable algorithms of context assessment employing information, data, and events. These assessments may be learned through repetitive data analysis. Alternatively, a user may employ the user interface of the electronic device 100 to enter various parameters, constructs, rules, and/or paradigms that instruct or otherwise guide the heuristic sensor processor 119 in detecting multi-modal social cues, emotional states, moods, and other contextual information. The heuristic sensor processor 119 can comprise an artificial neural network or other similar technology in one or more embodiments.

In one or more embodiments, the heuristic sensor processor 119 is operable with the one or more processors 114. In some embodiments, the one or more processors 114 can control the heuristic sensor processor 119. In other embodiments, the heuristic sensor processor 119 can operate independently, delivering information gleaned from detecting multi-modal social cues, emotional states, moods, and other contextual information to the one or more processors 114. The heuristic sensor processor 119 can receive data from one or both of the physical sensors 120 or the context sensors 121. In one or more embodiments, the one or more processors 114 are configured to perform the operations of the heuristic sensor processor 119.

In one or more embodiments, the block diagram schematic 112 includes a voice interface engine 122. The voice interface engine 122 can include hardware, executable code, and speech monitor executable code in one embodiment. The voice interface engine 122 can include, stored in memory 115, basic speech models, trained speech models, or other modules that are used by the voice interface engine 122 to receive and identify voice commands that are received with audio input captured by an audio capture device. In one embodiment, the voice interface engine 122 can include a voice recognition engine. Regardless of the specific implementation utilized in the various embodiments, the voice interface engine 122 can access various speech models to identify speech commands.

In one embodiment, the voice interface engine 122 is configured to implement a voice control feature that allows a user to speak a specific device command to cause the one or more processors 114 to execute a control operation. For example, the user may say, "How tall is the Willis Tower?" This question comprises a device command requesting the one or more processors to retrieve, with the communication device 116, information from a remote server, perhaps across the Internet, to answer the question. Consequently, this device command can cause the one or more processors 114 to access an application module, such as a web browser, to search for the answer and then deliver the answer as audible output via an audio output of the other components 124. In short, in one embodiment the voice interface engine 122 listens for voice commands, processes the commands and, in conjunction with the one or more processors 114, returns an output that is the result of the user's intent.

The block diagram schematic 112 can also include an image/gaze detection-processing engine 123. The image/gaze detection-processing engine 123 can be operable with the physical sensors 120, such as a camera or intelligent imager, to process information to detect a user's gaze point. The image/gaze detection-processing engine 123 can optionally include sensors for detecting the alignment of a user's head in three-dimensional space. Electronic signals can then be delivered from the sensors to the image/gaze detection-processing engine 123 for computing the direction of user's gaze in three-dimensional space. The image/gaze detection-processing engine 123 can further be configured to detect a gaze cone corresponding to the detected gaze direction, which is a field of view within which the user may easily see without diverting their eyes or head from the detected gaze direction. The image/gaze detection-processing engine 123 can be configured to alternately estimate gaze direction by inputting images representing a photograph of a selected area near or around the eyes.

The one or more processors 114 may also generate commands or execute control operations based upon information received from a combination of the physical sensors 120, the context sensors 121, the flexible display 104, the other components 124, and/or the other input devices. Alternatively, the one or more processors 114 can generate commands or execute control operations based upon information received from the one or more sensors or the flexible display 104 alone. Moreover, the one or more processors 114 may process the received information alone or in combination with other data, such as the information stored in the memory 115.

Other components 124 operable with the one or more processors 114 can include output components such as video outputs, audio outputs, and/or mechanical outputs. Examples of output components include audio outputs such as speaker port, earpiece speaker, or other alarms and/or buzzers and/or a mechanical output component such as vibrating or motion-based mechanisms. Still other components will be obvious to those of ordinary skill in the art having the benefit of this disclosure.

As noted above, in one or more embodiments a blade assembly 102 is coupled to the flexible display 104. In contrast to sliding devices that include multiple device housings, the electronic device 100 of FIG. 1 includes a single device housing 101 to which the blade assembly 102 is coupled. The blade assembly 102 is configured as a mechanical chassis that allows the flexible display 104 to translate along a translation surface defined by major and minor surfaces of the single device housing 101. In one or more embodiments, the blade assembly 102 also provides a mechanical support for portions 130 of the flexible display 104 that extend beyond the top edge 131 of the single device housing 101 when the blade assembly 102 and flexible display 104 are in the extended position shown in FIG. 1. When the display roller mechanism 105 actuates, it causes the blade assembly 102 and the flexible display 104 to translate 301 along the rear major surface 103, the bottom minor surface, and the front major surface between the extended position shown in FIG. 1, the retracted position shown in FIG. 3, and the peek position shown in FIG. 5.

The blade assembly 102 can include a blade substrate 125 that includes both flexible portions and rigid portions, and that is positioned between the flexible display 104 and the translation surface defined by the single device housing 101. The blade substrate 125 can also comprise a silicone border 127 that surrounds and protects the edges of the flexible display 104. In one or more embodiments, the blade substrate 125 comprises a steel backer plate with the silicone border 127 co-molded around the perimeter of the steel backer plate. In one or more embodiments, a low-friction dynamic bending laminate stack 128 and blade 126 are positioned between the blade assembly 102 and the translation surfaces defined by the single device housing 101.

In one or more embodiments, the blade substrate 125 is partially rigid and partially flexible. Illustrating by example, portions of the blade substrate 125 that slide along the major surfaces of the single device housing 101 are configured to be substantially rigid, while portions of the blade substrate 125 that pass around the minor surfaces of the single device housing 101 are configured to be flexible so that they can curl around those minor surfaces. In one or more embodiments, some portions of the blade substrate 125 abut the translation surfaces defined by the single device housing 101 while other portions abut the display roller mechanism 105, which is positioned at the bottom minor surface of the single device housing 101 in this illustrative embodiment.

In one or more embodiments, the blade 126 and the low-friction dynamic bending laminate stack 128 are positioned between the blade assembly 102 and the translation surfaces defined by the single device housing 101. The blade 126 supports portions of the blade assembly 102 and flexible display 104 that extend beyond the top edge 131 of the single device housing 101 when the blade assembly 102 is transitioned to the extended position shown in FIG. 1. Since this blade 126 needs to be rigid to support those portions of the blade assembly 102 and the flexible display 104, it is not able to bend around the display roller mechanism 105. To prevent gaps or steps from occurring where the blade 126 terminates, in one or more embodiments a low-friction dynamic bending laminate stack 128 spans the remainder of the blade assembly 102 and abuts the transition surfaces defined by the single device housing 101.

The blade assembly 102 can be fixedly coupled to the flexible display 104 by an adhesive or other coupling mechanisms. Where the blade substrate 132 defines both rigid and flexible portions. The blade substrate 132 can define a first rigid section extending along the major surfaces of the single device housing 101 and a second flexible section extending configured to wrap around the minor surfaces of the single device housing 101 where the display roller mechanism 105 is positioned.

Figure 5:
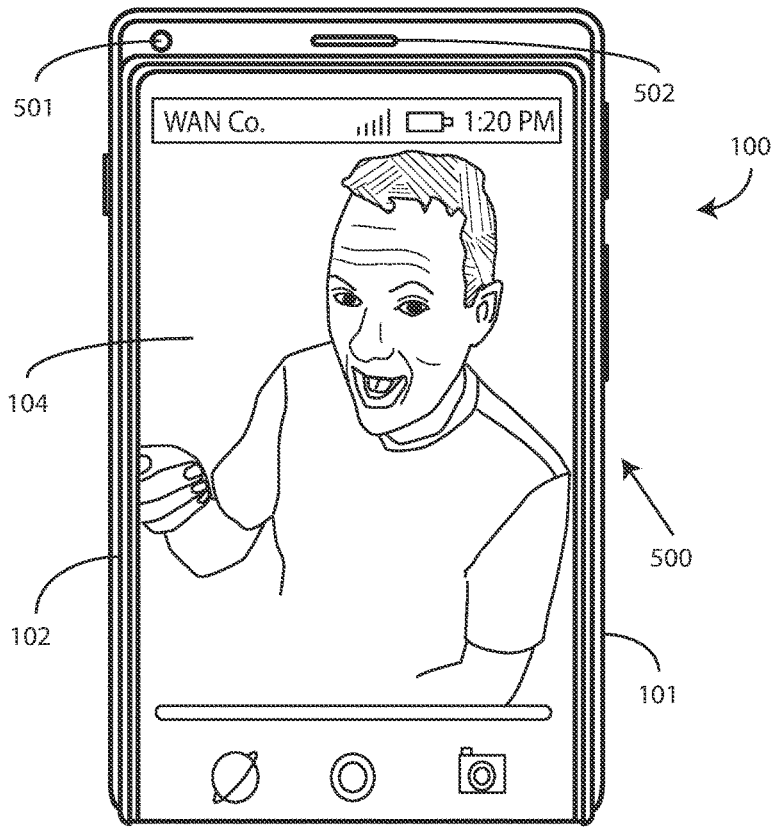
FIG. 5 illustrates the explanatory electronic device of FIG. 2 with the translating display moved to a third sliding position known as the "peek" position that exposes an image capture device positioned under the translating display when the translating display is in the first sliding position or second sliding position.

In one or more embodiments, the blade assembly 102 defines a mechanical assembly providing a slider framework that allows the flexible display 104 to move between the extended position of FIG. 1, the retracted position of FIG. 3, and the peek position of FIG. 5. As used herein, the term "framework" takes the ordinary English definition of a mechanical support structure supporting the other components coupled to the slider framework. These components can include the blade 126, the silicone border 127, and the low-friction dynamic bending laminate stack 128. Other components can be included as well. Illustrating by example, this can include electronic circuits for powering the flexible display 104. In one or more embodiments, it can further include a tensioner that ensures that the flexible display 104 remains flat against the single device housing 101 when translating.

In one or more embodiments, the display roller mechanism 105 that causes a first portion of the blade assembly 102 and the flexible display 104 display (shown on the rear side of the electronic device 100 in FIG. 1) and a second portion of the blade assembly 102 and the flexible display 104 (positioned on the front side of the electronic device 100 in FIG. 1) to slide symmetrically in opposite directions along the translation surfaces defined by the single device housing 101.

Thus, the electronic device 100 of FIG. 1 includes a single device housing 101 with a flexible display 104 incorporated into a blade assembly 102. The blade assembly 102 is then coupled to a translation mechanism defined by the display roller mechanism 105 and situated within the single device housing 101. In the explanatory embodiment of FIG. 1, the display roller mechanism 105 is situated at the bottom edge of the single device housing 101.

In one or more embodiments, in response to the receipt of a pinch gesture or zoom gesture, as will be described in more detail below with reference to FIGS. 23-34, the translation mechanism defined by the display roller mechanism 105 is operable to transition the blade assembly 102 around the surfaces of the single device housing 101 between the extended position of FIG. 1 where the blade 126 of the blade assembly 102 extends distally from the single device housing 101 and a retracted position (shown in FIG. 3) where the blade assembly 102 abuts the single device housing 101 with the flexible display 104 wrapping around the surfaces of the single device housing 101. The translation mechanism can optionally also translate the blade assembly 102 to a "peek" position (shown in FIG. 5) where movement of the translation mechanism defined by the display roller mechanism 105 causes the blade assembly 102 to reveal an image capture device situated beneath the blade assembly 102 on the front of the single device housing 101.

In other embodiments, as will be described below, translation of the blade assembly 102 can be initiated by the operation of a user interface component 110. Embodiments of the disclosure contemplate that in such an electronic device 100, manual actuation of the user interface component 110 potentially delays the usability of the electronic device 100 in the new state due to the time taken to manually "inject" the trigger causing transition of the blade assembly 102 and flexible display 104 by requiring the actuation of the user interface component 110.

Advantageously, embodiments of the disclosure provide systems and methods that automatically and pre-emptively move the flexible display 104 to the optimal state based upon pinch and zoom gestures delivered to the flexible display 104, rather than requiring the operation of user interface components 110. Illustrating by example, in one or more embodiments the one or more processors 114 of the electronic device 100 detect using the flexible display 104, user input defining a pinch gesture or a zoom gesture. In one or more embodiments, the one or more processors 114 then cause the translation mechanism to translate the blade assembly 102 toward the extended position or the retracted position depending upon the direction of the pinch gesture. In one or more embodiments, the translation in response to a pinch gesture occurs only when the electronic device 100 is in an unlocked state when the pinch gesture is received.

After such a translation, the one or more processors 114 can optionally present new content. In one or more embodiments, the one or more processors 114 present a home screen presentation on a front-facing portion of the flexible display 104 while the user input is received, and after the translation, can present additional content on a front-facing area of the flexible display 104 that is exposed by the translating. In one or more embodiments, the additional content comprises an application tray that includes one or more user actuation targets corresponding to applications that are revealed on the front-facing area that is revealed.

The one or more user actuation targets can define an application set that is placed within the application tray. This application set can comprise a set of user-defined applications in one or more embodiments. In other embodiments, the application set can comprise a group of frequently used applications. In still other embodiments, the application set can comprise all applications available for operation on the one or more processors 114.

In other embodiments, the one or more processors 114 may cause the blade assembly 102 and flexible display 104 to transition to the extended position when a user delivers an expanding pinch gesture while an application is operating in the foreground. Illustrating by example, the user may deliver an expanding pinch gesture in an email application to open an editor such as writing an email or writing a text message.

Translation of the blade assembly 102 and flexible display 104 to the retracted position can occur in a similar fashion. In one or more embodiments, the one or more processors 114 of the electronic device 100 can automatically translate the blade assembly 102 and the flexible display 104 back to the retracted position when the user delivers an additional user input defining another pinch gesture occurring in the opposite direction of the first pinch gesture that was received. The one or more processors 114 can cause the flexible display 104 to move toward the retracted position when this occurs.

Advantageously, embodiments of the disclosure provide intuitive operation of a translating display in an electronic device 100. In cases where automatic translation of the translating display is triggered, the only user action is required for the translating display to change positions is a simple pinch or zoom gesture. Thereafter, the device automatically changes to the position potentially desired by the user.

In one or more embodiments, the one or more processors 114 leverage this capability to automatically adapt the viewable display size from the front of the electronic device 100 to accommodate the presentation of additional content items that were not previously presented on the flexible display 104. Once an additional area amount of the flexible display 104 is revealed by translation, the one or more processors 114 can then present this content on the flexible display 104. Advantageously, this ability to open application trays, provide additional content or user interface controls in an active foreground application, or simply accommodate additional content presentations in response to a pinch gesture or zoom gesture by changing the position of the blade assembly 102 relative to the single device housing 101 ensures that the user has access to required content easily without the clutter of superfluous content.

In one or more embodiments, applications operating on the one or more processors 114 can identify characteristics common to their operating context with the one or more processors 114 causing the display roller mechanism 105 to move the blade assembly 102 in response to a pinch gesture to accommodate content having those characteristics. Advantageously, this allows content to be presented in accordance with the optimal user experience for a given application's design.

Accordingly, in one or more embodiments the one or more processors 114 facilitate an automatic optimal display size adjustment that occurs in response to a pinch gesture or zoom gesture. The one or more processors 114 can then cause the display roller mechanism 105 to adjust the blade assembly 102 such that the front-facing portion of the flexible display 104 is optimized for a display size based upon relevant content indicated by the application operating in the foreground.

As shown in FIG. 1, the blade assembly 102 is able to slide around the single device housing 101 such that the blade 126 slides away from the single device housing 101 to change the apparent overall length of the flexible display 104 as viewed from the front of the electronic device 100. By contrast, in other states (such as the one shown in FIG. 3) the blade assembly 102 can slide in an opposite direction around the single device housing 101 to a retracted position with similar amounts of the flexible display 104 visible on the front side of the electronic device 100 and the rear side of the electronic device 100.

In FIG. 1, the electronic device 100 includes a single device housing 101 with a blade assembly 102 coupled to two major surfaces of the single device housing 101 and wrapping around at least one minor surface of the electronic device 100 where the display roller mechanism 105 is situated. This allows the blade assembly 102 to slide relative to the single device housing 101 between a retracted position of FIG. 3, the extended position of FIG. 1, and the peek position of FIG. 5 revealing a front-facing image capture device.

It is to be understood that FIG. 1 is provided for illustrative purposes only and for illustrating components of one electronic device 100 in accordance with embodiments of the disclosure and is not intended to be a complete schematic diagram of the various components required for an electronic device. Therefore, other electronic devices in accordance with embodiments of the disclosure may include various other components not shown in FIG. 1 or may include a combination of two or more components or a division of a particular component into two or more separate components, and still be within the scope of the present disclosure.

Turning now to FIG. 2, illustrated therein is the electronic device 100 in the extended position 200 that was also shown in FIG. 1. In the extended position 200, the blade (126) slides outward and away from the single device housing 101, thereby revealing more and more portions of the flexible display 104. In such a configuration, the portions of flexible display 104 passing around the display roller mechanism (105) elongated into a flat position as they pass along the translation surface defined by the front of the single device housing 101.

Turning now to FIGS. 3-4, illustrated therein is the electronic device 100 with the flexible display 104 in the retracted position 300. FIG. 3 illustrates the front side of the electronic device 100, while FIG. 4 illustrates the rear side.

In this state, blade (126) slides back toward, and then along, the translation surface defined by the single device housing 101. This causes the apparent overall length of the flexible display 104 to get shorter as more and more portions of the flexible display 104 pass around the display roller mechanism (105) positioned at the bottom of the single device housing 101 and across the translation surface defined by the rear side of the single device housing 101.

Turning now to FIG. 5, illustrated therein is the electronic device 100 with the flexible display in the peek position 500. When in the peek position, the blade assembly 102 and the flexible display 104 translate past the retracted position (300) of FIG. 3. In one or more embodiments, when this occurs, the blade assembly 102 and the flexible display 104 reveal an image capture device 501 that is situated beneath the blade assembly 102 and the flexible display 104 when they are in the retracted position (300) of FIG. 3. In this illustrative embodiment, a loudspeaker 502 is also revealed.

Advantageously, by positioning the image capture device 501 beneath the blade assembly 102 and the flexible display 104 when these components are in either the retracted position (300) of FIGS. 3-4 or the extended position (200) of FIG. 2, a user of the electronic device 100 is assured of privacy due to the fact that the image capture device 501 is not able to see through the blade (126) of the blade assembly 102. Accordingly, even if the electronic device 100 is accessed by a hacker or other nefarious actor, the user can be assured that the image capture device 501 cannot capture images or videos while the blade assembly 102 and flexible display 104 are in the retracted position (300), the extended position (200), or in positions therebetween. Only when the blade assembly 102 and the flexible display 104 transition to the peek position 500, thereby revealing the image capture device 501, can the image capture device 501 capture front-facing images or front-facing videos.

Referring collectively to FIGS. 2-5, it can be seen that the electronic device 100 includes a single device housing with a flexible display 104 incorporated into a blade assembly 102. The blade assembly 102 is coupled to a translation mechanism situated within the single device housing 101.

In response to actuation of a user interface device, one example of which is a button positioned on a side of the single device housing 101, or alternatively automatically in response to a pinch gesture or zoom gesture as described below with reference to FIGS. 23-34, the translation mechanism is operable to transition the blade assembly 102 around the surfaces of the single device housing 101 between the extended position 200 where the blade (126) of the blade assembly 102 extends distally from the single device housing 101, the retracted position 300 where the blade assembly 102 abuts the single device housing 101 with the flexible display 104 and blade assembly 102 wrapping around the surfaces of the single device housing 101, optionally the peek position 500 where movement of the translation mechanism causes the blade assembly 102 to reveal the image capture device 501 (and loudspeaker 502 in this example) situated beneath the blade assembly 102 on the front side of the single device housing 101, or even positions therebetween, such as would be the case when the one or more processors (114) of the electronic device 100 are attempting to accommodate a content presentation corresponding to the opening of an application tray on the flexible display 104.

Another feature that can be seen in reviewing FIGS. 2-5 collectively is the how the presentation of content changes as a function of the position of the blade assembly 102. Embodiments of the disclosure contemplate that the position of the blade assembly 102 and flexible display 104 relative to the single device housing 101 change the amount of the flexible display 104 that is visible from the front, visible from the rear, and visible in the curved end portions. Said differently, the viewable size of the flexible display 104 from each side of the electronic device 100 will vary as a function of the position of the blade assembly 102 relative to the single device housing 101. Advantageously, embodiments of the disclosure provide applications, methods, and systems that dynamically resize and adjust the interface layouts and content presentations.

This can be accomplished by resizing a primary visible portion, e.g., the front-facing portion shown in FIGS. 2, 3, and 5, of the flexible display 104. Applications can be windowed on this primary area of the flexible display 104, which will resize as the flexible display 104 as it transitions between the extended position 200 of FIG. 2, the retracted position 300 of FIGS. 3-4, and the peek position 500 of FIG. 5.

In FIGS. 2-5, the one or more processors (114) of the electronic device 100 segment the flexible display 104 into three, individual, usable parts. These include the front-facing portion of the flexible display 104 shown in FIGS. 2, 3, and 5, the rear-facing portion of the flexible display 104 shown in FIG. 5, and the curvilinear portion of the flexible display 104 situated at the bottom of the electronic device 100 and wrapping around the rotor, shown in FIGS. 2-5. This curvilinear portion of the flexible display 104 is sometimes referred to as the "roll edge" portion of the display.

In one or more embodiments, each of these usable parts are dynamically remapped as the flexible display 104 changes position relative to the single device housing 101. In one or more embodiments, applications can request a window on the usable portion upon which it intends to present content.

In one or more embodiments, the orientation of the rear-facing portion and the roll edge portion is not the same as that of the front-facing portion when the flexible display 104 translates along the single device housing 101 from the extended position 200 shown in FIG. 2 to the retracted position 300 shown in FIGS. 3-4 or the peek position 500 of FIG. 5. To address this, as can be seen by comparing FIGS. 3-4, in one or more embodiments content presented on the rear-facing portion is rotated by 180-degrees so that its "up" side is the same as the "up" side on the front-facing portion.

In one or more embodiments, the orientation of content presented on the roll edge portion can change based upon the orientation of the electronic device 100. If, for example, the front-facing side is up the orientation of content presented on the roll edge will have a first orientation. By contrast, if the rear-facing side is up, the orientation of that same content presented on the roll edge will have a second orientation that is rotated 180-degrees relative to the first orientation.

In one or more embodiments, any content presented on the front-facing portion of the flexible display 104 is oriented in accordance with user preferences. In one or more embodiments, this front-facing portion is oriented in accordance with the orientation of the electronic device 100 in three-dimensional space.

On the roll edge portion of the translating display, in one or more embodiments this segment is oriented in the same orientation as the front-facing portion when the electronic device 100 is not oriented with the front-facing side facing the negative z-direction in three-dimensional space (it is rotated by 180-degrees when this is the case). In one or more embodiments, the roll edge portion does not obey user preferences for display orientation and auto rotate/device orientation.

In one or more embodiments, content presented on the rear-facing portion of the flexible display 104 is always rotated by 180-degrees relative to content presented on the front-facing portion when the electronic device 100 is being held vertically, as is the case, and as can be seen, in FIGS. 3-4. In one or more embodiments, the rear-facing portion does not obey user preferences for display orientation and auto-rotate/device orientation.

Accordingly, in one or more embodiments one or more processors (114) of the electronic device (100) dynamically remap multiple translating display root segments based upon the position of the flexible display 104 relative to the single device housing 101. The one or more processors 114 can independently manage orientation and rotation on each of the root segments of the flexible display 104, be they the front-facing portion, the rear-facing portion, or the roll edge portion. In one or more embodiments, this management occurs independently based upon which side of the electronic device 100 the segment is currently positioned upon, combined with sensor inputs to identify if the electronic device 100 is face down or face up.

As shown in FIG. 2, the blade assembly 102 is operable to slide around the single device housing 101 such that the blade 126 slides away from the single device housing 101 to change an overall length of the flexible display 104 as viewed from the front of the electronic device 100. As will be described below with reference to FIGS. 23-34, in one or more embodiments this happens in response to a pinch gesture. In other embodiments this happens in response to a zoom gesture. As shown in FIGS. 3-4, the blade assembly 102 can slide in an opposite direction around the single device housing 101 to a retracted position 300, optionally in response to another pinch gesture, with similar amounts of the flexible display 104 being visible on the front side of the electronic device 100 and the rear side of the electronic device 100.

Accordingly, in one or more embodiments the electronic device 100 includes a single device housing 101 with a blade assembly 102 coupled to two major surfaces of the single device housing 101 and wrapping around at least one minor surface of the electronic device 100 such that the blade assembly 102 can slide relative to the single device housing 101 between the retracted position 300, the extended position 200, and the peek position 500 revealing a front-facing image capture device 501.

Figure 8:
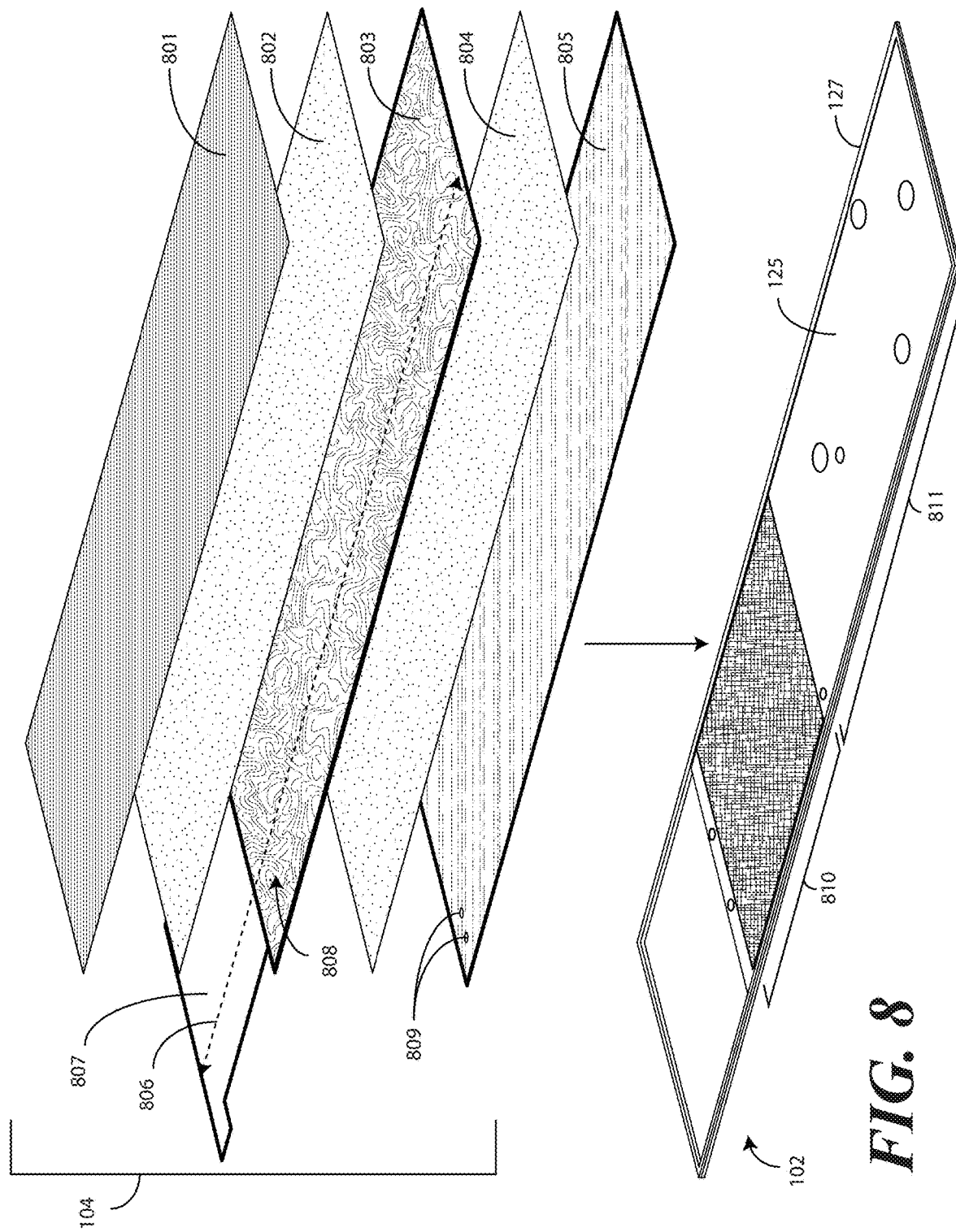
FIG. 8 illustrates portions of one explanatory display assembly in an exploded view in accordance with one or more embodiments of the disclosure.

Turning now to FIG. 8, illustrated therein is the flexible display 104 shown in an exploded view, along with the blade assembly 102. As shown in FIG. 8, in one or more embodiments the flexible display 104 comprises one or more layers that are coupled or laminated together to complete the flexible display 104. In one or more embodiments, these layers comprise a flexible protective cover 801, a first adhesive layer 802, a flexible display layer 803, a second adhesive layer 804, and a flexible substrate 805. Other configurations of layers suitable for manufacturing the flexible display 104 will be obvious to those of ordinary skill in the art having the benefit of this disclosure.

Beginning from the top of the layer stack, in one or more embodiments the flexible protective cover 801 comprises an optically transparent substrate. In one or more embodiments the flexible protective cover 801 may be manufactured from an optically transparent material such a thin film sheet of a thermoplastic material. Illustrating by example, in one embodiment the flexible protective cover 801 is manufactured from a layer of optically transparent polyamide having a thickness of about eighty microns. In another embodiment, the flexible protective cover 801 is manufactured from a layer of optically transparent polycarbonate having a thickness of about eighty microns. Other materials suitable for manufacturing the flexible protective cover 801 will be obvious to those of ordinary skill in the art having the benefit of this disclosure.

In one or more embodiments the flexible protective cover 801 functions as a fascia by defining a cover for the flexible display layer 803. In one or more embodiments the flexible protective cover 801 is optically transparent, in that light can pass through the flexible protective cover 801 so that objects behind the flexible protective cover 801 can be distinctly seen. The flexible protective cover 801 may optionally include an ultra-violet barrier. Such a barrier can be useful in improving the visibility of flexible display layer 803 in one or more embodiments.

Beneath the flexible protective cover 801 is a first adhesive layer 802. In one or more embodiments, the first adhesive layer 802 comprises an optically transparent adhesive. The optically transparent adhesive can be applied to two sides of a thin, optically transparent substrate such that the first adhesive layer 802 functions as an optically transparent layer having optically transparent adhesive on both sides. Where so configured, in one or more embodiments the first adhesive layer 802 has a thickness of about fifty microns. This optically transparent version of "double-sided tape" can then be spooled and applied between the flexible protective cover 801 and the flexible display layer 803 to couple the two together.

In other embodiments the first adhesive layer 802 will instead be applied between the flexible protective cover 801 and the flexible display layer 803 as an optically transparent liquid, gel, as a homogeneous adhesive layer, or in the form of another medium. Where so configured, the first adhesive layer 802 can optionally be cured by heat, ultraviolet light, or other techniques. Other examples of materials suitable for use as the first adhesive layer 802 will be obvious to those of ordinary skill in the art having the benefit of this disclosure. In one or more embodiments, the first adhesive layer 802 mechanically couples the flexible display layer 803 to the flexible protective cover 801.

In one or more embodiments, the flexible display layer 803 is situated between the flexible substrate 805 and the flexible protective cover 801. In one or more embodiments, the flexible display layer 803 is longer along a major axis 806 of the flexible display layer 803, and thus the flexible display 104 itself, than is the image producing portion 808 of the flexible display 104. For example, as shown in FIG. 8 the flexible display layer 803 includes a T-shaped tongue 807 that extends beyond the image producing portion 808 of the flexible display layer 803. As will be shown in FIG. 10 below, in one or more embodiments electronic circuit components configured to operate the image producing portion 808 of the flexible display layer 803, connectors, and other components can be coupled to this T-shaped tongue 807 in one or more embodiments. Thus, in this illustrative embodiment the T-shaped tongue 807 extends distally beyond terminal ends of the other layers of the flexible display 104. While the T-shaped tongue 807 is T-shaped in this illustrative embodiment, it can take other shapes as well as will be obvious to those of ordinary skill in the art having the benefit of this disclosure.

The flexible display layer 803 can optionally be touch-sensitive. In one or more embodiments, the flexible display layer 803 is configured as an organic light emitting diode (OLED) display layer. When coupled to the flexible substrate 805, the flexible display layer 803 can bend in accordance with various bending radii. For example, some embodiments allow bending radii of between thirty and six hundred millimeters. Other substrates allow bending radii of around five millimeters to provide a display that is foldable through active bending. Other displays can be configured to accommodate both bends and folds.

In one or more embodiments the flexible display layer 803 may be formed from multiple layers of flexible material such as flexible sheets of polymer or other materials. Illustrating by example, the flexible display layer 803 can include a layer of optically pellucid electrical conductors, a polarizer layer, one or more optically transparent substrates, and layers of electronic control circuitry such as thin film transistors to actuate pixels and one or more capacitors for energy storage. In one or more embodiments, the flexible display layer 803 has a thickness of about 130 microns.

In one or more embodiments, to be touch sensitive the flexible display layer 803 includes a layer including one or more optically transparent electrodes. In one or more embodiments, the flexible display layer 803 includes an organic light emitting diode layer configured to images and other information to a user. The organic light emitting diode layer can include one or more pixel structures arranged in an array, with each pixel structure comprising a plurality of electroluminescent elements such as organic light emitting diodes. These various layers can be coupled to one or more optically transparent substrates of the flexible display layer 803. Other layers suitable for inclusion with the flexible display layer 803 will be obvious to those of ordinary skill in the art having the benefit of this disclosure.

In one or more embodiments, the flexible display layer 803 is coupled to a flexible substrate 805 by a second adhesive layer 804. In other embodiments, a layer above the flexible display layer 803 can be configured with enough stiffness to make the flexible substrate 805 unnecessary. For example, in an embodiment where the flexible protective cover 801 is configured with enough stiffness to provide sufficient protection for the flexible display 104 during bending, the flexible substrate 805 may be omitted.

In one or more embodiments, the flexible substrate 805 comprises a thin layer of steel. Illustrating by example, in one or more embodiments the flexible substrate 805 comprises a steel layer with a thickness of about thirty microns. While thin, flexible steel works well in practice, it will be obvious to those of ordinary skill in the art having the benefit of this disclosure that other materials can be used for the flexible substrate 805 as well. For instance, in another embodiment the flexible substrate 805 is manufactured from a thin layer of thermoplastic material.

In one or more embodiments, to simplify manufacture, the second adhesive layer 804 is identical to the first adhesive layer 802 and comprises an optically transparent adhesive. However, since the second adhesive layer 804 is coupled between the flexible display layer 803 and the flexible substrate 805, i.e., under the flexible display layer 803, an optically transparent adhesive is not a requirement. The second adhesive layer 804 could be partially optically transparent or not optically transparent at all in other embodiments.

Regardless of whether the second adhesive layer 804 is optically transparent, in one or more embodiments the adhesive of the second adhesive layer 804 is applied to two sides of a thin, flexible substrate. Where so configured, in one or more embodiments the second adhesive layer 804 has a thickness of about fifty microns. This extremely thin version of "double-sided tape" can then be spooled and applied between the flexible display layer 803 and the flexible substrate 805 to couple the two together.

In other embodiments, as with the first adhesive layer 802, the second adhesive layer 804 will instead be applied between the flexible display layer 803 and the flexible substrate as a liquid, gel, as a homogeneous layer, or in the form of another medium. Where so configured, the second adhesive layer 804 can optionally be cured by heat, ultraviolet light, or other techniques. Other examples of materials suitable for use as the second adhesive layer 804 will be obvious to those of ordinary skill in the art having the benefit of this disclosure.

In this illustrative embodiment, the flexible display 104 is supported by not only the flexible substrate 805, but by the blade assembly 102 as well. As previously described, in one or more embodiments the blade assembly 102 includes a blade substrate 125. In one or more embodiments, the blade substrate 125 comprises a layer of steel. In one or more embodiments, the blade substrate 125 is thicker than the flexible substrate 805. Illustrating by example, in one or more embodiments when the flexible substrate 805 comprises a steel layer with a thickness of about thirty microns, the blade substrate 125 comprises a layer of steel having a thickness of about one hundred microns.

In one or more embodiments, the blade substrate 125 comprises a rigid, substantially planar support layer. Illustrating by example, the blade substrate 125 can be manufactured from stainless steel in one or more embodiments. In another embodiment, the blade substrate 125 is manufactured from a thin, rigid thermoplastic sheet. Other materials can be used in manufacturing the blade substrate 125 as well. For example, the material nitinol, which is a nickel-titanium alloy, can be used to manufacture the blade substrate 125. Other rigid, substantially planar materials will be obvious to those of ordinary skill in the art having the benefit of this disclosure.

Accordingly, the blade substrate 125 defines another mechanical support for the flexible display 104. In one or more embodiments, the blade substrate 125 is the stiffest layer of the overall assembly of FIG. 8. In one or more embodiments the blade substrate 125 is manufactured from stainless steel with a thickness of about one hundred microns. In another embodiment, the blade substrate 125 is manufactured from a flexible plastic. Other materials from which the blade substrate 125 can be manufactured will be obvious to those of ordinary skill in the art having the benefit of this disclosure. For instance, in another embodiment the blade substrate 125 is manufactured from carbon fiber, and so forth. In one or more embodiments, the blade substrate 125 includes a reinforcing border comprising a thicker layer of material to further protect the flexible display 104 when the blade assembly 102 is in the extended position (200).

In one or more embodiments, the flexible substrate 805 is slightly longer along a major axis of the flexible substrate 805 than is the image producing portion 808 of the flexible display 104. Since the T-shaped tongue 807 is T-shaped, this allows one or more apertures 809 to be exposed on either side of the base of the T of the T-shaped tongue 807. In one or more embodiments, this extra length along the major axis provided by the flexible substrate 805 allows one or more fasteners to rigidly couple the first end of the flexible substrate 805 to a tensioner.

Embodiments of the disclosure contemplate that some of the layers comprising the flexible display 104 are stiffer than others. Similarly, other layers of the flexible display 104 are softer than others. For example, where the flexible substrate 805 is manufactured from a metal, one example of which is stainless steel, this layer is stiffer than either the first adhesive layer 802 or the second adhesive layer 804. In one or more embodiments, the stainless steel is stiffer than the flexible display layer 803 as well. In one or more embodiments, the flexible substrate 805 is the stiffest layer in the flexible display 104 while the first adhesive layer and the second adhesive layer 804 are the softest layers of the flexible display 104. The flexible protective cover 801 and the flexible display layer 803 have a stiffness that falls between that of the flexible substrate 805 and the adhesive layers in one or more embodiments.

In one or more embodiments, the various layers of the flexible display 104 are laminated together in a substantially planar configuration. Said differently, in one or more embodiments the flexible substrate 805 is configured as a substantially planar substrate. The second adhesive layer 804 can be attached to this substantially planar substrate, with the flexible display layer 803 then attached to the second adhesive layer 804. The first adhesive layer 802 can be attached to the flexible display layer 803, with the flexible protective cover 801 attached to the first adhesive layer 802.

To ensure proper coupling, the resulting flexible display layer 803 can be cured, such as in an autoclave at a predefined temperature for a predefined duration. Where employed, such curing allows any air bubbles or other imperfections in the various layers to be corrected. In one or more embodiments, since the flexible substrate 805 is configured as a substantially planar substrate, the resulting flexible display 104 is substantially planar as well.

In one or more embodiments, the blade substrate 125 of the blade assembly 102 includes both a flexible portion 810 and a rigid portion 811. Since the blade substrate 125 is manufactured from a metal in one or more embodiments, one example of which is steel having a thickness of one hundred microns, the rigid portion 811 gets its rigidity from the material from which it is manufactured. If, for example, the blade substrate 125 were manufactured from a thermoplastic material, in one or more embodiments this thermoplastic material would have enough rigidity that the rigid portion 811 would be rigid. Since the rigid portion 811 only slides along flat major surfaces of the translation surfaces defined by the single device housing (101), it does not need to bend. Moreover, rigidity helps to protect portions of the flexible display 104 that extend beyond ends of the single device housing (101).

By contrast, the flexible portion 810 need to wrap around minor faces of the single device housing (101) where the display roller mechanism (105) is situated. Since the flexible portion 810 is manufactured from the same material as the rigid portion 811 when the blade substrate 125 is manufactured as a single unitary part, in one or more embodiments it includes a plurality of apertures cut through the blade substrate 125 allowing the material to bend. Illustrating by example, in one or more embodiments where the blade substrate 125 is manufactured from steel, a plurality of chemically or laser etched apertures can allow the flexible portion 810 to tightly wrap around minor faces of the single device housing (101) where the display roller mechanism (105) is situated.

Thus, in one or more embodiments the blade substrate 125 is partially rigid and partially flexible. Portions of the blade substrate 125 that slide along the major surfaces of the single device housing (101) are configured to be substantially rigid, while portions of the blade substrate 125 that pass around the minor surfaces of the single device housing (101) are configured to be flexible so that they can curl around those minor surfaces.

In one or more embodiments, the blade assembly 102 also includes a silicone border 127 positioned around a perimeter of the blade substrate 125. In one or more embodiments, the silicone border 127 surrounds and protects the edges of the flexible display 104 when the flexible display 104 is attached to the blade substrate 125 of the blade assembly 102. In one or more embodiments, the silicone border 127 is co-molded around the perimeter of the blade substrate 125.

In one or more embodiments, the rigid portion 811 of the blade substrate 125 can define one or more apertures. These apertures can be used for a variety of purposes. Illustrating by example, some of the apertures can be used to rigidly fasten the blade assembly 102 to a translation mechanism, one example of which was the display roller mechanism (105) of FIG. 1. Additionally, some of the apertures can contain magnets. Hall-effect sensors positioned in the single device housing (101) to which the blade assembly 102 is coupled can then detect the positions of these magnets such that the one or more processors (114) can determine whether the blade assembly 102 and flexible display 104 are in the extended position (200), the retracted position (300), the peek position (500), or somewhere in between.

In one or more embodiments, the flexible display 104 coupled to the blade substrate 125 of the blade assembly 102 within the confines of the silicone border 127. Illustrating by example, in one or more embodiments a first end of the flexible display 104 is adhesively coupled to the rigid portion 811 of the blade substrate 125 of the blade assembly 102. The other end of the flexible display 104 can then be rigidly coupled to a tensioner by passing fasteners through the apertures 809 of the flexible substrate.

Figure 9:
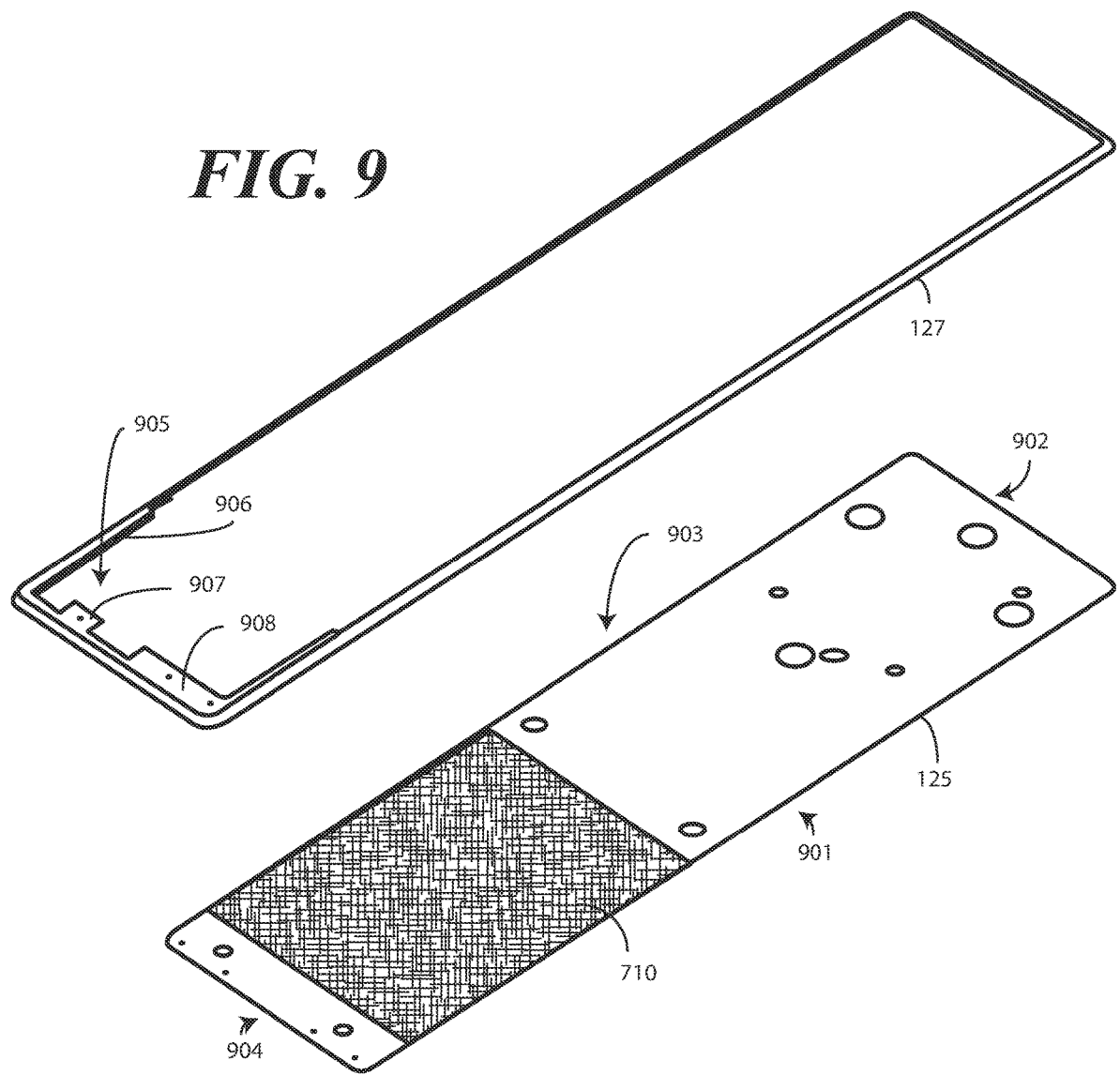
FIG. 9 illustrates portions of one explanatory display assembly in an exploded view in accordance with one or more embodiments of the disclosure.

Turning now to FIG. 9, illustrated therein is the blade substrate 125 and silicone border 127 shown in an exploded view. A shown, the silicone border 127 defines a singular, contiguous, unitary piece of silicone. In the illustrative embodiment of FIG. 9, the silicone border 127 surrounds three sides 901,902,903 of the blade substrate 125, and extends beyond minor side 904 to define a receiving recess 905 that can accommodate mechanical and electrical components such as electronic circuit components to power and control the flexible display (104) that will situate within the perimeter defined by the silicone border 127, a tensioner to keep the flexible display (104) flat across the flexible portion 810 of the blade substrate 125, flexible circuits, and other components.

In this illustrative embodiment, the portions 906,907,908 of the silicone border 127 extending beyond the minor side 904 of the blade substrate 125 surrounding the receiving recess 905 are thicker than are the other portions of the silicone border 127 that will surround the flexible display (104). This allows for components to be placed within the receiving recess 905.

Figure 10:
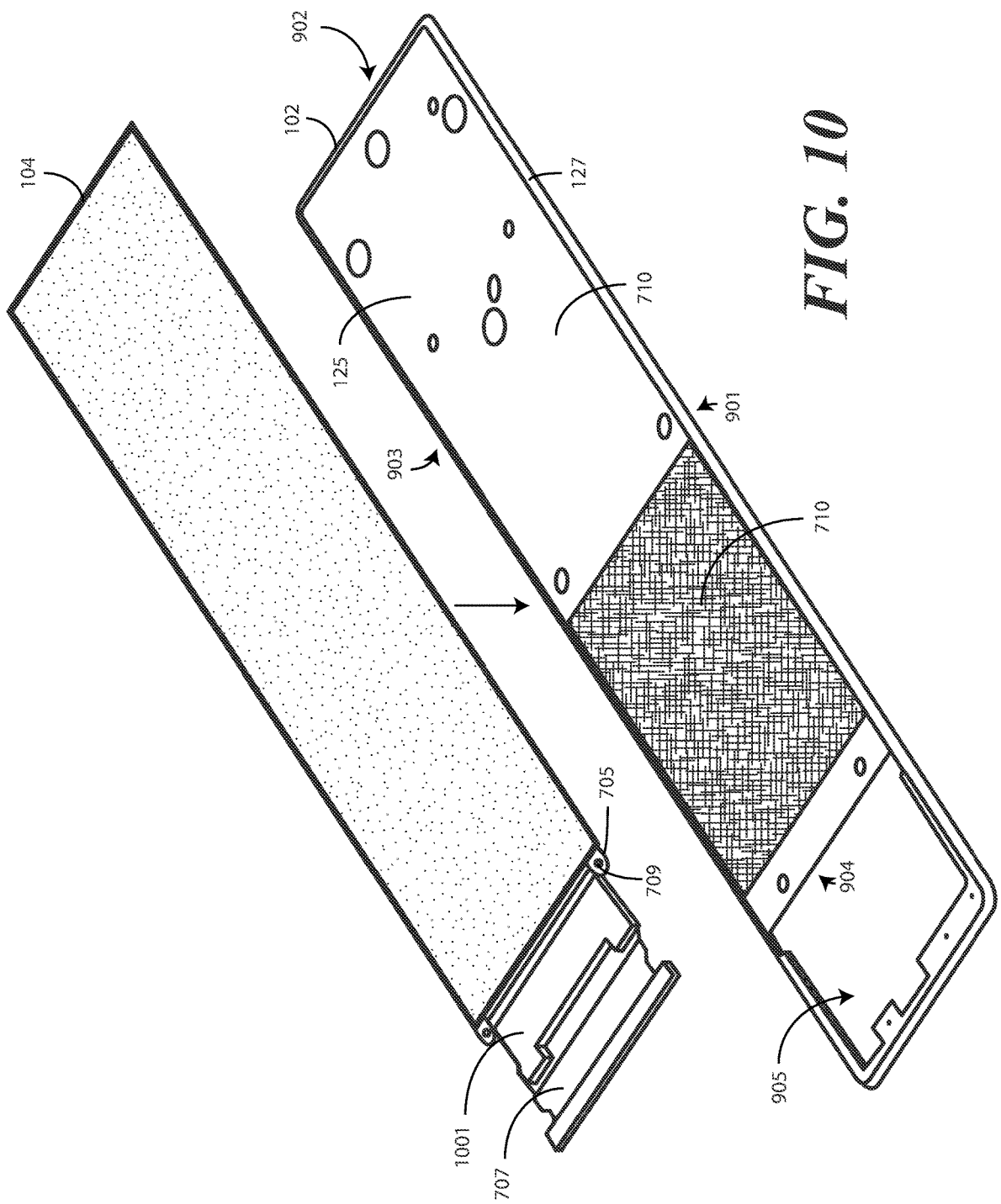
FIG. 10 illustrates one explanatory display assembly in an exploded view in accordance with one or more embodiments of the disclosure.

Turning now to FIG. 10, illustrated therein is the flexible display 104 and the blade assembly 102 with the silicone border 127 over-molded on the blade substrate 125. As shown, the silicone border 127 surrounds three sides 901, 902,903 of the blade substrate 125 and extends beyond minor side 904 to define a receiving recess 905 that can accommodate mechanical and electrical components.

Electronic circuits 1001 operable to power and control the flexible display 104 have been coupled to the T-shaped tongue 807 of the flexible display layer (803). Additionally, a mechanical connector 1002 has been connected to the top of the T on the T-shaped tongue 807. In this illustrative embodiment, the flexible substrate 805 extends beyond a distal end of the flexible display layer (803) so that the apertures 809 defined therein can be coupled to a tensioner to ensure that the flexible display 104 stays flat around the flexible portion 810 of the blade substrate 125 when the flexible portion 810 of the blade substrate 125 passes around a rotor positioned at the end of a single device housing (101).

The blade assembly 102 can be fixedly coupled to the flexible display 104 in one or more embodiments. Illustrating by example, where the blade substrate 125 defines both a rigid portion 811 and a flexible portion 810, in one or more embodiments the flexible display 104 is coupled to the rigid portion 811 by an adhesive or other coupling mechanism. A tensioner can then be positioned in the receiving recess 905. In one or more embodiments, the tensioner rigidly couples with fasteners to the apertures 809 of the flexible substrate 805 to keep the flexible display 104 flat across the flexible portion 810, regardless of how the flexible portion 810 is being bent around the minor surface of a single device housing or its corresponding rotor.

Figure 11:
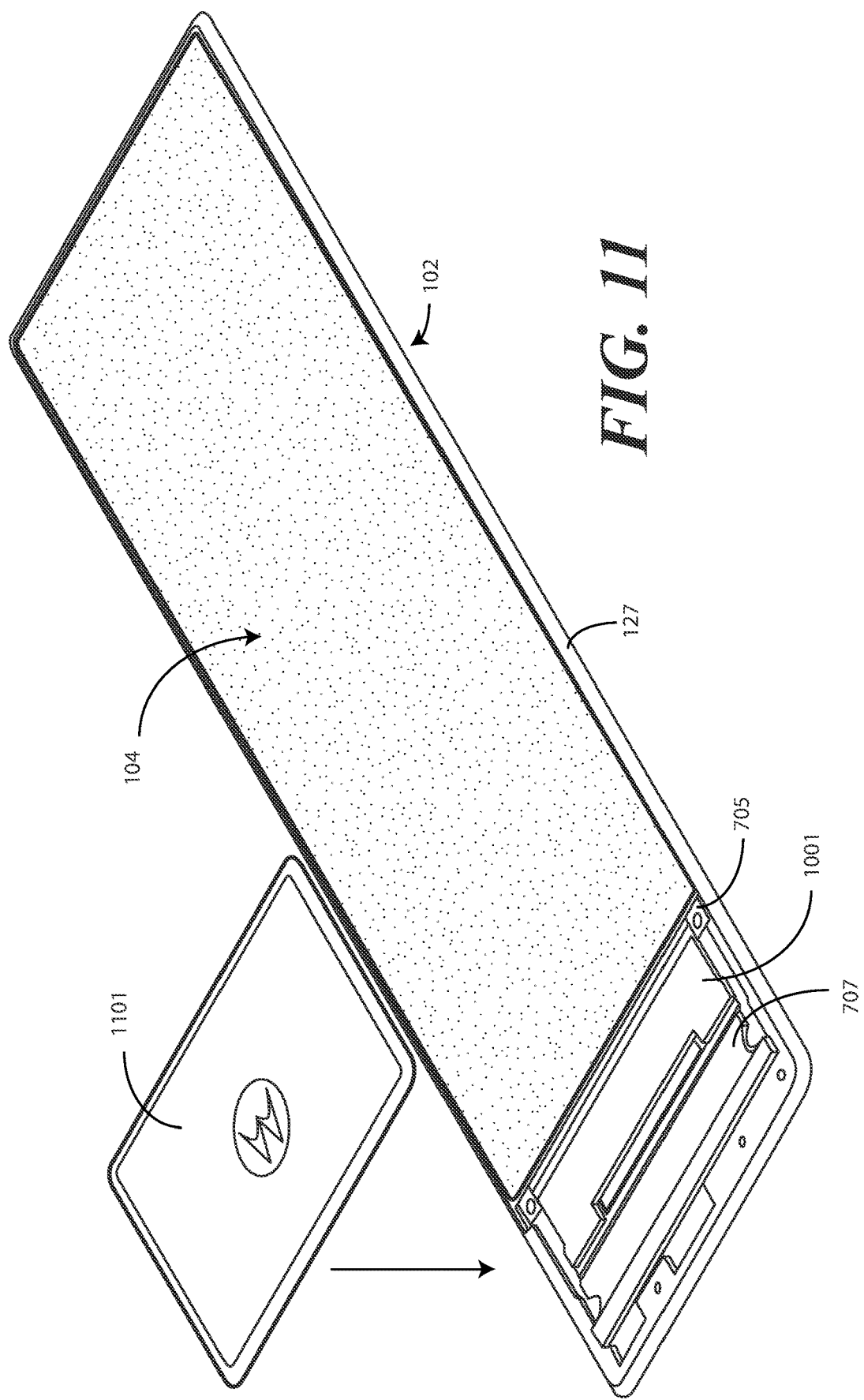
FIG. 11 illustrates explanatory display components in accordance with one or more embodiments of the disclosure.

Turning now to FIG. 11, illustrated therein is the flexible display 104 after being coupled to the blade assembly 102. As shown, the silicone border 127 surrounds the flexible display 104, with the silicone border 127 surrounding and abutting three sides of the flexible display layer (803).

Figure 12:
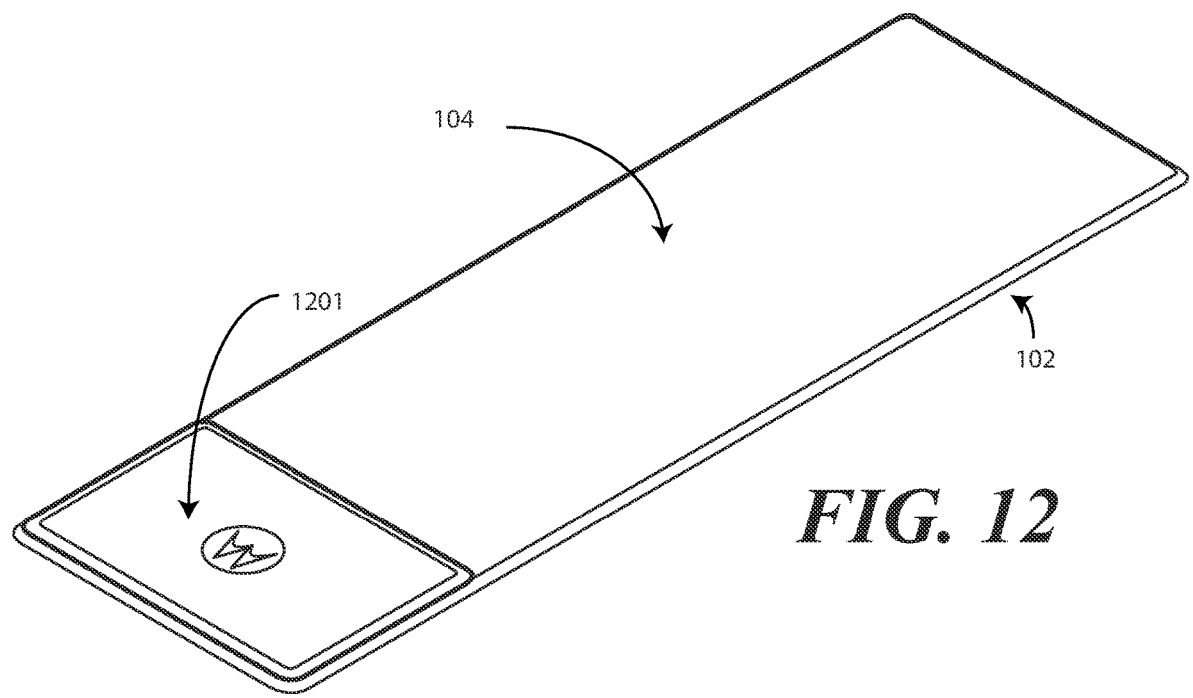
FIG. 12 illustrates one explanatory display assembly in an undeformed state.

A flexible substrate is then connected to the electronic circuits 1001 carried by the T-shaped tongue 807. Additionally, a tensioner can be coupled to the flexible substrate 805. Thereafter, a cover 1101 is attached to the silicone border 127 atop the electronic circuits 1001 and other components situated on or around the T-shaped tongue. This portion the blade assembly 102 where the components are stored beneath the cover 1101 is affectionately known as the "backpack." Turning to FIG. 12, illustrated therein is the blade assembly 102 with its backpack 1201 completely configured.

In one or more embodiments, the flexible display 104 and blade assembly 102 are configured to wrap around a minor surface of a device housing where a display roller mechanism is situated. In one or more embodiments, the display roller mechanism includes a rotor that is positioned within a curvilinear section of the flexible display 104 and blade assembly 102. When placed within a device housing of an electronic device, translation of a translation mechanism causes translation of the blade assembly 102, which in turn causes rotation of the rotor. The result is a linear translation of the flexible display 104 and blade assembly 102 across a translation surface of the device housing by drawing the flexible display 104 and the blade assembly 102 around the rotor.

Figure 13:
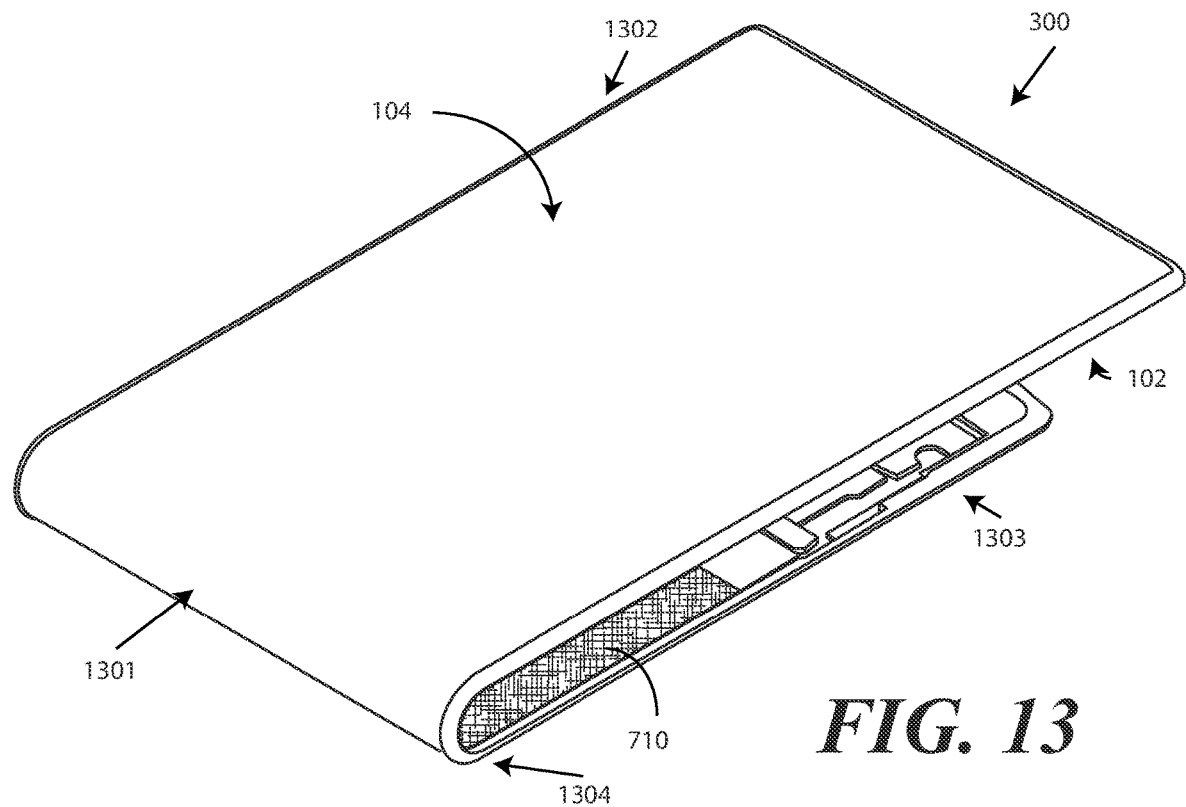
FIG. 13 illustrates the explanatory display assembly of FIG. 12 in a deformed state.
Figure 14:
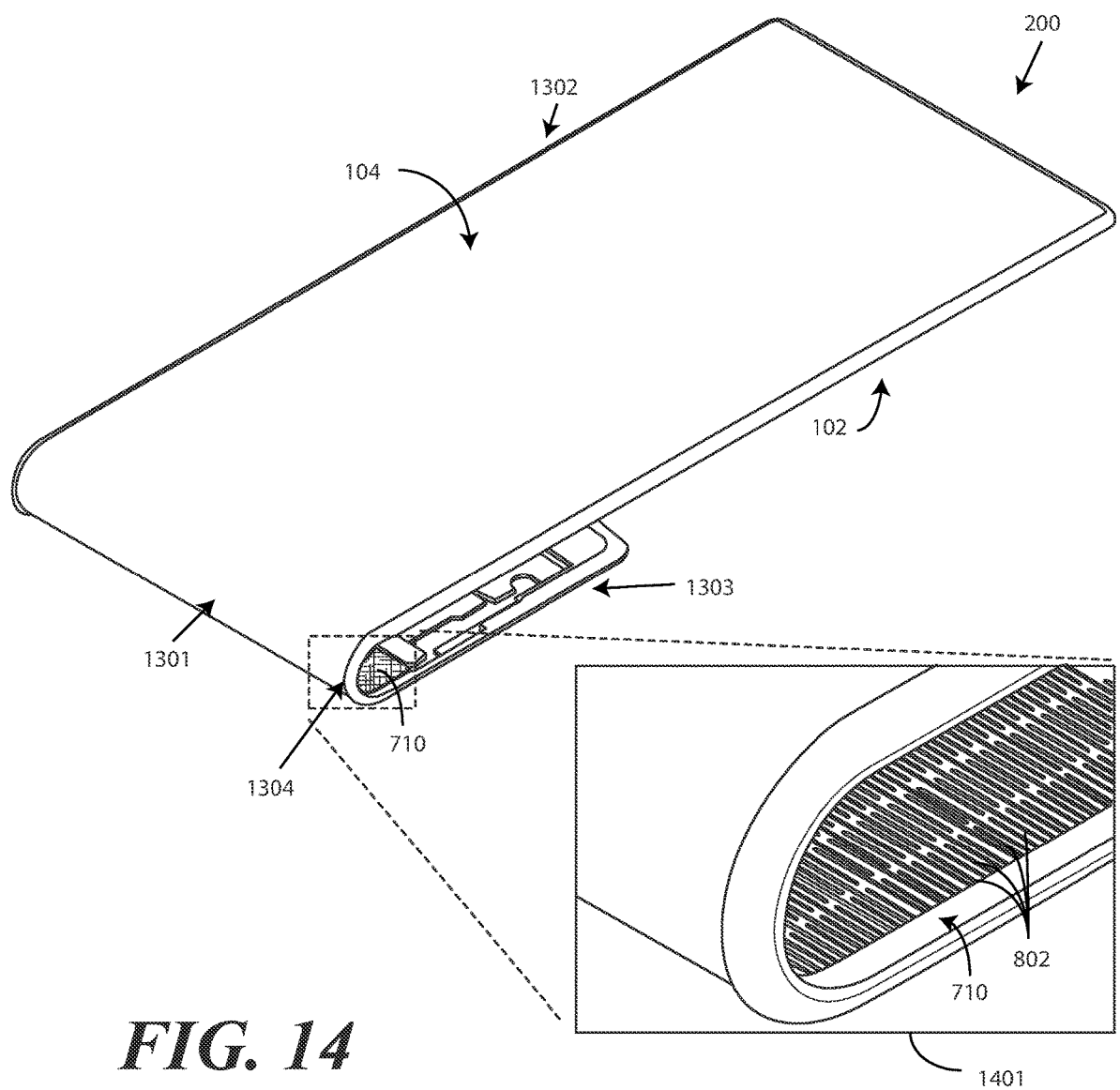
FIG. 14 illustrates the explanatory display assembly of FIG. 12 in another deformed state with an exploded view of a deformable portion of the display assembly shown in a magnified view.

That the blade substrate (125) of the blade assembly 102 includes a flexible portion (810) allows the blade assembly 102 and flexible display 104 to deform around a device housing, one example of which is the single device housing (101) of FIG. 1. Illustrating by example, turning now to FIGS. 13-14, illustrated therein is the blade assembly 102 and flexible display deformed to create a curvilinear section 1301 and two linear sections 1302,1303. The flexible display 104 and blade assembly 102 are shown as they would be in the retracted position 300 in FIG. 13. The flexible display 104 and the blade assembly 102 are shown as they would be in the extended position 200 in FIG. 14. The enlarged view 1401 of FIG. 14 shows how the apertures defined by the chemical etching of the blade substrate 125 easily allow the blade substrate 125 to bend around the curvilinear section 1301 while maintaining a rigid support structure beneath the flexible display 104 in the two linear sections 1302,1303.

In one or more embodiments, the first linear section 1302 and the second linear section 1303 are configured to slide between the retracted position 300 of FIG. 13 and the extended position 200 of FIG. 14. The flexible display 104 is coupled to the blade assembly 102 and therefore translates with the blade assembly 102 along a translation surface defined by a device housing of an electronic device.

In one or more embodiments, the linear sections 1302, 1303 of the blade assembly 102 are positioned between the flexible display 104 and the translation surface. A rotor is then positioned within a curvilinear section 1301 of the blade assembly 102. When a translation mechanism causes the linear sections 1302,1303 of the blade assembly 102 to move across the translation surface defined by the device housing, the rotor rotates with the flexible portion 810 passing along the rotor while the rotor rotates.

As shown in FIGS. 13-14, in one or more embodiments a cross section of both the blade assembly 102 and the flexible display 104 defines a J-shape with a curved portion of the J-shape, defined by the curvilinear section 1301, configured to wrap around a rotor and an upper portion of the J-shape, defined by linear section 1302, passing across a translation surface defined by a device housing. When the translators of a translation mechanism drive the blade assembly 102, the upper portion of the J-shape becomes longer as the flexible display 104 translates around the rotor with the blade assembly 102 extending further from of the device housing.

This can be seen in FIGS. 13-14 by comparing the extended position 200 of FIG. 14 to the retracted position 300 of FIG. 13.

When the translators of the translation mechanism drive the blade assembly 102 in the opposite direction, e.g., driving the blade assembly 102 from the extended position 200 of FIG. 14 to the retracted position 300 of FIG. 13, the upper portion of the J-shape becomes shorter as the reverse operation occurs. Thus, when the translation mechanism drives the blade assembly 102 carrying the flexible display 104, the flexible display 104 deforms at different locations as it wraps and passes around the rotor.

It should be understood that a more traditional "J-shape" is principally defined when the blade assembly 102 is transitioned to the extended position 200 of FIG. 14. Depending upon the length of the blade assembly 102 and flexible display 104, combined with the amount the translation mechanism can cause the blade assembly 102 to slide around the rotor, the J-shape may transition to other shapes as well, including a U-shape where the upper and lower portions of the blade assembly 102 and/or flexible display 104 are substantially symmetrical. Such a U-shape forms when the blade assembly is in the peek position but is substantially formed in the retracted position 300 of FIG. 3. In other embodiments, depending upon construction, the blade assembly 102 may even transition to an inverted J-shape where the upper portion of the blade assembly 102 and/or flexible display 104 is shorter than the lower portion of the blade assembly 102 and/or flexible display 104, and so forth.

In one or more embodiments, the translators and rotor of the translation mechanism not only facilitate the "extension" of the flexible display 104 that occurs during an extending or "rising" operation, but also works to improve the reliability and usability of the flexible display 104 as well. This is true because the rotor defines a service loop 1304 in the curvilinear section 1301 with a relatively large radius compared to the minimum bending radius of the flexible display 104. The service loop 1304 prevents the flexible display 104 from being damaged or developing memory in the curved state occurring as the flexible display 104 defines the curvilinear section 1301 wrapping around the rotor in the extended position 200, retracted position 300, and peek position (500).

Using such a mechanical assembly, the flexible display 104 maintains a flat upper portion of the J-shape defined by the first linear section 1302 when sliding. Additionally, the flexible display 104 wraps tightly around the rotor with the lower portion of the J-shape defined by the second linear section 1303 remaining flat against the lower surface of a device housing as well. The blade assembly 102 and tensioner combination, which are rigidly affixed to the translation mechanism, precludes the flexible display 104 from crumpling or bunching when sliding around the device housing between the extended position 200, the retracted position 300, and the peek position (500). This rigid coupling combined with moving tensioner ensures a straight and true translation of the flexible display 104 across a first major surface of an electronic device, around the rotor of the electronic device positioned at a minor surface of the device housing, and across a second major surface of the electronic device.

In one or more embodiments additional support components can be attached to the blade assembly 102 to one or more of provide additional support for the flexible display 104, ease translation of the blade assembly 102 around a device housing, or combinations thereof.

As noted above, in one or more embodiments a blade assembly 102 is coupled to the flexible display 104. In contrast to sliding devices that include multiple device housings, embodiments of the disclosure provide an electronic device with a sliding display that includes only on device housing. The blade assembly 102 is configured as a mechanical chassis that allows the flexible display 104 to translate along a translation surface defined by major and minor surfaces of the single device housing.

In one or more embodiments, the blade assembly 102 also provides a mechanical support for portions of the flexible display 104 that extend beyond the top edge of the single device housing when the blade assembly 102 and flexible display 104 are in the extended position. The blade assembly 102 can include a blade substrate (125) that is unitary, but that defines both flexible portions and rigid portions. The blade substrate (125) can comprise the silicone border 127 that surrounds and protects the edges of the flexible display 104.

A low-friction dynamic bending laminate stack (128) and blade (126) can be positioned between the blade assembly 102 and the translation surfaces defined by the single device housing (101). In one or more embodiments, the blade (126) and the low-friction dynamic bending laminate stack (128) are positioned between the blade assembly 102 and the translation surfaces defined a device housing to which the blade assembly 102 is attached.

The blade (126) supports portions of the blade assembly 102 and flexible display 104 that extend beyond the top edge of the device housing when the blade assembly 102 is transitioned to the extended position. Since this blade (126) needs to be rigid to support those portions of the blade assembly 102 and the flexible display 104, it is not able to bend around the flexible portions of the blade substrate (125) of the blade assembly 102. To prevent gaps or steps from occurring where the blade (126) terminates, in one or more embodiments a low-friction dynamic bending laminate stack (128) spans the remainder of the blade assembly 102 and abuts the transition surfaces defined by the single device housing.

In one or more embodiments, the blade (126) comprises a layer of steel. In one or more embodiments, the blade (126) has a thickness that is greater than the thickness of either the blade substrate (125) of the blade assembly 102 or the flexible substrate (805) of the flexible display 104. Illustrating by example, in one or more embodiments the blade (126) comprises a layer of steel having a thickness of five hundred microns or 0.5 mils.

In one or more embodiments, the blade (126) comprises a rigid, substantially planar support layer. Illustrating by example, the blade (126) can be manufactured from aluminum, steel, or stainless steel in one or more embodiments. In another embodiment, the blade (126) is manufactured from a rigid thermoplastic sheet. Other materials can be used in manufacturing the blade substrate (125) as well. For example, nitinol can be used to manufacture the blade (126) as well.

In one or more embodiments, the blade (126) is the stiffest layer of the overall assembly. In one or more embodiments the blade (126) is manufactured from stainless steel with a thickness of about five hundred microns. In another embodiment, the blade (126) is manufactured from carbon fiber. Other materials from which the blade (126) can be manufactured will be obvious to those of ordinary skill in the art having the benefit of this disclosure.

In one or more embodiments, the low-friction dynamic bending laminate stack (128) comprises a plurality of layers.

When assembled, the low-friction dynamic bending laminate stack (128) adds a layer to the blade assembly 102 that improves the lubricity of the overall assembly to allow for smooth motion of the blade assembly 102 and flexible display 104 across the translation surfaces of a device housing. Moreover, when abutting a blade (126), the low-friction dynamic bending laminate stack (128) prevents features on other layers of the assembly from degrading the ability of the blade assembly 102 and flexible display 104 to translate across those translation surfaces.

In one or more embodiments, the low-friction dynamic bending laminate stack (128) allows for "low-friction" sliding across a stationary surface combined with the ability to cyclically bend and/or roll around a rotor. In one or more embodiments, the low-friction dynamic bending laminate stack (128) interfaces and abuts the blade (126) to improve lubricity.

In one or more embodiments, the uppermost layer of the low-friction dynamic bending laminate stack (128) is a pressure sensitive adhesive layer. This pressure sensitive adhesive layer allows the low-friction dynamic bending laminate stack (128) to adhere to the underside of the blade assembly 102.

Beneath this pressure sensitive adhesive layer is a strain tolerant foam layer in one or more embodiments. Examples of strain tolerant foams suitable for use as the strain tolerant foam layer include silicone, low-density polyethylene, or other materials that provide sufficient thickness so as to allow the low-friction dynamic bending laminate stack (128) to match the thickness of the blade (126) while reducing internal stresses and allowing bending.

Beneath the strain tolerant foam layer is another pressure sensitive adhesive layer in one or more embodiments. This pressure sensitive adhesive layer couples a flexible substrate having a strain relief cutout pattern formed therein. The flexible substrate can be manufactured from metal or plastic or other materials. Illustrating by example, in one or more embodiments the flexible substrate comprises a steel layer with a thickness of about thirty microns. While thin, flexible steel works well in practice, it will be obvious to those of ordinary skill in the art having the benefit of this disclosure that other materials can be used for the flexible substrate as well. For instance, in another embodiment the flexible substrate is manufactured from a thin layer of thermoplastic material.

Another layer of pressure sensitive adhesive then couples the flexible substrate to a low-friction layer in one or more embodiments. In one or more embodiments, the low-friction layer comprises a substrate with Teflon.sup.™ attached thereto. In another embodiment, the low-friction layer comprises a layer of polytetrafluoroethylene, which is a synthetic fluoropolymer of tetrafluoroethylene. This material is best known for its non-stick properties and adds a lubricity to the low-friction dynamic bending laminate stack (128) that allows the overall assembly to slide smoothly. Moreover, the low-friction layer prevents the strain relief cutout pattern in the flexible substrate from snagging on surface imperfections and transitions on the device housing to which the assembly is attached. In short, the low-friction layer greatly improves the lubricity of the overall assembly.

FIGS. 15-20 illustrate the electronic device 100 of FIG. 1 as fully assembled in both the extended position 200 and retracted position 300. Embodiments of the disclosure contemplate that in addition to having distinctly unique utilitarian features, electronic devices configured in accordance with embodiments of the disclosure have distinctly unique ornamental features as well. Many of these ornamental features are visible in FIGS. 15-20.

FIG. 15 illustrates a front elevation view of the electronic device 100 in the extended position 200, while FIG. 16 illustrates a side elevation view of the electronic device 100 in the extended position 200. FIG. 17 then provides a rear elevation view of the electronic device 100 in the extended position 200 as well.

FIG. 18 illustrates a front elevation view of the electronic device 100 in the retracted position 300, while FIG. 19 illustrates a side elevation view of the electronic device 100 in the retracted position 300. FIG. 20 then provides a rear elevation view of the electronic device 100 in the retracted position 300.

As can be seen by comparing these figures, the blade assembly 102 is able to slide around the single device housing 101 such that the blade 126 slides away from the single device housing 101 to change the apparent overall length of the flexible display 104 as viewed from the front of the electronic device 100. The blade assembly 102 can also slide in an opposite direction around the single device housing 101 to the retracted position 300, where similar amounts of the flexible display 104 are visible on the front side of the electronic device 100 and the rear side of the electronic device 100. Graphics, images, user actuation targets, and other indicia can be presented anywhere on the flexible display 104, including on the front side of the electronic device 100, the rear side of the electronic device 100, or the lower end of the electronic device 100.

While much attention to this point has been paid to the unique translation of the blade assembly and flexible display between the extended position and the retracted position, one of the other truly unique features offered by embodiments of the disclosure occur when the blade assembly and flexible display transition to the peek position. Turning now to FIGS. 21-22, illustrated therein is the electronic device 100 in this peek position 400.

As shown in FIG. 21, in one or more embodiments when the blade assembly 102 and flexible display 104 transition to the peek position 500, the backpack 1201 moves toward beyond the retracted position (300) toward the rear-facing image capture devices 108. When this occurs, an upper edge 2101 of the blade assembly 102 moves below an upper edge 2102 of the single device housing 101. In one or more embodiments, this reveals a front-facing image capture device 501 that situates beneath the blade assembly 102 when the blade assembly 102 is in the retracted position (300).

In one or more embodiments, the translation of the blade assembly 102 and flexible display 104 to the peek position 500 occurs automatically. Illustrating by example, in one or more embodiments when the front-facing image capture device 501 is actuated, the one or more processors (114) of the electronic device 100 cause the blade assembly 102 to translate to the peek position 500, thereby revealing this image capture device 501. (In the explanatory embodiment of FIGS. 21-22, a loudspeaker 502 is also revealed.) Once image capture operations utilizing the image capture device 501 are complete, the one or more processors (114) can cause the blade assembly 102 to transition back to the retracted position, which again covers and occludes the image capture device 501.

In other embodiments, the transition to the peek position 500 is manually initiated through actuation of a button or other user interface control. Illustrating by example, a single press of the button 2103 might cause the blade assembly 102 to transition to the extended position (200), while a double press of the button 2103 causes the blade assembly 102 to return to the retracted position (300). A long press of the button 2103 may cause the blade assembly 102 to transition to the peek position 500 of FIG. 5, and so forth. Other button operation schema will be obvious to those of ordinary skill in the art having the benefit of this disclosure. In other embodiments, delivery of user input to the flexible display 104 in the form of a pinch gesture can be used to cause the transition to the peek position 500 as well.

By positioning the front-facing image capture device 501 beneath the blade assembly 102 and its corresponding opaque blade (126) when in normal operation, embodiments of the disclosure provide a privacy guarantee to users of the electronic device 100. Said differently, by positioning the image capture device 501 beneath the blade assembly 102 and the flexible display 104 when these components are in either the retracted position (300) or the extended position (200), a user of the electronic device 100 is mechanically assured of privacy due to the fact that it is physically impossible for the image capture device 501 to perform image capture operations through the blade (126) of the blade assembly 102.

Accordingly, even if the electronic device 100 is accessed by a hacker or other nefarious actor, the user can be assured that the image capture device 501 cannot capture images or videos while the blade assembly 102 and flexible display 104 are in the retracted position (300), the extended position (200), or in positions therebetween. Only when the blade assembly 102 and the flexible display 104 transition to the peek position 500, thereby revealing the image capture device 501, can the image capture device 501 capture front-facing images or front-facing videos.

Figure 23:
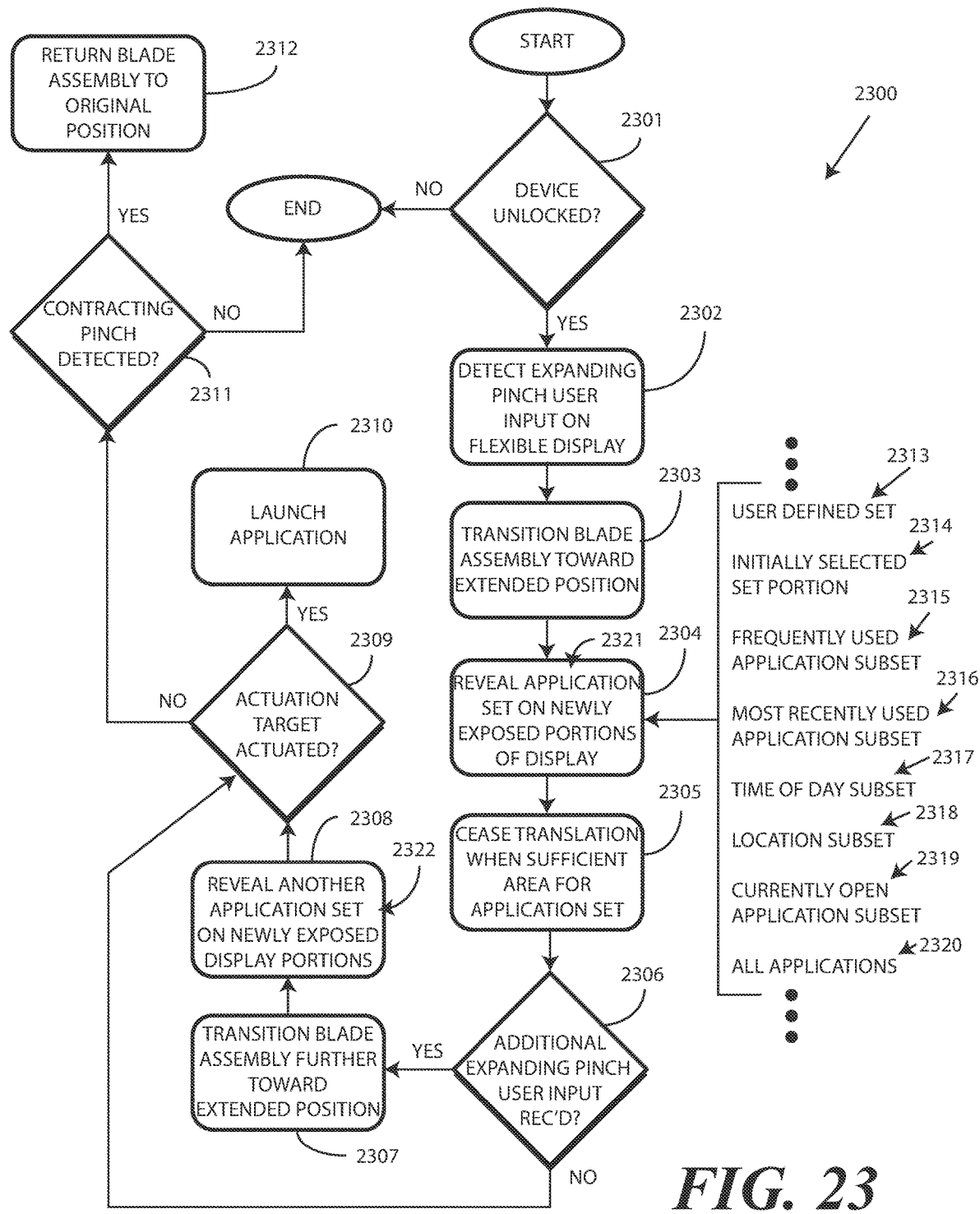
FIG. 23 illustrates one explanatory method in accordance with one or more embodiments of the disclosure.

Attention will now be turned to methods for using the electronic devices described above, and more particularly, to automatic movement of the flexible display 104 and blade assembly 102 in response to user input in the form of gestures in accordance with one or more embodiments of the disclosure. Turning now to FIG. 23, illustrated therein is one explanatory method 2300 in accordance with one or more embodiments of the disclosure. The method 2300 of FIG. 23 is intended for use in an electronic device having a device housing, a blade assembly carrying a blade and a flexible display, with the blade assembly being slidably coupled to the device housing, a translation mechanism operable to slide the blade assembly relative to the device housing between at least an extended position and a retracted position, and one or more processors operable with the translation mechanism.

Decision 2301 determines whether the electronic device is in a locked state or an unlocked state. As will be explained below, in some embodiments it is undesirable to cause translation of a blade assembly coupled to a flexible display in response to user input delivered to that flexible display when the electronic device is in a locked mode of operation. Accordingly, in some embodiments any translating in response to user input occurs only when the electronic device is in an unlocked state, as determined by decision 2301, when the user input is detected.

Step 2302 then comprises detecting, with a flexible display carried by a blade assembly that is slidably coupled to a device housing and movable between at least an extended position and a retracted position, user input. In one or more embodiments, the user input detected at step 2302 comprises a pinch gesture.

In one or more embodiments, the pinch gesture has a directional component associated therewith. Illustrating by example, in one or more embodiments the initial contact position of the user input defines the commencement of the pinch gesture, with movement of the fingers along the flexible display in a direction from that initial contact point defining a direction of the pinch gesture. When the fingers cease contact with the flexible display, this defines the end of the pinch gesture.

Thus, a pinch gesture can be made with the fingers expanding or with the fingers contracting. As will be described below, in one or more embodiments when the pinch gesture is an expanding pinch gesture, a translation mechanism operable with the blade assembly translates the blade assembly toward the extended position. By contrast, when the pinch gesture is a contracting pinch gesture, the translation mechanism can cause the blade assembly to translate toward the retracted position. In some embodiments, if the flexible display is in the retracted position when a contracting pinch gesture is detected at step 2302, the translation mechanism can cause the flexible display to transition to the peek position, and so forth.

If step 2302 comprises detecting user input directed expanding, step 2303 comprises translating, by a translation mechanism operable with the blade assembly, the blade assembly toward the extended position in response to the pinch gesture. As noted above, in one or more embodiments the translating of step 2303 occurs only when the electronic device is in an unlocked state, as determined by decision 2301, when the user input defining the pinch gesture is detected at step 2302.

In one or more embodiments, step 2304 then comprises one or more processors of the electronic device presenting, on the flexible display, content on newly exposed front-facing portions of the flexible display that are revealed by the translation occurring at step 2303. This content can take various forms.

In one or more embodiments, the one or more processors reveal an application tray (one example of which is shown below with reference to FIG. 25) on the newly exposed front-facing portions of the flexible display. In other embodiments, the one or more processors present additional application components, user interface controls being one example thereof, on the newly exposed front-facing portions of the flexible display. Illustrating by example, the additional application components may be a text message editor, an email composition user interface controls, a media player window, or gaming window. One example of additional application components that are presented is shown below with reference to FIG. 26. Others will be obvious to those of ordinary skill in the art having the benefit of this disclosure. Moreover, notifications or other content items can be presented on the newly exposed front-facing portions of the flexible display as shown in FIG. 27 as well.

In one or more embodiments, where the one or more processors operable with the flexible display are presenting a home screen presentation on the front-facing portion of the flexible display when the user interface is received at step 2302, step 2304 comprises presenting, by the one or more processors after the translating of 2303 occurs, additional content on a front-facing area of the flexible display that is newly exposed by that translation. In one or more embodiments, the additional content comprises one or more user actuation target defining an application set 2321.

This new application set 2321 can take a variety of forms. In one or more embodiments, the application set 2321 comprises a group of user-defined applications 2313. These user-defined applications 2313 can be configured as a virtual "tray" of applications that opens and is presented on the newly exposed front-facing portions of the flexible display in response to the translation occurring at step 2303. The user-defined applications 2313 may be a group of applications that are favorites of a particular user or that are included in this group for other reasons. Using a menu and/or user interface controls of the electronic device, in one or more embodiments the user can select the user-defined applications 2313 for inclusion in the application tray that is revealed on the newly exposed front-facing portions of the flexible display.

In other embodiments, the selection of the new application set 2321 can occur automatically. Illustrating by example, the one or more processors of the electronic device may select an initially selected set 2314 of applications for presentation in the application tray that is revealed on the newly exposed front-facing portions of the flexible display. This "initially-selected" set 2314 of applications may be the set that a user typically engages with when initially using the electronic device during the day. If, for example, the user reads the Wall Street Journal.sup.™, checks email, checks a sleep tracker, and checks their brokerage account balance each morning when waking up, in one or more embodiments the initially selected set 2314 may comprise the Wall Street Journal.sup.™ application, a brokerage account application, a sleep tracking application, and an email application, and so forth.

In other embodiments, the newly revealed application set 2321 can comprise a subset of applications that are frequently used 2315. If, for example, the user spends ninety percent of their productive time during the day drafting documents in a word processor, creating figures in an illustration application, and corresponding with people via email, despite these applications not necessarily being the user's favorites or the ones the user considers the most fun, the one or more processors of the electronic device may group them together as a subset of applications that are frequently used 2315 since they are used so often. In one or more embodiments, after the blade assembly translates an application tray defined by this subset of applications that are frequently used 2315 is presented on the newly exposed front-facing portions of the flexible display.

In still other embodiments, the newly revealed application subset 2321 can comprise a subset of applications that were most recently used 2316. If, for example, the user is working on a very long project with a tight deadline, after unlocking the electronic device, as detected at decision 2301, and receiving user input defining a pinch gesture at step 2302, the one or more processors may reveal an application tray comprising the subset of applications that were most recently used 2316 since the one or more processors predict that the user will once again need to start working on the very long project due to the upcoming tight deadline.

In still other embodiments, the newly revealed application subset 2321 presented on the newly exposed front-facing portions of the flexible display after the translation of step 2303 can comprise a time-of-day subset 2317 applications. If a person likes to meditate during lunchtime, for example, and the pinch gesture detected by step 2302 occurs at 11:59 AM, the one or more processors may group a meditation application with other applications that are frequently used at lunchtime, e.g., a restaurant mobile take-out application, a nap time white noise machine application, and a barista machine control application that causes the barista machine to make very strong coffee, and may present them as a time of day subset 2317 of applications on the newly exposed front-facing portions of the flexible display in response to the pinch gesture. These examples of time-of-day subset 2317 applications are illustrative only, as others will be obvious to those of ordinary skill in the art having the benefit of this disclosure.

In still other embodiments, the newly revealed application set 2321 can comprise a location subset 2318 of applications, optionally configured as an application tray that is revealed on the newly exposed front-facing portions of the flexible display in response to the translation of step 2303. If, for example, a user listens to jazz music while reading recipes for cocktails at home but listens to heavy metal while creating illustrations at the workplace, a jazz music application and mixologist application may be grouped as a first location subset 2318 of applications for the home location while a heavy metal application and an illustration application are grouped together as a second location subset 2319 of applications for the workplace, and so forth.

In still other embodiments, the newly revealed application set 2321 can be a subset of applications related to a currently open application 2319. If the user is an author writing a long tome in a word processor who also uses an editing application to review the word processing document for content not to be popular with her fan base, the subset of applications related to the currently open application 2319 may comprise the editing application (and other corresponding applications) when the foreground application is the word processor, and so forth.

In still other applications, where the newly exposed front-facing portions of the flexible display after the translation occurring at step 2303 provides sufficient room, the newly revealed application set 2321 can comprise all applications 2320 installed on the electronic device. The above examples of application sets 2321 are illustrative only, as numerous others will be obvious to those of ordinary skill in the art having the benefit of this disclosure.

In one or more embodiments, step 2303 also comprises determining, by the one or more processors of the electronic device, an additional display area required for presentation of the application set 2321. Accordingly, step 2305 can comprise ceasing the translation of step 2303 when the additional display area required for the presentation of the application set 2321 is revealed. It should be noted that the presentation of the application set 2321 at step 2304 and the cessation of translation of step 2305 can occur in either order. The translation mechanism may stop the translation at step 2305 before the one or more processors present the application set 2321 at step 2304, or vice versa, with the application set 2321 being revealed as the blade assembly translates.

Decision 2306 then determines whether an additional user input defining another pinch gesture is detected. This might be the case, for example, where the application set 2321 presented at step 2304 included some applications, but not those that that the user needed, the user may deliver another pinch gesture to reveal additional applications. Decision 2306 detects whether this occurs. Where it does, step 2307 comprises again translating, by the translation mechanism, the blade assembly toward the extended position in response to the additional pinch gesture. Step 2308 can then comprise presenting another application set 2322 on another front-facing area of the flexible display that is newly exposed in response to the additional user input. Otherwise, the method 2300 moves to decision 2309.

At decision 2309, the method 2300 determines whether a user actuation target revealed at step 2304 or step 2308 is actuated. Where it is, step 2310 launches the application. Embodiments of the disclosure contemplate that the user may change his mind, however, and may not elect to actuate any of the user actuation targets. The user may instead decide to go take a nap and want to put the electronic device back in the retracted position. Decision 2311 determines whether this additional pinch gesture is received. In one or more embodiments, the pinch determined at decision 2311 occurs in an opposite direction from that detected at step 2302. If it is, step 2312 translates the blade assembly back to the original position it was when the method 2300 started. In one or more embodiments, this position is the retracted position.

Figure 24:
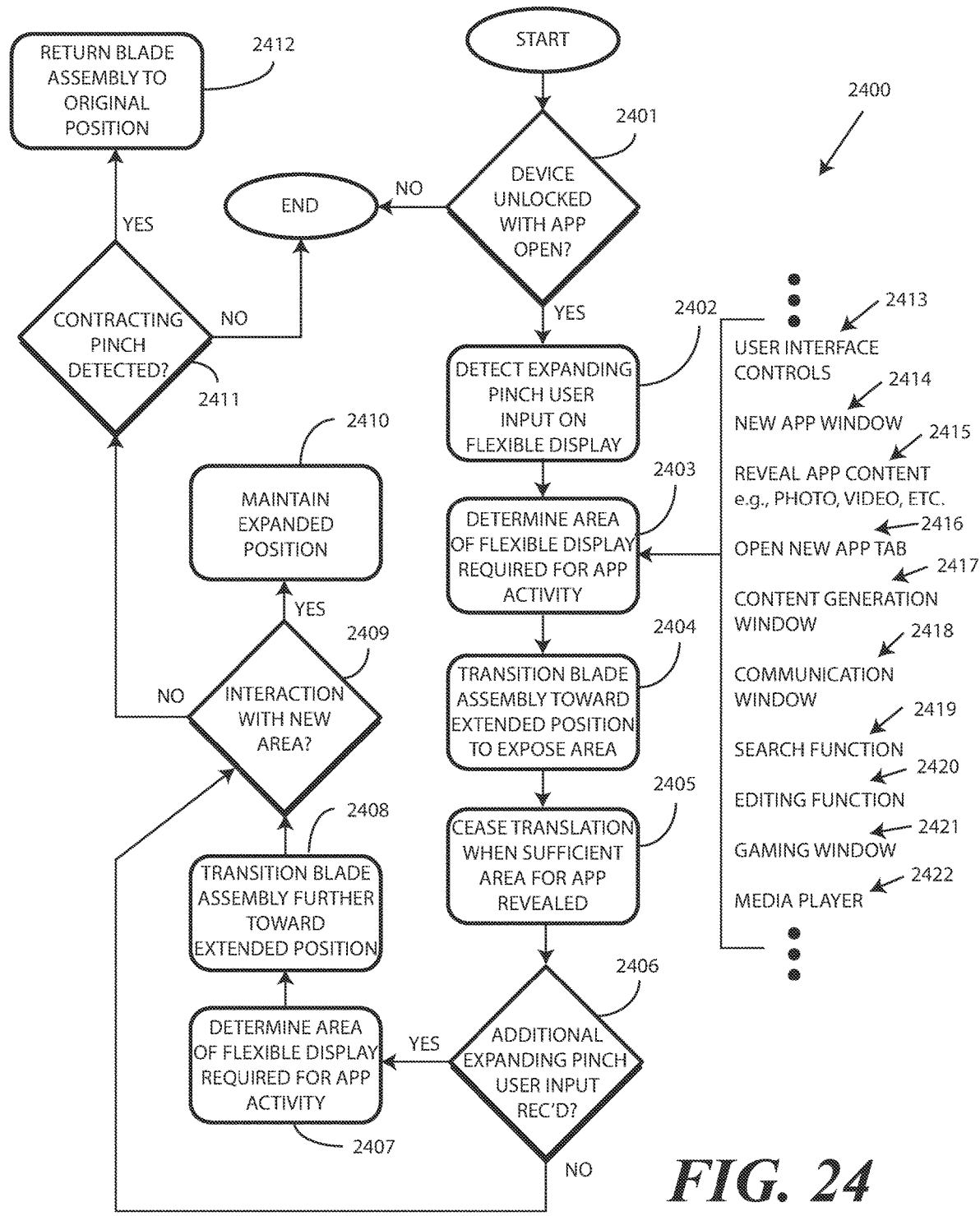
FIG. 24 illustrates another explanatory method in accordance with one or more embodiments of the disclosure.

While embodiments of the disclosure work beautifully to reveal an application tray or other content presentation of the application set 2321 described in FIG. 23, embodiments of the disclosure contemplate that this is but one way to present content on a newly revealed front-facing portion of a flexible display after translation in response to detection of a pinch gesture. Turning now to FIG. 24, illustrated there is another method 2400 illustrating another way embodiments of the disclosure can be used to detect pinch gestures, translate a blade assembly carrying a flexible display, and then present new content on front-facing portions of the flexible display that are revealed by the translation. In particular, the method 2400 of FIG. 24 is directed to situations where a foreground application is operating on the one or more processors of the electronic device. This is in contrast to the home screen presentation described above with reference to the method (2300) of FIG. 23.

As before, decision 2401 determines whether the electronic device is in a locked state or an unlocked state. In some embodiments, any translating in response to user input occurs only when the electronic device is in an unlocked state, as determined by decision 2401, when the user input is detected.

Step 2402 then comprises detecting, with a flexible display carried by a blade assembly that is slidably coupled to a device housing and movable between at least an extended position and a retracted position, user input. In one or more embodiments, the user input detected at step 2402 comprises a pinch gesture. As noted above, the pinch gesture can have a directional component associated therewith. The directional component can be made with the fingers expanding or with the fingers contracting.

If step 2402 comprises detecting user input that is expanding, step 2403 can comprise determining, by one or more processors of the electronic device, an additional display area required by an operating state of an application operating on the one or more processors for additional content. While examples described with reference to the method (2300) of FIG. 23 presumed a home screen presentation was being presented on the front-facing portion of the flexible display when the pinch gesture was received, the method 2400 of FIG. 24 presumes that an active application interface presentation of an active application is being presented on the front-facing portion of the flexible display when the pinch gesture is detected at step 2402.

Illustrating by example, if a user is browsing a social media feed in a social media application, the graphical user interface or user interface portal of the social media application may define the active application interface presentation of the social media application when the social medial application is operating in the foreground on the one or more processors. Step 2403 can comprise querying the active application to determine what additional application content is required as a function of the operating state.

Step 2404 can them comprise translating, by a translation mechanism operable with the blade assembly, the blade assembly toward the extended position in response to the pinch gesture. As noted above, in one or more embodiments the translating of step 2404 occurs only when the electronic device is in an unlocked state, as determined by decision 2401, when the user input defining the pinch gesture is detected at step 2402.

Step 2404 can also comprise the one or more processors presenting, after the translating occurs, the additional active application content in additional front-facing portions of the flexible display revealed by the translation. The newly revealed content presented at step 2403 can take various forms.

While the method (2300) of FIG. 23 revealed an application tray (one example of which is shown below with reference to FIG. 25) on the newly exposed front-facing portions of the flexible display, the method 2400 of FIG. 24 reveals additional application components, user interface controls being one example thereof, on the newly exposed front-facing portions of the flexible display. Illustrating by example, the additional application components may be a text message editor, an email composition user interface controls, a media player window, or gaming window. One example of additional application components that are presented is shown below with reference to FIG. 26. Others will be obvious to those of ordinary skill in the art having the benefit of this disclosure. It should be noted again that notifications or other content items can be presented on the newly exposed front-facing portions of the flexible display as shown in FIG. 27 as well.

In one or more embodiments, where the one or more processors operable with the flexible display are presenting an active application interface presentation of an active application on the front-facing portion of the flexible display when the user interface is received at step 2402, step 2404 comprises presenting, by the one or more processors after the translating of step 2404 occurs, additional content on a front-facing area of the flexible display that is newly exposed by that translation. In one or more embodiments, the additional content comprises additional active application content.

This additional active application content can take a variety of forms. In one or more embodiments, additional active application content comprises user interface controls 2413. Illustrating by example, if the active application is a text messaging application, and a user is reading text messages, the user may decide to respond to a particular message. If this occurs, the user may deliver the pinch gesture detected at step 2402 to cause a drafting or editing user interface control to appear on the flexible display. An example of this is shown below with reference to FIG. 26.

In other embodiments, the additional active application content can comprise a new tab 2416 or new application window 2414. If, for example, a user is using a web browsing application to surf the web, the additional active application content may comprise a new tab 2416 or window 2414 so that additional portions of the web can be further surfed. By contrast, if the user is looking through photos in a photo application, the additional active application content can comprise new application content 2415 in the form of additional pictures or videos.

If the active application is a videoconferencing application, the additional active application content may take the form of an additional communication window 2418. By contrast, if the active application includes a search feature, as many word processors, spreadsheets, and other applications do, the additional active application content may comprise a search function 2419. Editing functions 2420 can be presented in a similar manner.

If the active application is a gaming application, the additional active application content may be a gaming window 2421 in which the user may engage in gaming activities. If the active application is a multi-media application, such as a video streaming application, the additional active application content may comprise a media player 2422. These are examples only, as many other additional active application content examples will be obvious to those of ordinary skill in the art having the benefit of this disclosure. An editing window used as a content generation window 2417 can also be presented.

In one or more embodiments, the amount of translation occurring at step 2404 occurs as a function of an amount defined by the function of the additional display area determined at step 2403. Accordingly, step 2405 can comprise ceasing the translation of step 2404 when the additional display area required for the presentation of the additional active application content is revealed. It should be noted that the presentation of the additional active application content at step 2404 and the cessation of translation of step 2405 can occur in either order, as previously described with reference to the application set (2321) of FIG. 23.

Decision 2406 then determines whether an additional user input defining another pinch gesture is detected. This might be the case, for example, where the additional active application content presented at step 2404 includes a list of search results. The user may desire to scroll through those search results without losing earlier search results by causing the blade assembly to continue to translate toward the extended position. Decision 2406 detects whether this occurs.

Where it does, step 2407 again determines from the active application how much area is required for the current application activity. Step 2408 then comprises again translating, by the translation mechanism, the blade assembly toward the extended position in response to the additional pinch gesture. Step 2408 can also comprise presenting another additional active application content presentation on another front-facing area of the flexible display that is newly exposed in response to the additional user input. Otherwise, the method 2400 moves to decision 2409.

At decision 2409, the method 2400 determines whether additional active application content revealed at step 2404 or step 2408 is interacted with by the user. Where it is, step 2410 maintains the new position of the blade assembly because the user is actively engaging the additional active application content.

Embodiments of the disclosure contemplate that the user may change his mind, however, and may not elect to engage the additional active application content. The user may instead decide to continue interacting with the original active application interface presentation. Decision 2411 determines whether this additional pinch is received. In one or more embodiments, this additional pinch occurs in the opposite direction of the pinch gesture detected at step 2402. If it is, step 2412 translates the blade assembly back to the original position it was when the method 2400 started. In one or more embodiments, this position is the retracted position.

Figure 25:
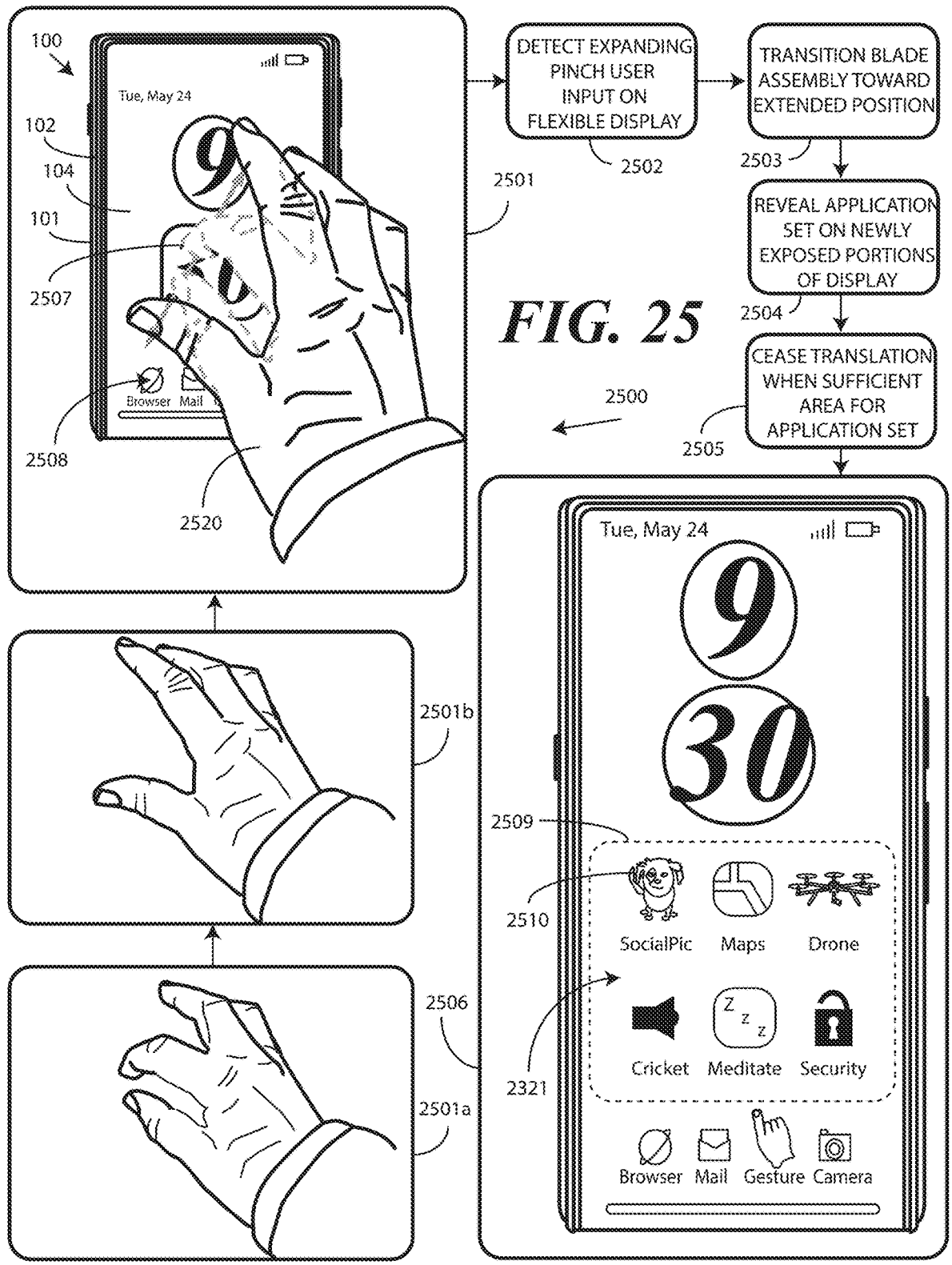
FIG. 25 illustrates one or more method steps in accordance with one or more embodiments of the disclosure.

Now that the general methods of the disclosure have been described, attention will be paid to more specific examples to illustrate how different embodiments function in different context. Turning now to FIG. 25, illustrated therein is one explanatory method 2500 for presenting an application set (2321) configured as an application tray 2506 in response to a pinch gesture 2507.

Beginning at step 2501, illustrated therein is an electronic device 100 having a device housing 101 and a blade assembly 102 carrying a blade and a flexible display 104. The blade assembly 102 is slidably coupled to the device housing 101. A translation mechanism is operable to slide the blade assembly 102 relative to the device housing 101 between an extended position, a retracted position, and a peek position. At step 2501 the blade assembly 102 is in the retracted position. Moreover, one or more processors of the electronic device 100 that are operable with the translation mechanism are presenting a home screen presentation 2508 on front-facing portions of the flexible display 104. Additionally, the electronic device 100 is in an unlocked state.

At step 2501, a user 2520 is delivering a pinch gesture 2507 to the flexible display 104 while the one or more processors of the electronic device 100 are presenting the home screen presentation 2508. In this example, the pinch gesture 2507 is an "expanding" pinch gesture because it starts with the fingers closer together and ends with the fingers further apart, as shown at sub-steps 2501*a* and 2501*b*. At step 2502, the one or more processors of the electronic device 100 detect this pinch gesture 2507.

At step 2503, the one or more processors cause the translation mechanism to translate the blade assembly 102 toward the extended position. At step 2503, the one or more processors present additional content on the front-facing portion of the flexible display 104 that are revealed by the translation of the flexible display 104. At step 2504, the one or more processors cause the translation mechanism to cease translation of the flexible display 104 when an adequate amount 2509 of the flexible display 104 has been revealed on the front-facing portion of the electronic device 100. Step 2503 and step 2504 can be performed in either order.

In this illustrative embodiment, as shown at step 2505, the additional content presented at step 2503 comprises one or more user actuation targets, e.g., user actuation target 2510, corresponding to applications operable on the one or more processors. In this illustrative embodiment, the one or more user actuation targets are configured as an application tray 2506 that is revealed when the flexible display 104 receives the pinch gesture 2507. In one or more embodiments, this application tray 2506 is presented when the flexible display 104 is presenting the home screen presentation 2508 when the pinch gesture 2507 is received.

In the illustrative embodiment of FIG. 25, only six user actuation targets are included in the application tray 2506. However, more applications are installed on the electronic device 100 and are operable with the one or more processors. Accordingly, the applications included in the application tray 2506 define a subset of available applications of the electronic device. If the user 2520 wished to see additional applications, in one or more embodiments the user 2520 could deliver another pinch gesture at step 2505 to cause the blade assembly 102 to translate further toward the extended position, with additional user actuation targets corresponding to additional applications being revealed. This process could continue until the blade assembly 102 reached the extended position, where additional pinch gestures may cause the user actuation targets corresponding to applications operable on the one or more processors to scroll.

Figure 26:
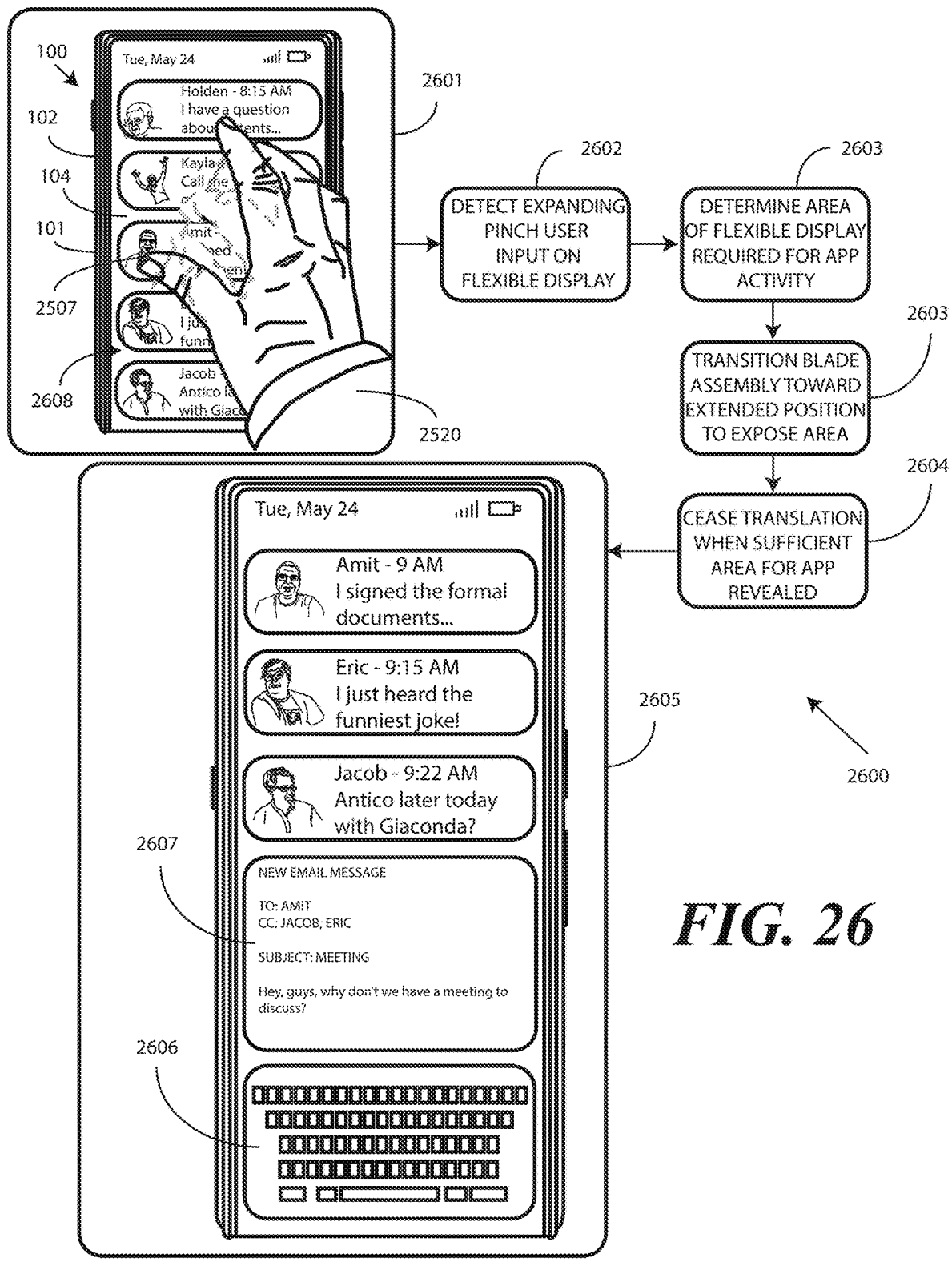
FIG. 26 illustrates one or more method steps in accordance with one or more embodiments of the disclosure.
Figure 27:
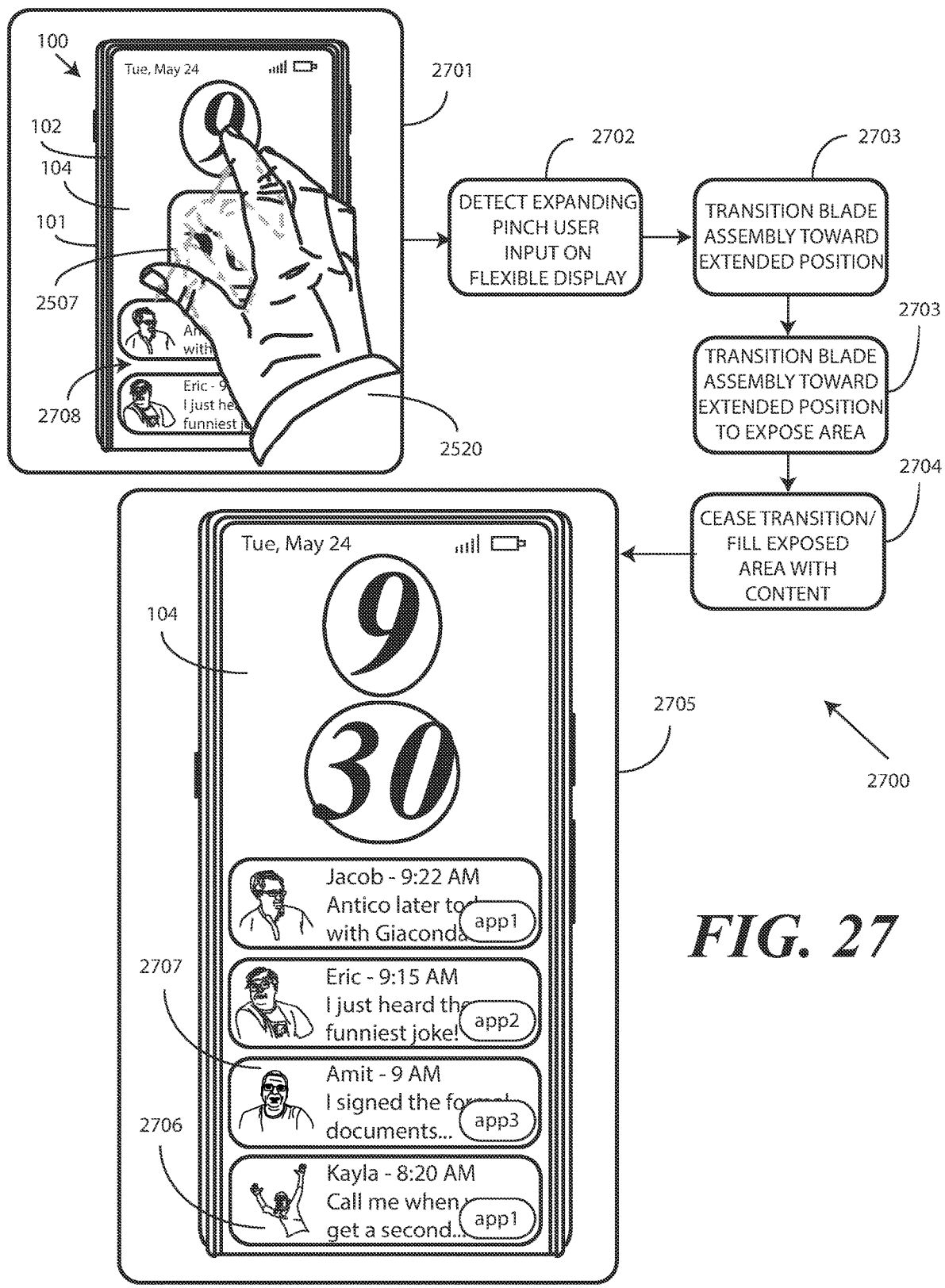
FIG. 27 illustrates one or more method steps in accordance with one or more embodiments of the disclosure.

Turning now to FIG. 26, illustrated therein is another method 2600 illustrating a different content presentation. The method 2600 works largely in the same manner as did the method (2500) of FIG. 25. However, rather than presenting a home screen presentation (2508) initially, the flexible display 104 is presenting an active application interface 2608 of an active application at step 2501. In this example, the active application comprises a text message application.

Step 2601 illustrates is an electronic device 100 having a device housing 101 and a blade assembly 102 carrying a blade and a flexible display 104. The blade assembly 102 is slidably coupled to the device housing 101. A translation mechanism is operable to slide the blade assembly 102 relative to the device housing 101 between an extended position, a retracted position, and a peek position.

At step 2601 the blade assembly 102 is in the retracted position. Moreover, one or more processors of the electronic device 100 that are operable with the translation mechanism are presenting an active application interface 2608 of an active application on front-facing portions of the flexible display 104. Additionally, the electronic device 100 is in an unlocked state.

At step 2601, a user 2520 is again delivering a pinch gesture 2507 to the flexible display 104 while the one or more processors of the electronic device 100 are presenting the active application interface 2608 of an active application. In this example, the pinch gesture 2507 is an "expanding" pinch gesture because it starts with the fingers closer together and ends with the fingers further apart, as shown at sub-step (2501a) and (2501b) of FIG. 25.

At step 2602, the method 2600 detects the pinch gesture 2507 using the flexible display 104 carried by the blade assembly. Since the one or more processors are presenting the active application interface 2608 of an active application, at step 2603 the one or more processors determine an additional display area required by an operating state of the active application.

In this example, the user 2520 wants to respond to one of the text messages. Accordingly, an additional display area is required to present user interface controls 2606 and an editing window 2607. The one or more processors determine the amount of area required for the user interface controls 2606 and the editing window at step 2603.

Step 2603 comprises translating the blade assembly 102 toward the extended position with the translation mechanism in response to the pinch gesture 2507. Step 2604 comprises ceasing the translation when the amount of area required for the user interface controls 2606 and the editing window at step 2603 is revealed on the front-facing portion of the electronic device 100.

As shown at step 2605, application content that is newly presented on the flexible display 104. In this illustration, the application content comprises the user interface controls 2606 and the editing window at step 2603. However, other examples of application content, as well as other applications, will be obvious to those of ordinary skill in the art having the benefit of this disclosure.

While some embodiments of the disclosure only translate the blade assembly 102 in response to the pinch gesture 2507 when the electronic device 100 is in the unlocked state, this is not necessarily always the case. Embodiments of the disclosure contemplate that the user 2520 may want to cause the blade assembly 102 to translate in response to the pinch gesture 2507 when the electronic device 100 is in the locked state as well. Illustrating by example, the user 2520 may want to see additional notifications that have been received without unlocking the electronic device 100. Turning now to FIG. 27, illustrated therein is one method 2700 illustrating how this can occur.

Beginning at step 2701, illustrated therein is an electronic device 100 having a device housing 101 and a blade assembly 102 carrying a blade and a flexible display 104. The blade assembly 102 is slidably coupled to the device housing 101. A translation mechanism is operable to slide the blade assembly 102 relative to the device housing 101 between an extended position, a retracted position, and a peek position. At step 2701 the blade assembly 102 is in the retracted position. Moreover, one or more processors of the electronic device 100 that are operable with the translation mechanism are presenting a locked screen presentation 2708 on front-facing portions of the flexible display 104. Additionally, the electronic device 100 is in a locked state.

At step 2701, a user 2520 is delivering a pinch gesture 2507 to the flexible display 104 while the one or more processors of the electronic device 100 are presenting the locked screen presentation 2708. As with the method (2600) of FIG. 26 and the method (2500) of FIGS. 25-26, respectively, the pinch gesture 2507 of FIG. 27 is an expanding pinch gesture with the user's fingers moving apart during execution of the expanding pinch gesture. At step 2702, the one or more processors of the electronic device 100 detect this pinch gesture 2507.

At step 2703, the one or more processors cause the translation mechanism to translate the blade assembly 102 toward the extended position. At step 2703, the one or more processors present additional content on the front-facing portions of the flexible display 104 that are revealed by the translation of the flexible display 104. At step 2704, the one or more processors cause the translation mechanism to cease translation of the flexible display 104 when an adequate amount of the flexible display 104 has been revealed on the front-facing portion of the electronic device 100.

In this illustrative embodiment, as shown at step 2705, the additional content presented at step 2703 comprises one or more notification messages 2706,2707 that were hidden from the front-facing portion of the flexible display 104 prior to the translation occurring at step 2703. IN this illustrative embodiment, some notification messages, e.g., notification message 2706, are from one application (designated "app1"), while other notification messages, e.g., notification message 2707, is from another, different application (designated "app3"). In other embodiments, each notification message 2706,2707 can be from a single application.

Advantageously, the user 2520 can simply deliver a pinch gesture 2507 to the flexible display 104 to cause it to expand, thereby providing additional area on the front-facing portion of the flexible display 104 for more content, regardless of whether that content is one or more notification messages 2706,2707 that were hidden from the front-facing portion of the flexible display 104 prior to the translation occurring at step 2703, user interface controls, application content, an application tray, user actuation targets, or other content.

Figure 28:
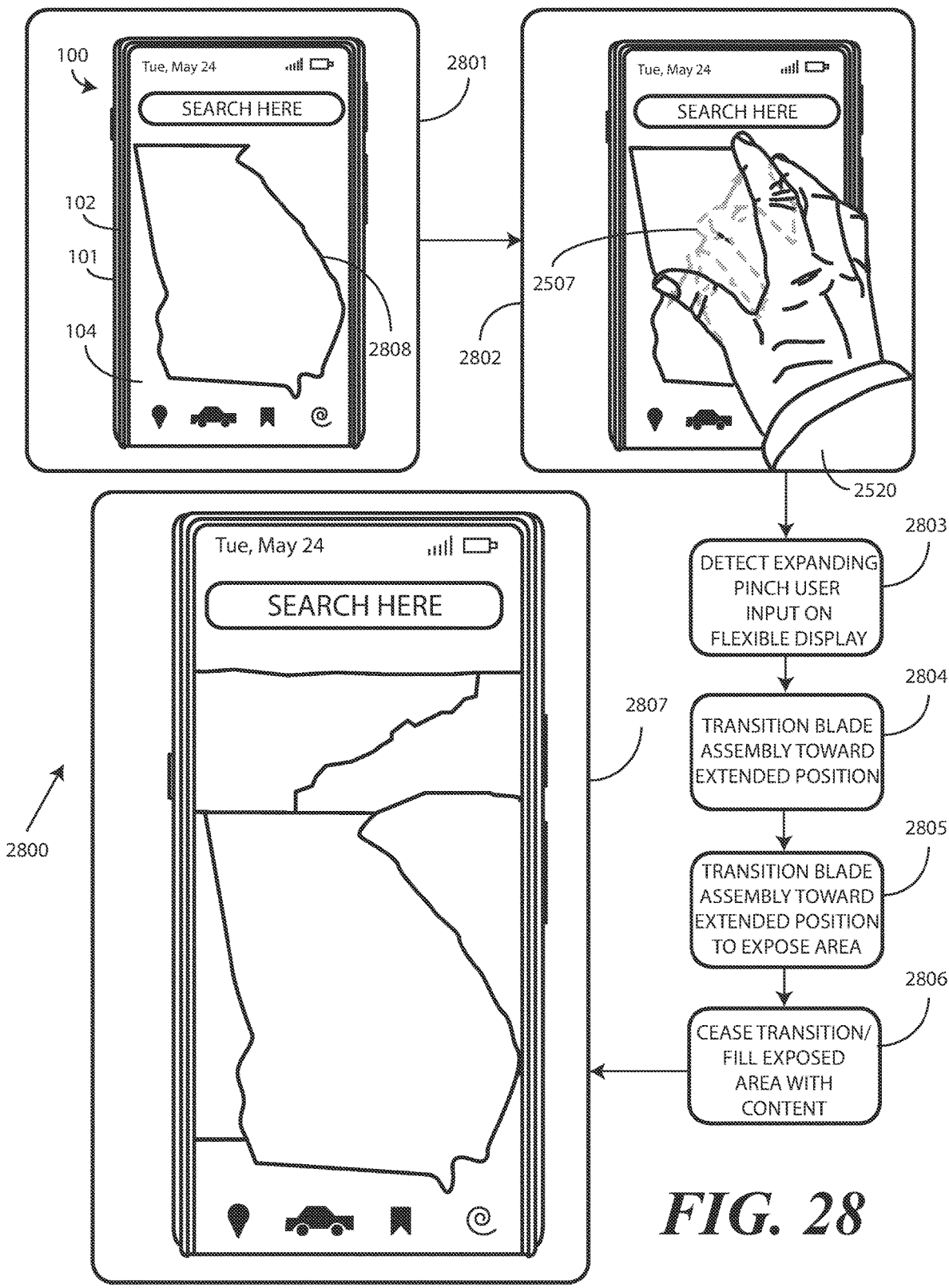
FIG. 28 illustrates one or more method steps in accordance with one or more embodiments of the disclosure.

Turning now to FIG. 28, illustrated therein is still another method 2800 in accordance with one or more embodiments of the disclosure. As previously described, when an expanding pinch gesture is detected one or more processors (114) of an electronic device 100 can cause a translation mechanism of the electronic device 100 to translate the blade assembly 102 toward the extended position. Additionally, the one or more processors (114) can present additional content on the front-facing portion of the flexible display 104 that are revealed by the translation of the flexible display 104.

This additional content can take a variety of forms, several of which have been illustrated and described above with reference to the methods (2500,2600,2700) of FIGS. 25-27. Other examples of content that can be presented include maps (as is the case in FIG. 28), documents, images, and so forth. Examples of some of these other types of content will be described in more detail below. Still others will be obvious to those of ordinary skill in the art having the benefit of this disclosure.

In one or more embodiments, the additional content comprises application content. Such is the case in the method 2800 of FIG. 28. To wit, at step 2801 illustrated therein is an electronic device 100 having a device housing 101 and a blade assembly 102 carrying a blade and a flexible display 104. The blade assembly 102 is slidably coupled to the device housing 101. A translation mechanism is operable to slide the blade assembly 102 relative to the device housing 101 between an extended position, a retracted position, and a peek position.

At step 2801 the blade assembly 102 is in the retracted position. Rather than being in a locked mode of operation or presenting a default home screen, in the method 2800 of FIG. 28 an application operating on the one or more processors (114) of the electronic device 100 is presenting content 2808. In this illustrative embodiment, the application is a navigation application and the flexible display 104 is presenting the content 2808 as a map defined by an active application interface of the active application.

As shown, the navigation application presents a map depicting an outline of the state of Georgia, USA. The outline of Georgia is a portion of a larger map of the United States. While portions of a map are used for illustrative purposes in the method 2800 of FIG. 28, portions of a document could be presented by a word processing application in a similar manner.

In this illustrative embodiment, the content 2808 generated by the navigation application comprises a user interface control of the application. The map is "touch sensitive" in that a user 2520 can perform user interface control operations by touching the flexible display 104.

At step 2802, a user 2520 is delivering a pinch gesture 2507 to the flexible display 104 while the navigation application operating on the one or more processors (114) of the electronic device 100 is generating the navigation application user interface control comprising the portions of the map. As with previous methods, the pinch gesture 2507 of FIG. 28 is an expanding pinch gesture with the user's fingers moving apart during execution of the expanding pinch gesture. At step 2803, the one or more processors (114) of the electronic device 100 detect this pinch gesture 2507.

At step 2804, the one or more processors (114) cause the translation mechanism to translate the blade assembly 102 toward the extended position. At step 2805, the one or more processors present additional content on the front-facing portions of the flexible display 104 that are revealed by the translation of the flexible display 104. At step 2806, the one or more processors cause the translation mechanism to cease translation of the flexible display 104 when an adequate amount of the flexible display 104 has been revealed on the front-facing portion of the electronic device 100.

In this illustrative embodiment, as shown at step 2807, the additional content presented at step 2805 comprises additional portions of the map. Now, in addition to Georgia, portions of South Carolina, Alabama, Tennessee, and North Carolina can additionally be seen due to the fact that the amount of area present on the front-facing portion of the flexible display 104 is enlarged.

Advantageously, the user 2520 can simply deliver a pinch gesture 2507 to the flexible display 104 to cause it to expand, thereby providing additional area on the front-facing portion of the flexible display 104 for more content, be it additional portions of an image, additional portions of a map, additional portions of an image, and so forth.

Figure 29:
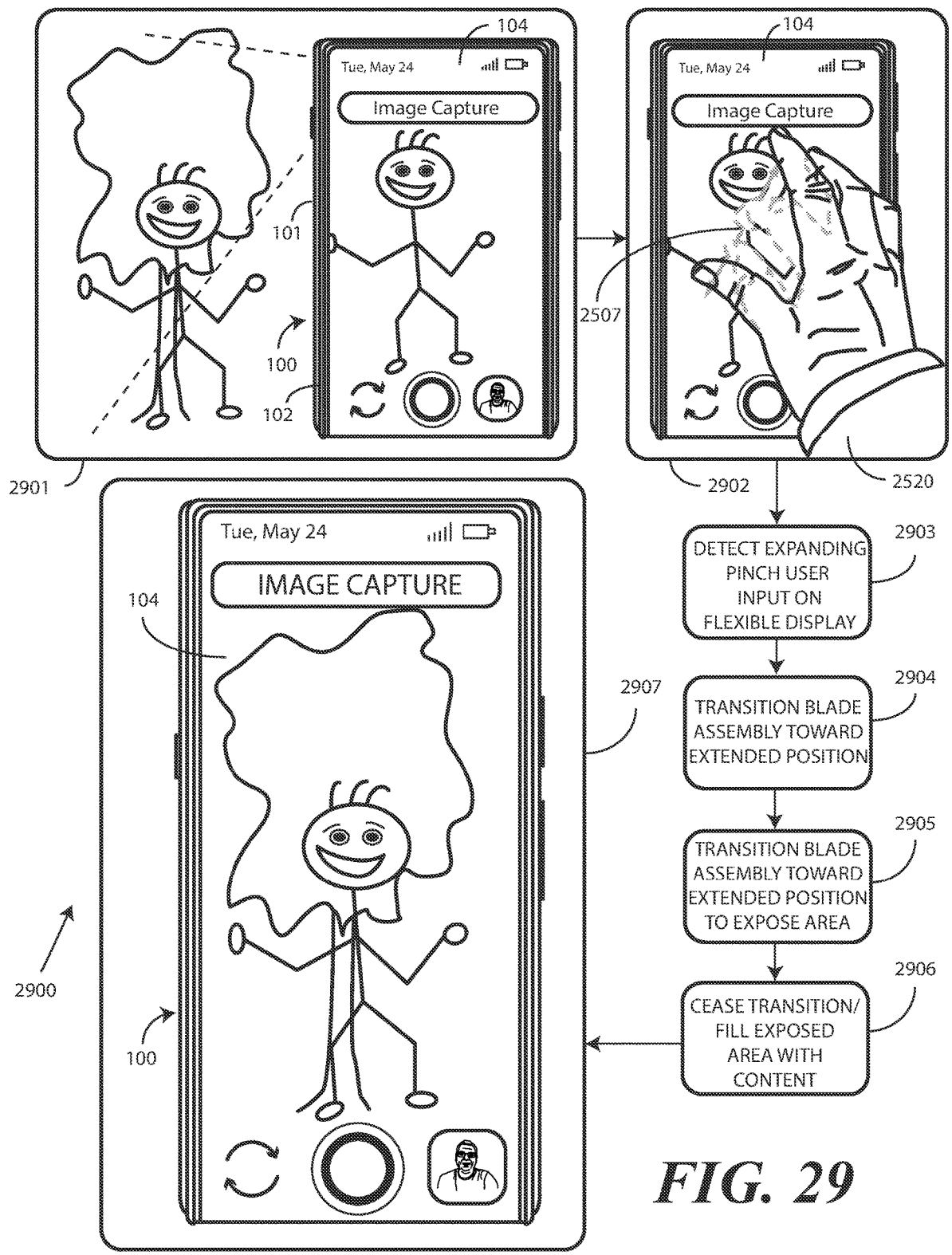
FIG. 29 illustrates one or more method steps in accordance with one or more embodiments of the disclosure.

To this point, most of the examples have been directed to generic pinch gestures, be they expanding pinch gesture or contracting pinch gesture. Embodiments of the disclosure contemplate that when the content being presented by an application operating on the one or more processors of the electronic device are items such as images, documents, maps, or preview images from a viewfinder mode of an image capture application, a pinch gesture—or other type of gesture such as that described below with reference to FIG. 30—can operate as a zoom gesture that zooms—in or out—the content being presented on the display. Turning now to FIG. 29, illustrated therein is one such method 2900.

Beginning at step 2901, an image capture application is operating on the one or more processors (114) of the electronic device 100. The image capture application is operating in a viewfinder mode at step 2901 with a rear-facing imager capturing preview images of a subject. At step 2901 the electronic device 100 includes a device housing 101 and a blade assembly 102 carrying a blade and a flexible display 104. The blade assembly 102 is slidably coupled to the device housing 101. A translation mechanism is operable to slide the blade assembly 102 relative to the device housing 101 between an extended position, a retracted position, and a peek position.

At step 2901 the blade assembly 102 is in the retracted position. Rather than being in a locked mode of operation or presenting a default home screen, the electronic device 100 is in an unlocked mode with an image capture application operating on the one or more processors (114) of the electronic device. The image capture application is presenting content in the form of the one or more preview images from the viewfinder mode of the image capture application.

The one or more preview images constitute content being generated by an active application interface of the active application. In this illustrative embodiment, the content generated by the navigation application comprises a user interface control of the application. The preview images are "touch sensitive" in that a user 2520 can perform user interface control operations by touching the flexible display 104.

At step 2902, a user 2520 is delivering a pinch gesture 2507 to the flexible display 104 while the image capture application is operating on the one or more processors (114) of the electronic device 100. As with previous methods, the pinch gesture 2507 of FIG. 29 is an expanding pinch gesture with the user's fingers moving apart during execution of the expanding pinch gesture. At step 2903, the one or more processors (114) of the electronic device 100 detect this pinch gesture 2507.

At step 2904, the one or more processors (114) cause the translation mechanism to translate the blade assembly 102 toward the extended position. At step 2905, the one or more processors present additional content on the front-facing portions of the flexible display 104 that are revealed by the translation of the flexible display 104. At step 2906, the one or more processors cause the translation mechanism to cease translation of the flexible display 104 when an adequate amount of the flexible display 104 has been revealed on the front-facing portion of the electronic device 100.

In this illustrative embodiment, as shown at step 2907, the field of view of the image capture device, as shown on the flexible display 104, has expanded in response to the pinch gesture 2507 due to the fact that the pinch gesture 2507 operates as a zoom gesture when the image capture application is operating on the one or more processors (114) of the electronic device 100. Thus, while step 2901 included presenting a viewfinder via one or more images captured while the image capture application was operating in the viewfinder mode, step 2907 comprises, after the translation of the blade assembly 102 occurs, presenting an additional field of view of the viewfinder via one or more additional images on front-facing areas of the flexible display 104 that are revealed by the translation.

In this illustrative example, the additional field of view reveals additional background in the form of a tree behind a subject of the image capture operation of the image capture application. As can be seen by comparing step 2901 and 2907, the depictions of the subject both before the translating and after the translating have the same dimensions. Of course, as with previous methods the method 2900 of FIG. 29 could repeat with the flexible display 104 again detecting additional user input defining another zoom gesture, the translation mechanism again translating the blade assembly toward the extended position in response to the another zoom gesture. The one or more processors could then again expand the additional field of view of the viewfinder on another front-facing area of the flexible display that is newly exposed in response to the additional user input, and so forth. Advantageously, the user 2520 can simply deliver a pinch gesture 2507 to the flexible display 104 to cause it to expand, thereby providing additional area on the front-facing portion of the flexible display 104 for more content, be it additional portions from a viewfinder mode of an image capture application, images captured by an image capture application, additional portions of a map, additional portions of a document, and so forth.

Figure 30:
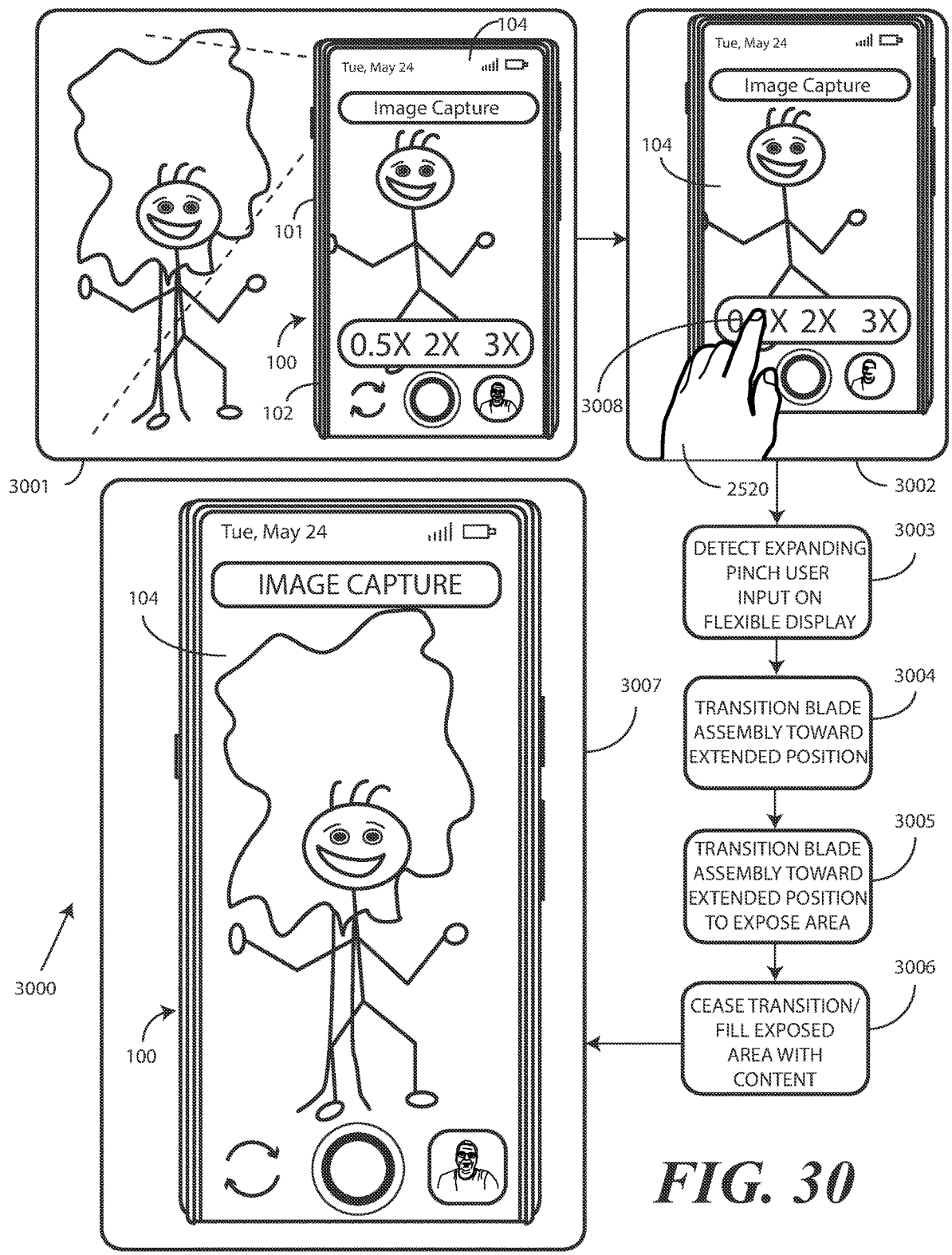
FIG. 30 illustrates one or more method steps in accordance with one or more embodiments of the disclosure.

While an expanding pinch gesture or a contracting pinch gesture can function as a zoom gesture when an image capture application is operating on one or more processors of the electronic device, embodiments of the disclosure are not so limited. Turning now to FIG. 30, illustrated therein is another method 3000 where a zoom gesture does not include any pinch gesture.

Beginning at step 3001, an image capture application is operating on the one or more processors (114) of the electronic device 100. The image capture application is operating in a viewfinder mode at step 3001 with a rear-facing imager capturing preview images of a subject. At step 3001 the electronic device 100 includes a device housing 101 and a blade assembly 102 carrying a blade and a flexible display 104. The blade assembly 102 is slidably coupled to the device housing 101. A translation mechanism is operable to slide the blade assembly 102 relative to the device housing 101 between an extended position, a retracted position, and a peek position.

At step 3001 the blade assembly 102 is in the retracted position. Rather than being in a locked mode of operation or presenting a default home screen, the electronic device 100 is in an unlocked mode with an image capture application operating on the one or more processors (114) of the electronic device. The image capture application is presenting one or more preview images of a viewfinder on the flexible display 104.

The one or more preview images constitute content being generated by an active application interface of the active application. In this illustrative embodiment, the content generated by the navigation application comprises a user interface control of the application. The viewfinder images are "touch sensitive" in that a user 2520 can perform user interface control operations by touching the flexible display 104.

At step 3002, a user 2520 is delivering a zoom gesture to the flexible display 104. Rather than being a pinch gesture, in the illustrative embodiment of FIG. 30 comprises actuation 3008 of a zoom user actuation target presented when the image capture application is operating in the viewfinder mode. In this example, three such user actuation targets are presented, with one zooming out to 0.5× what is shown at step 3001, another zoom user actuation target zooming in to 2× of what is shown at step 3001, and still another zoom user actuation target zooming in to 3× of what is shown at step 3001. While three such zoom user actuation targets are shown in FIG. 30, fewer or more could be presented in other embodiments.

At step 3003, the one or more processors (114) of the electronic device 100 detect this zoom gesture. At step 3004, the one or more processors (114) cause the translation mechanism to translate the blade assembly 102 toward the extended position due to the fact that the user actuation target actuated zooms out.

At step 3005, the one or more processors present additional content on the front-facing portions of the flexible display 104 that are revealed by the translation of the flexible display 104. At step 3006, the one or more processors cause the translation mechanism to cease translation of the flexible display 104 when an adequate amount of the flexible display 104 has been revealed on the front-facing portion of the electronic device 100.

In this illustrative embodiment, as shown at step 3007, the field of view of the image capture device, as shown on the flexible display 104, has expanded in response to the zoom gesture. Thus, while step 3001 included presenting a viewfinder via one or more images captured while the image capture application was operating in the viewfinder mode, step 3007 comprises, after the translation of the blade assembly 102 occurs, presenting an additional field of view of the viewfinder via one or more additional images on front-facing areas of the flexible display 104 that are revealed by the translation.

In this illustrative example, the additional field of view reveals additional background in the form of a tree behind a subject of the image capture operation of the image capture application. As can be seen by comparing step 3001 and 3007, the depictions of the subject both before the translating and after the translating have the same dimensions.

Of course, as with previous methods the method 3000 of FIG. 30 could repeat with the flexible display 104 again detecting additional user input defining another zoom gesture, the translation mechanism again translating the blade assembly toward the extended position in response to the another zoom gesture. The one or more processors could then again expand the additional field of view of the viewfinder on another front-facing area of the flexible display that is newly exposed in response to the additional user input, and so forth. Advantageously, the user 2520 can simply deliver a zoom gesture to the flexible display 104 to cause it to expand, thereby providing additional area on the front-facing portion of the flexible display 104 for more content, be it additional portions from a viewfinder mode of an image capture application, images captured by an image capture application, additional portions of a map, additional portions of a document, and so forth.

Figure 31:
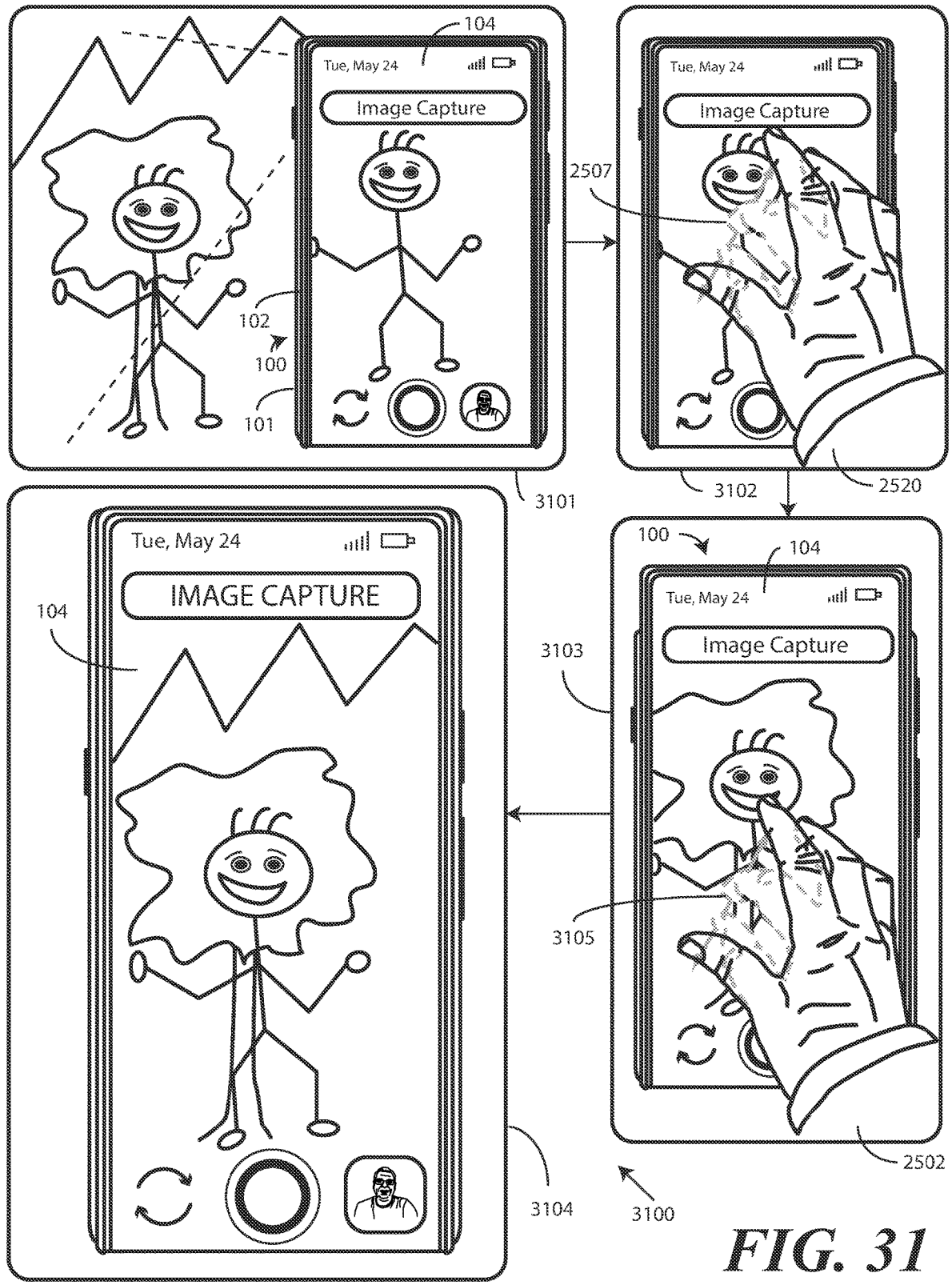
FIG. 31 illustrates one or more method steps in accordance with one or more embodiments of the disclosure.

This technique of repeating a zoom gesture to cause continued expansion or retraction of the front-facing portion of the flexible display 104 is illustrated in FIG. 31. Beginning at step 3101 an electronic device 100 comprises a device housing 101 and a blade assembly 102 carrying a blade and a flexible display 104. At step 3101, the blade assembly 102 is slidably coupled to the device housing 101. A translation mechanism is operable to slide the blade assembly 102 relative to the device housing 101 between an extended position, a retracted position, and a peek position.

In one or more embodiments, the electronic device 100 includes a rear-facing imager (108) that is exposed regardless of whether the blade assembly 102 is in the extended position, the retracted position, or the peek position. In one or more embodiments, the electronic device 100 also includes a front-facing imager (501) that is only exposed when the blade assembly 102 is in the peek position, as described above with reference to FIG. 5.

At step 3101, an image capture application is operating on the one or more processors (114) of the electronic device 100. The image capture application is operating in a viewfinder mode at step 3101 with the rear-facing imager (108) capturing preview images of a subject.

At step 3101 the blade assembly 102 is in the retracted position. Rather than being in a locked mode of operation or presenting a default home screen, the electronic device 100 is in an unlocked mode with an image capture application operating on the one or more processors (114) of the electronic device. The image capture application is presenting content in the form of the one or more preview images from the viewfinder mode of the image capture application.

At step 3102, a user 2520 is delivering a pinch gesture 2507 to the flexible display 104 while the image capture application is operating on the one or more processors (114) of the electronic device 100. As with previous methods, the pinch gesture 2507 is an expanding pinch gesture with the user's fingers moving apart during execution of the expanding pinch gesture.

The one or more processors (114) of the electronic device 100 then detect this pinch gesture as previously described, with the one or more processors (114) causing the translation mechanism to translate the blade assembly 102 toward the extended position.

The result is shown at step 3103, where the one or more processors (114) present additional content on the front-facing portions of the flexible display 104 that are revealed by the translation of the flexible display 104. In one or more embodiments, this translation occurs only when the viewfinder mode is being used with the rear-facing imager (108), as translation would not make sense for the front-facing imager (501) since the only position in which the front-facing imager (501) would operate in the viewfinder mode is when the blade assembly 102 is in the peek position. Any translation from this point would conceal the front-facing imager (501). Accordingly, in one or more embodiments the one or more processors (114) ignore zoom gestures when the front-facing imager (501) is operating in the viewfinder mode.

As shown at step 3103, the field of view of the image capture device presented on the flexible display has expanded in response to the pinch gesture 2507 due to the fact that the pinch gesture 2507 operates as a zoom gesture when the image capture application is operating on the one or more processors (114) of the electronic device 100. Thus, while step 3101 included presenting a viewfinder via one or more images captured while the image capture application was operating in the viewfinder mode, step 3103 comprises presenting an additional field of view of the viewfinder via one or more additional images on front-facing areas of the flexible display that are revealed by the translation. In this illustrative example, the additional field of view reveals additional background in the form of a tree behind a subject of the image capture operation of the image capture application.

As shown at step 3103, the user 2520 is delivering another zoom gesture 3105 to the flexible display 104 of the electronic device 100. Accordingly, the method 3100 comprises again detecting, with the flexible display 104, additional user input defining the additional zoom gesture 3105. In one or more embodiments, the method 3100 then again translates, using the translation mechanism, the blade assembly 102 toward the extended position in response to the additional zoom gesture 3105.

As shown at step 3104, this results in the one or more processors expanding yet another field of view of the viewfinder mode on another front-facing area of the flexible display 104 that is newly exposed in response to the additional zoom gesture 3105. By comparing step 3103 and 3104, the one or more processors (114) present a viewfinder interface presentation on a front-facing portion of the flexible display 104 when the additional zoom gesture 3105 is received. The one or more processors (114) can then determine an additional display area defined by the zoom gesture 3105. At step 3104, the one or more processors (114) have presented still another field of view content in still additional display areas revealed by the translation. While the subject and a tree are visible at step 3103, the subject, the tree, and a mountain range are visible at step 3104 as one illustrative example of how this can occur.

Figure 32:
FIG. 32 illustrates one or more method steps in accordance with one or more embodiments of the disclosure.

While examples so far have been directed to expanding pinch or zoom gestures, embodiments of the disclosure can process contracting pinch or zoom gestures as well. Turning now to FIG. 32, illustrated therein is one explanatory method 3200 illustrating how this can occur.

Beginning at step 3201 an electronic device 100 comprises a device housing 101 and a blade assembly 102 carrying a blade and a flexible display 104. At step 3201, the blade assembly 102 is slidably coupled to the device housing 101. A translation mechanism is operable to slide the blade assembly 102 relative to the device housing 101 between an extended position, a retracted position, and a peek position.

The rear-facing imager (108), which is exposed regardless of whether the blade assembly 102 is in the extended position, the retracted position, or the peek position is operating in a viewfinder mode while an image capture application is operating on the one or more processors (114) of the electronic device 100. At step 3201 the blade assembly 102 is in the extended position.

The electronic device 100 is in an unlocked mode with an image capture application operating on the one or more processors (114) of the electronic device. The image capture application is presenting content in the form of the one or more preview images from the viewfinder mode of the image capture application.

At step 3201, a user 2520 is delivering a pinch gesture 3501 to the flexible display 104 while the image capture application is operating on the one or more processors (114) of the electronic device 100. In contrast to previous methods, the pinch gesture 3501 of step 3201 is a contracting pinch gesture with the user's fingers moving closer together during execution of the expanding pinch gesture.

The one or more processors (114) of the electronic device 100 then detect this pinch gesture 3205 as previously described. However, since the pinch gesture 3205 is a contracting pinch gesture, the one or more processors (114) cause the translation mechanism to translate the blade assembly 102 toward the retracted position. In one or more embodiments, this translation occurs only when the viewfinder mode is being used with the rear-facing imager (108), as previously described.

The result is shown at step 3202, where the one or more processors (114) remove content from the front-facing portions of the flexible display 104 that are concealed by the translation of the flexible display 104. While a subject, a tree, and mountains were being presented in the viewfinder view of step 3201, the mountains are no longer visible at step 3202.

As shown at step 3203, the user 2520 is delivering another zoom gesture 3206 to the flexible display 104 of the electronic device 100. Accordingly, the method 3200 comprises again detecting, with the flexible display 104, additional user input defining the additional zoom gesture 3206. In one or more embodiments, the method 3200 then again translates, using the translation mechanism, the blade assembly 102 toward the retracted position in response to the additional zoom gesture 3206.

As shown at step 3204, this results in the one or more processors reducing yet another field of view of the viewfinder mode on another front-facing area of the flexible display 104 that is newly concealed in response to the additional zoom gesture 3206. By comparing step 3203 and 3204, the one or more (114) present a viewfinder interface presentation on a front-facing portion of the flexible display 104 when the additional zoom gesture 3206 is received. The one or more processors (114) can then determine how much reduction is required by the zoom gesture 3206.

At step 3204, the one or more processors (114) have presented still another field of view content in still additional display areas revealed by the translation. While the subject and a tree are visible at step 3203, only the subject is visible at step 3204 as one illustrative example of how this can occur.

Figure 33:
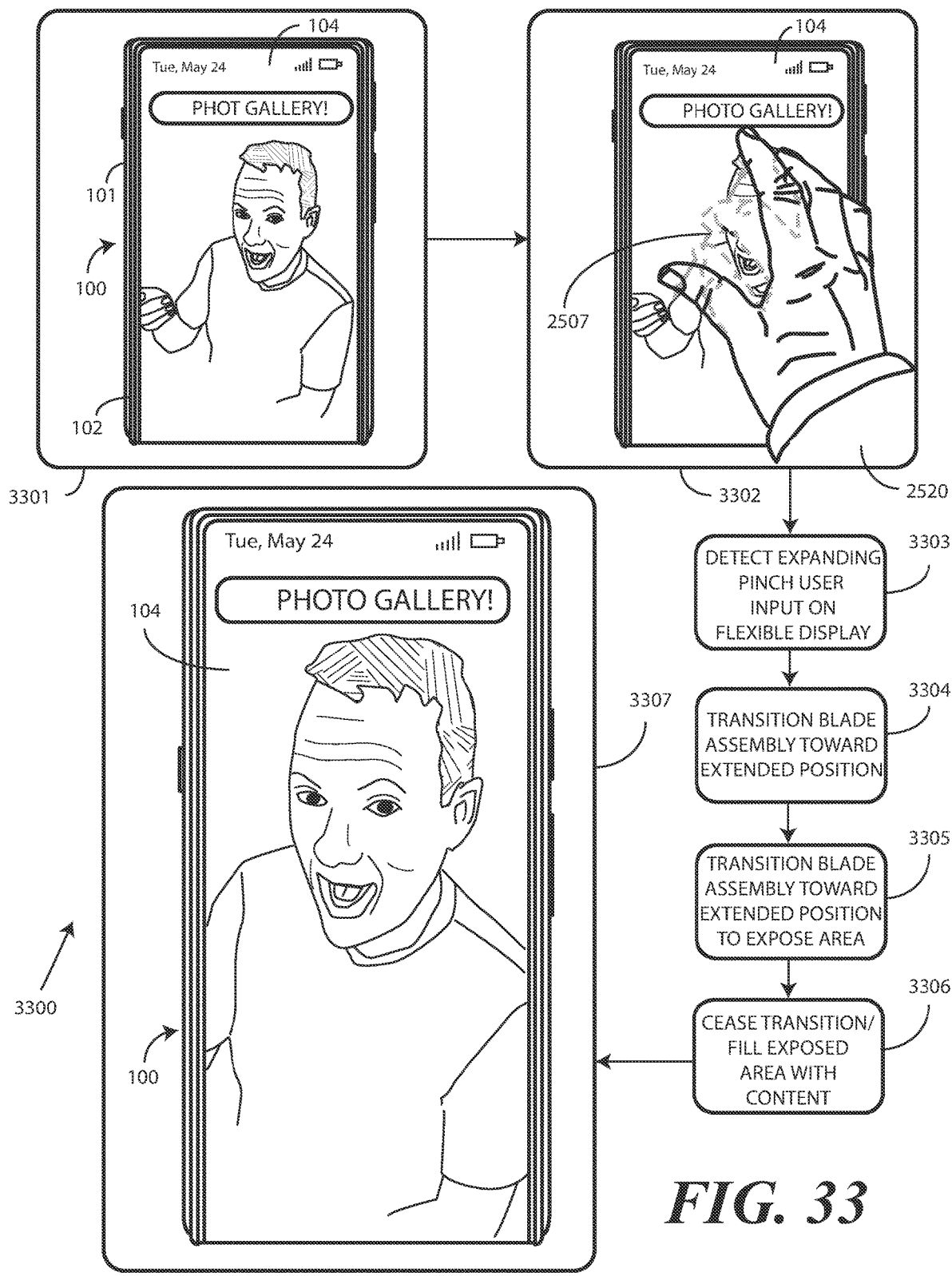
FIG. 33 illustrates one or more method steps in accordance with one or more embodiments of the disclosure.

While zoom gestures can be received while an image capture application is operating on the one or more processors (114) of the electronic device 100, embodiments of the disclosure contemplate that zoom gestures can be delivered when other applications are operating on the one or more processors (114) as well. Examples of other applications include a word processing application presenting a document on the flexible display 104, a photo gallery application presenting pictures or videos on the flexible display 104, a web browser presenting web pages on the flexible display 104, and so forth. Turning now to FIG. 33, illustrated therein is a method 3300 that serves as an example of how this can occur.

As previously described, when an expanding zoom gesture is detected one or more processors (114) of an electronic device 100 can cause a translation mechanism of the electronic device 100 to translate the blade assembly 102 toward the extended position. While the one or more processors (114) can present additional content on the front-facing portion of the flexible display 104 that are revealed by the translation of the flexible display 104 in some embodiments, in other embodiments zoom operations can occur in conjunction with the transitioning of the blade assembly 102.

At step 3301 an electronic device 100 has a device housing 101 and a blade assembly 102 carrying a blade and a flexible display 104. The blade assembly 102 is slidably coupled to the device housing 101. A translation mechanism is operable to slide the blade assembly 102 relative to the device housing 101 between an extended position, a retracted position, and a peek position.

At step 3301 the blade assembly 102 is in the retracted position. Rather than being in a locked mode of operation or presenting a default home screen, in the method 3300 of FIG. 33 an application operating on the one or more processors (114) of the electronic device 100 is presenting content. In this illustrative embodiment, the application is a photo gallery application and the flexible display 104 is presenting the content as an image from the active application interface of the active application.

In this illustrative embodiment, the content generated by the photo gallery application comprises a user interface control of the application. The image is "touch sensitive" in that a user 2520 can perform user interface control operations by touching the flexible display 104.

At step 3302, a user 2520 is delivering a pinch gesture 2507 to the flexible display 104 while the photo gallery application operating on the one or more processors (114) of the electronic device 100 is generating the photo gallery application user interface control comprising the portions of the image. As with previous methods, the pinch gesture 2507 of FIG. 33 is an expanding pinch gesture with the user's fingers moving apart during execution of the expanding pinch gesture. At step 3303, the one or more processors (114) of the electronic device 100 detect this pinch gesture 2507.

At step 3304, the one or more processors (114) cause the translation mechanism to translate the blade assembly 102 toward the extended position. At step 3305, rather than presenting additional content on the front-facing portions of the flexible display 104 that are revealed by the translation of the flexible display 104, the one or more processors (114) cause the portion of the image presented at step 3301 to enlarge. At step 3306, the one or more processors cause the translation mechanism to cease translation of the flexible display 104 when an adequate amount of the flexible display 104 has been revealed on the front-facing portion of the electronic device 100.

In this illustrative embodiment, as shown at step 3307, the portion of the image has become enlarged on the flexible display 104 of the electronic device 100. Advantageously, the user 2520 can simply deliver a pinch gesture 2507 to the flexible display 104 to cause it to expand, thereby providing additional area on the front-facing portion of the flexible display 104 as well as magnifying the content, be it an image, a map, or other content.

Figure 34:
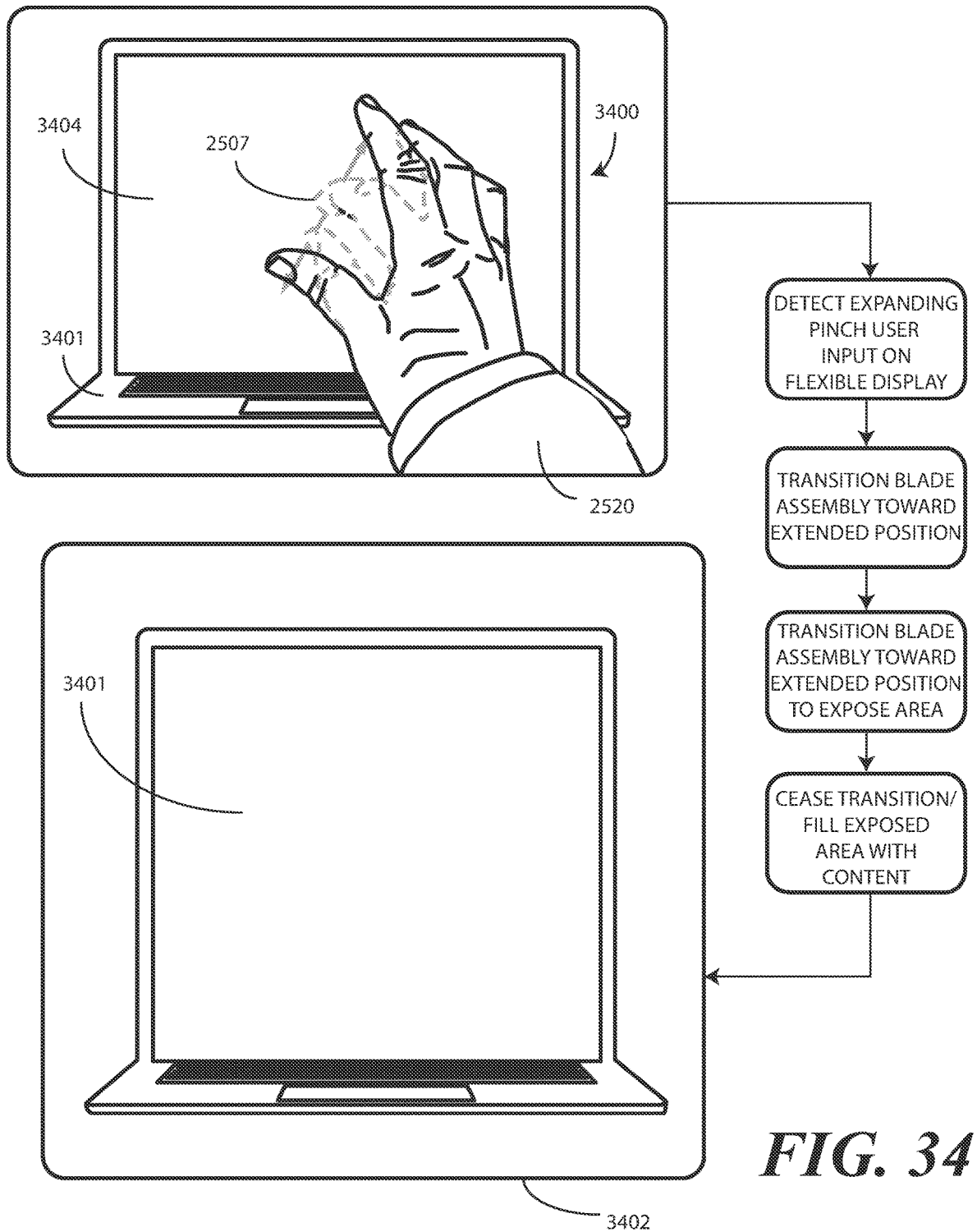
FIG. 34 illustrates one or more method steps in accordance with one or more embodiments of the disclosure.

While electronic devices in accordance with embodiments of the disclosure can be configured as shown in FIG. 1, they can be configured in other ways as well. Illustrating by example, turning now to FIG. 34, illustrated therein is another electronic device 3400 configured as a laptop computer. The laptop computer has a flexible display 3404 that rolls up as it enters a device housing 3401. When a user 2520 delivers a pinch gesture 2507, this can cause the flexible display 3404 to expand and contract, depending upon whether the pinch gesture 2507 is a contracting pinch gesture or a expanding pinch gesture as previously described. In FIG. 34 the pinch gesture 2507 is an expanding pinch gesture, which causes the flexible display 3404 to expand as shown at step 3402.

Figure 35:
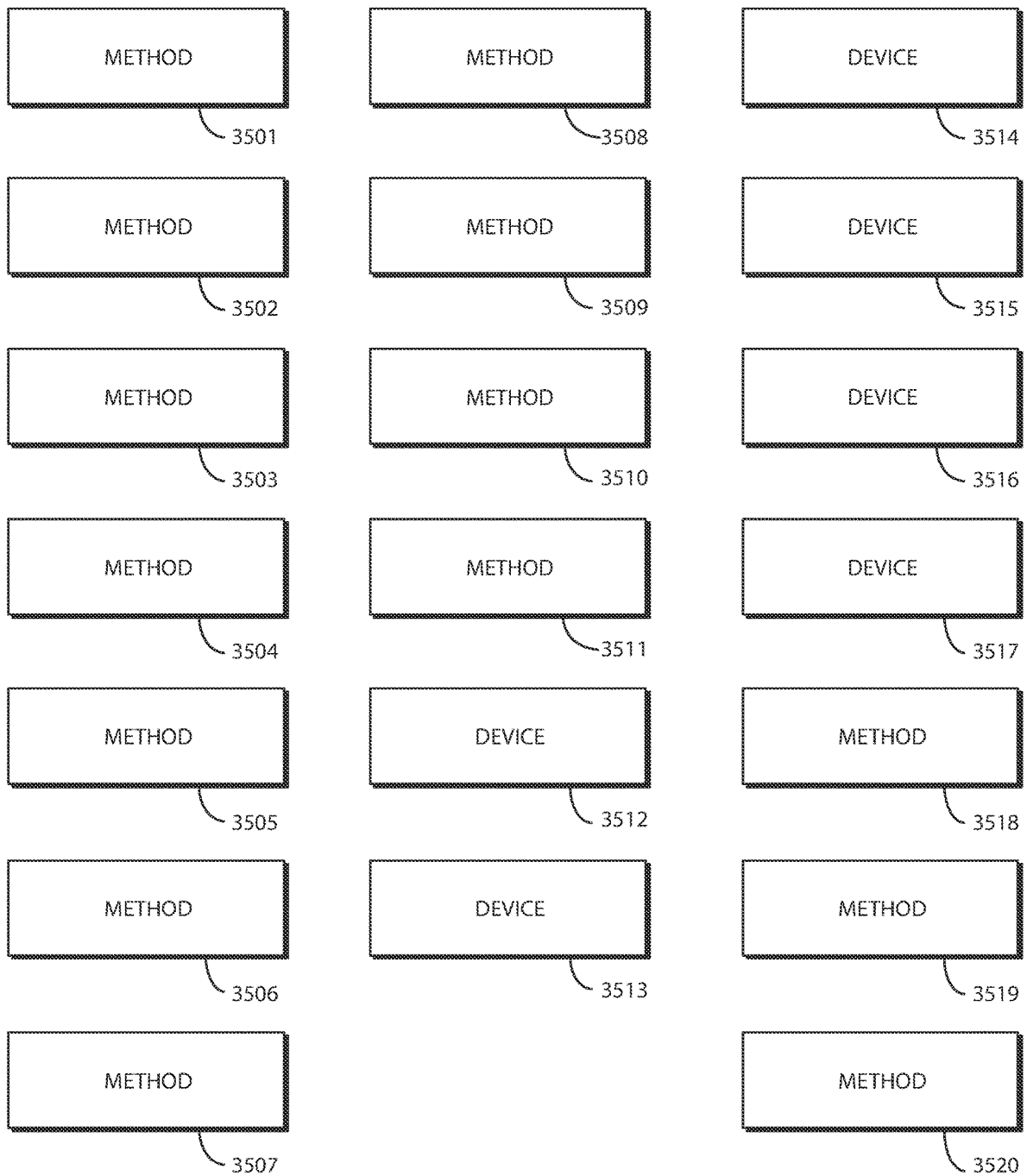
FIG. 35 illustrates one or more embodiments of the disclosure.
Figure 36:
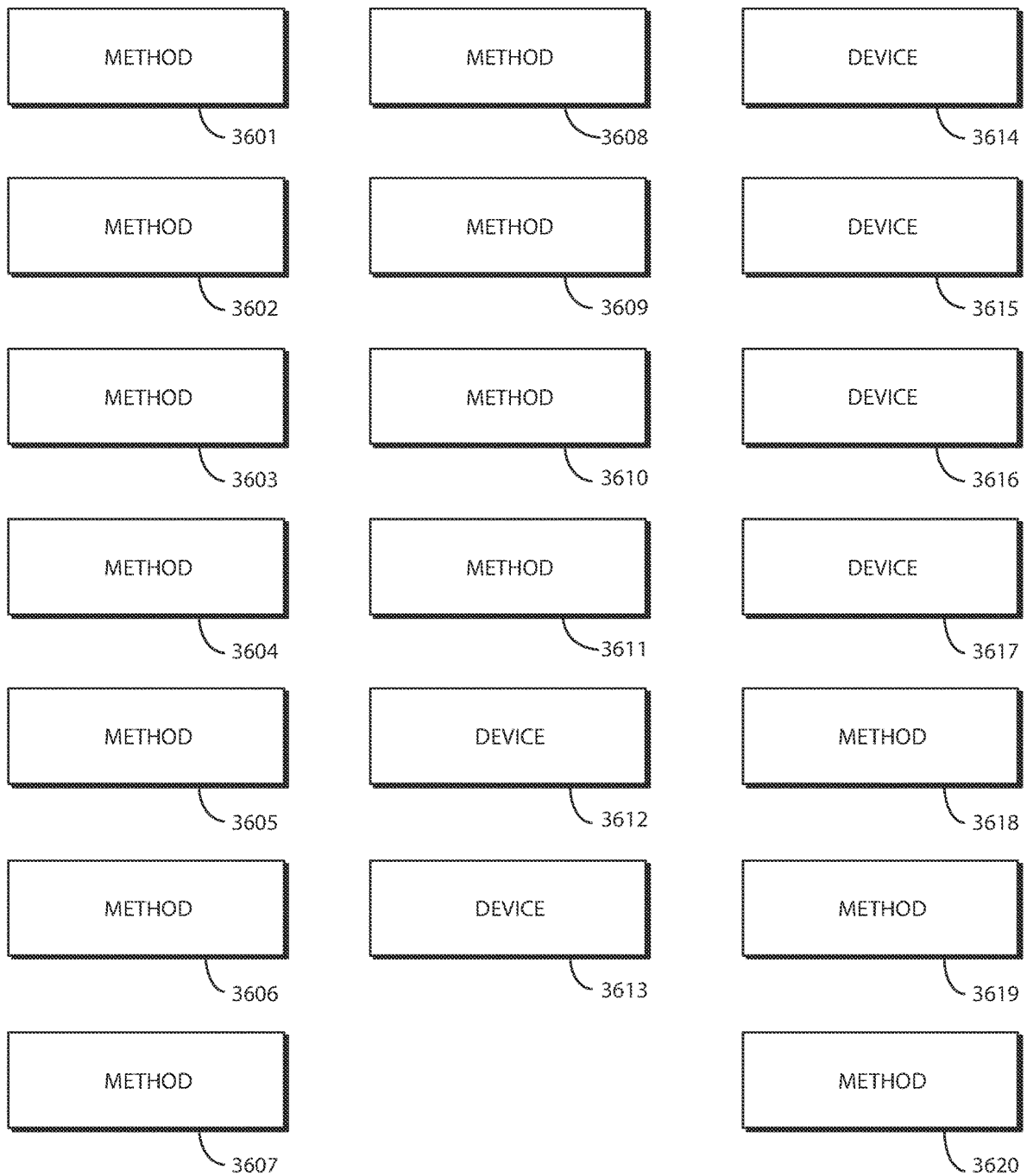
FIG. 36 illustrates one or more other embodiments of the disclosure.

Turning now to FIGS. 35-36, illustrated therein are various embodiments of the disclosure. The embodiments of FIGS. 35-36 are shown as labeled boxes in FIGS. 35-36 due to the fact that the individual components of these embodiments have been illustrated in detail in FIGS. 1-34, which precede FIGS. 35-36. Accordingly, since these items have previously been illustrated and described, their repeated illustration is no longer essential for a proper understanding of these embodiments. Thus, the embodiments are shown as labeled boxes.

Beginning with FIG. 35, at 3501 a method in an electronic device comprises detecting, with a flexible display carried by a blade assembly that is slidably coupled to a device housing and movable between at least an extended position and a retracted position, user input defining an expanding pinch gesture. At 3501, the method comprises translating, by a translation mechanism operable with the blade assembly, the blade assembly toward the extended position in response to the expanding pinch gesture.

At 3502, the translating of 3501 occurs only when the electronic device is in an unlocked state when the user input defining the expanding pinch gesture is detected. At 3503, the method of 3502 further comprises presenting, by one or more processors operable with the flexible display, application generated content on a front-facing portion of the flexible display while the user input is received. At 3503, the method comprises presenting, by the one or more processors after the translating occurs, additional application generated content on a front-facing area of the flexible display that is exposed by the translating.

At 3504, the additional application generated content of 3503 comprises a content creation window. At 3505, the additional application generated content of 3503 comprises a map. At 3506, the additional application generated content of 3503 comprises a document. At 3507, the additional application generated content of 3503 comprises an image.

At 3508, the method of 3503 further comprises again detecting, with the flexible display, additional user input defining another expanding pinch gesture. At 3508, the method comprises again translating, by the translation mechanism, the blade assembly toward the extended position in response to the another expanding pinch gesture. At 3508, the method comprises presenting, by the one or more processors, expanded application generated content on another front-facing area of the flexible display that is newly exposed in response to the additional user input.

At 3509, the method of 3502 comprises presenting, by one or more processors operable with the flexible display, an active application interface presentation of an active application on a front-facing portion of the flexible display while the user input occurs. At 3509, the method comprises determining, by the one or more processors, an additional display area required by an operating state of the active application. At 3509, the method comprises presenting, by the one or more processors after the translating occurs, additional active application content in the additional display area revealed by the translating.

At 3510, the translating of 3509 occurs in an amount defined by a function of the additional display area. At 3511, the blade assembly of 3501 is further movable to a peek position revealing an image capture device.

At 3512, an electronic device comprises a device housing and a blade assembly carrying a blade and a flexible display and slidably coupled to the device housing. At 3512, the electronic device comprises a translation mechanism operable to slide the blade assembly relative to the device housing between an extended position, a retracted position, and a peek position. At 3512, the electronic device comprises one or more processors operable with the translation mechanism.

At 3512, in response to the flexible display detecting an expanding pinch gesture, the one or more processors cause the translation mechanism to translate the blade assembly toward the extended position. At 3512, the one or more processors present additional content on front-facing portions of the flexible display revealed by the translation of the flexible display.

At 3513, the additional content of 3512 comprises portions of a map. At 3514, the additional content of 3512 comprises portions of a document. At 3515, the additional content of 3512 comprises one or more user actuation targets.

At 3516, the additional content of 3512 comprises application content when the flexible display is presenting an active application interface of an active application when the flexible display detects the expanding pinch gesture. At 3517, the application content of 3516 comprises a user interface control of the active application.

At 3518, a method in an electronic device comprises detecting an expanding pinch gesture with a flexible display carried by a blade assembly slidably coupled to a device housing and movable between an extended position, a retracted position, and a peek position. At 3518, the method comprises translating the blade assembly toward the extended position with a translation mechanism in response to the expanding pinch gesture.

At 3519, the translating of 3518 occurs only when the electronic device is in an unlocked state when the expanding pinch gesture is detected. At 3520, the method of 3518 further comprises presenting additional content with one or more processors on front-facing portions of the flexible display that are revealed by the translating.

Turning now to FIG. 36, at 3601 a method in an electronic device comprises detecting, with a flexible display carried by a blade assembly that is slidably coupled to a device housing and movable between at least an extended position and a retracted position, user input defining a zoom gesture while an image capture application is operating on one or more processors of the electronic device. At 3601, the method comprises translating, by a translation mechanism operable with the blade assembly, the blade assembly toward the extended position in response to the zoom gesture.

At 3602 the translating of 3601 occurs only when the electronic device is in an unlocked state when the user input defining the zoom gesture is detected. At 3603, the zoom gesture of 3602 comprises an expanding pinch gesture. At 3604, the zoom gesture of 3602 comprises actuation of a zoom user actuation target presented when the image capture application is operating in a viewfinder mode. At 3605, a field of view of an image capture device presented on the flexible display of 3602 expands in response to the zoom gesture when an image capture application is operating in the electronic device when the zoom gesture is received.

At 3606, the method of 3602 further comprises presenting, by one or more processors operable with the flexible display, a viewfinder of an image capture device on a front-facing portion of the flexible display while the user input is received. At 3606, the method comprises presenting, by the one or more processors after the translating occurs, an additional field of view of the viewfinder on a front-facing area of the flexible display that is exposed by the translating.

At 3607, the additional field of view of 3606 reveals additional background behind a subject of an image capture operation of the image capture application. At 3608, depictions of the subject of 3603 in the view finder before and after the translating have the same dimensions.

At 3609, the method of 3606 comprises again detecting, with the flexible display, additional user input defining another zoom gesture. At 3609, the method comprises again translating, by the translation mechanism, the blade assembly toward the extended position in response to the another zoom gesture and expanding, by the one or more processors, the additional field of view of the viewfinder on another front-facing area of the flexible display that is newly exposed in response to the additional user input.

At 3610, the method of 3602 further comprises presenting, by one or more processors operable with the flexible display, a viewfinder interface presentation on a front-facing portion of the flexible display while the user input occurs. At 3610, the method comprises determining, by the one or more processors, an additional display area defined by the zoom gesture and presenting, by the one or more processors after the translating occurs, additional field of view content in the additional display area revealed by the translating. At 3611, the blade assembly of 3601 is further movable to a peek position revealing an image capture device.

At 3612, an electronic device comprises a device housing and a blade assembly carrying a blade and a flexible display and slidably coupled to the device housing. At 3612, the electronic device comprises a translation mechanism operable to slide the blade assembly relative to the device housing between an extended position, a retracted position, and a peek position and one or more processors operable with the translation mechanism.

At 3612, in response to the flexible display detecting a zoom gesture while an image capture application operating on the one or more processors presents a viewfinder on front-facing portion of the flexible display, the one or more processors cause the translation mechanism to translate the blade assembly toward the extended position. At 3612, the one or more processors present the viewfinder with an expanded field of view on the front-facing portions of the flexible display after the translation of the flexible display.

At 3613, the zoom gesture of 3612 comprises an expanding pinch gesture. At 3614, the zoom gesture of 3612 comprises actuation of a zoom user actuation target presented on the flexible display.

At 3615, the electronic device of 3612 further comprises a front-facing image capture device and a rear-facing image capture device. At 3615, the translation only occurs with the viewfinder is for the rear-facing image capture device.

At 3616, the rear-facing imager of 3615 is exposed regardless of whether the blade assembly is in the extended position, the retracted position, or the peek position. At 3617, the front-facing image capture device of 3616 is only exposed when the blade assembly is in the peek position.

At 3618, a method in an electronic device comprises detecting a zoom gesture with a flexible display carried by a blade assembly slidably coupled to a device housing and movable between an extended position, a retracted position, and a peek position while a viewfinder of an image capture device is presented on a front-facing portion of the flexible display. At 3618, the method comprises translating the blade assembly toward the extended position with a translation mechanism in response to the zoom gesture.

At 3619, the method of 3618 further comprises presenting an expanded field of view of the viewfinder on the front-facing portion of the flexible display after the translating. At 3620, the zoom gesture of 3618 comprises an expanding pinch gesture.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
    detecting, with a flexible display wrapping around two exterior major surfaces and one minor exterior surface of a device housing, carried by a blade assembly that is slidably coupled to the device housing, and movable between at least an extended position and a retracted position, user input defining an expanding pinch gesture; and
    translating, by a mechanism operable with the blade assembly, the blade assembly toward the extended position in response to the expanding pinch gesture.

2. The method of claim 1, wherein the translating occurs only when the electronic device is in an unlocked state when the user input defining the expanding pinch gesture is detected.

3. The method of claim 2, further comprising:
    presenting, by one or more processors operable with the flexible display, application generated content on a front-facing portion of the flexible display while the user input is received; and
    presenting, by the one or more processors after the translating occurs, additional application generated content on a front-facing area of the flexible display that is exposed by the translating.

4. The method of claim 3, additional application generated content comprising a content creation window.

5. The method of claim 3, the application generated content comprising a map.

6. The method of claim 3, the application generated content comprising a document.

7. The method of claim 3, the application generated content comprising an image.

8. The method of claim 3, further comprising:
    again detecting, with the flexible display, additional user input defining another expanding pinch gesture;
    again translating, by the mechanism, the blade assembly toward the extended position in response to the another expanding pinch gesture; and
    presenting, by the one or more processors, expanded application generated content on another front-facing area of the flexible display that is newly exposed in response to the additional user input.

9. The method of claim 2, further comprising:
    presenting, by one or more processors operable with the flexible display, an active application interface presentation of an active application on a front-facing portion of the flexible display while the user input occurs;
    determining, by the one or more processors, an additional display area required by an operating state of the active application; and
    presenting, by the one or more processors after the translating occurs, additional active application content in the additional display area revealed by the translating.

10. The method of claim 9, wherein the translating occurs in an amount defined by a function of the additional display area.

11. The method of claim 1, wherein the blade assembly is further movable to a peek position revealing an image capture device.

12. An electronic device, comprising:
a device housing;
a blade assembly carrying a blade and a flexible display that is visible from a front side of the device housing, a rear side of the device housing, and an end portion of the device housing, and that is slidably coupled to the device housing;
a mechanism operable to slide the blade assembly relative to the device housing between an extended position, a retracted position, and a peek position; and
one or more processors operable with the mechanism;
wherein, in response to the flexible display detecting an expanding pinch gesture, the one or more processors:
cause the mechanism to translate the blade assembly toward the extended position; and
present additional content on front-facing portions of the flexible display revealed by the translation of the flexible display.

13. The electronic device of claim 12, wherein the additional content comprises portions of a map.

14. The electronic device of claim 12, wherein the additional content comprises portions of a document.

15. The electronic device of claim 12, wherein the additional content comprises one or more user actuation targets.

16. The electronic device of claim 12, wherein the additional content comprises application content when the flexible display is presenting an active application interface of an active application when the flexible display detects the expanding pinch gesture.

17. The electronic device of claim 16, wherein the application content comprises a user interface control of the active application.

18. A method in an electronic device, the method comprising:
detecting an expanding pinch gesture with a flexible display carried by a blade assembly slidably coupled to a device housing and movable between an extended position, a retracted position, and a peek position revealing an image capture device; and
translating the blade assembly toward the extended position with a mechanism in response to the expanding pinch gesture.

19. The method of claim 18, wherein the translating occurs only when the electronic device is in an unlocked state when the expanding pinch gesture is detected.

20. The method of claim 18, further comprising presenting additional content with one or more processors on front-facing portions of the flexible display that are revealed by the translating.

\* \* \* \* \*